(12) United States Patent　　　(10) Patent No.:　US 12,646,745 B2
Liu et al.　　　　　　　　　　　　(45) Date of Patent:　　　Jun. 2, 2026

(54) LARGE-SCALE SYNTHESIS OF POWDERS OF SOLID-STATE ELECTROLYTE MATERIAL PARTICLES FOR SOLID-STATE BATTERIES, SYSTEMS AND METHODS THEREOF

(71) Applicant: eJoule, Inc., Fremont, CA (US)

(72) Inventors: Min Duan Liu, Bethany, CT (US);
Hsin-Ping Ho, Hsinchu (TW);
Shengfeng Liu, Newark, CA (US);
Liang-Yuh Chen, Saratoga, CA (US)

( * ) Notice: Subject to any disclaimer, the term of this patent is extended or adjusted under 35 U.S.C. 154(b) by 685 days.

(21) Appl. No.: 17/993,990

(22) Filed: Nov. 24, 2022

(65) Prior Publication Data

US 2023/0163351 A1　　May 25, 2023

Related U.S. Application Data

(60) Provisional application No. 63/283,214, filed on Nov. 25, 2021.

(51) Int. Cl.
　　*H01M 10/0562*　　(2010.01)
　　*H01M 10/0525*　　(2010.01)
(52) U.S. Cl.
　　CPC ... *H01M 10/0562* (2013.01); *H01M 10/0525* (2013.01); *H01M 2300/0071* (2013.01)
(58) Field of Classification Search
　　CPC ......... H01M 10/0562; H01M 10/0525; H01M 2300/0071
　　See application file for complete search history.

(56) References Cited

U.S. PATENT DOCUMENTS 6,444,009 B1 * 9/2002 Liu ......................... B22F 9/082
　　　　　　　　　　　　　　　　　　　　　75/332
2004/0118007 A1 * 6/2004 Chickering, III ..... F26B 17/102
　　　　　　　　　　　　　　　　　　　　　34/591
(Continued)

FOREIGN PATENT DOCUMENTS

EP　　　　824087 A1 * 2/1998
WO　WO-2021089886 A2 * 5/2021 .............. H01M 4/62

OTHER PUBLICATIONS

Djenadic, "Nebulized spray pyrolysis of Al-doped Li7La3Zr2O12 solid electrolyte for battery applications", Solid State Ionics, 263 (2014), 49-56 (Year: 2014).*

(Continued)

*Primary Examiner* — Matthew J Merkling
(74) *Attorney, Agent, or Firm* — JAS LAW, LLP; Ya-Fen Chen

(57)　　　　　　　ABSTRACT

Various solid-state electrolyte materials having a desired chemical composition as well as method and apparatus of producing the solid-state electrolyte (SSE) materials are provided. The method includes drying a gas-liquid mixture to form a gas-solid mixture, obtaining powdered particles, and annealing the powdered particles to obtain crystalline products of the SSE material. The liquid mixture is prepared using stoichiometrically amounts of lithium-containing salt and one or more inorganic salts and then mixed with a gas. The salts are prepared in solutions and the molar ratio of the solutions of lithium-containing salt and the one or more inorganic metal salt are digitally controlled, thereby obtaining large scale synthesis of the SSE materials. The processing apparatus generally includes a mist generator, a power jetting chamber, one or more gas-solid separators, and one or more reactors. Various types of SSE materials can then be prepared and obtained.

25 Claims, 21 Drawing Sheets

(56) References Cited

U.S. PATENT DOCUMENTS

| | | | | |
|---|---|---|---|---|
| 2014/0328724 A1* | 11/2014 | Chen | | B01J 12/02 |
| | | | | 422/139 |
| 2015/0024292 A1 | 1/2015 | Yamada et al. | | |
| 2020/0392014 A1* | 12/2020 | Libera | | B01J 2/06 |
| 2020/0411839 A1 | 12/2020 | Wang et al. | | |
| 2021/0313619 A1 | 10/2021 | Holme et al. | | |

OTHER PUBLICATIONS

Ali, "Spray Flame Synthesis (SFS) of Lithium Lanthanum Zircon-ate (LLZO) Solid Electrolyte", Materials 2021, 14, 3472, p. 1-13 (Year: 2021).*
PCT/US 22/51015_Notification of transmittal of the international search report and the written opinion of the international searching authority, or the declaration.

* cited by examiner

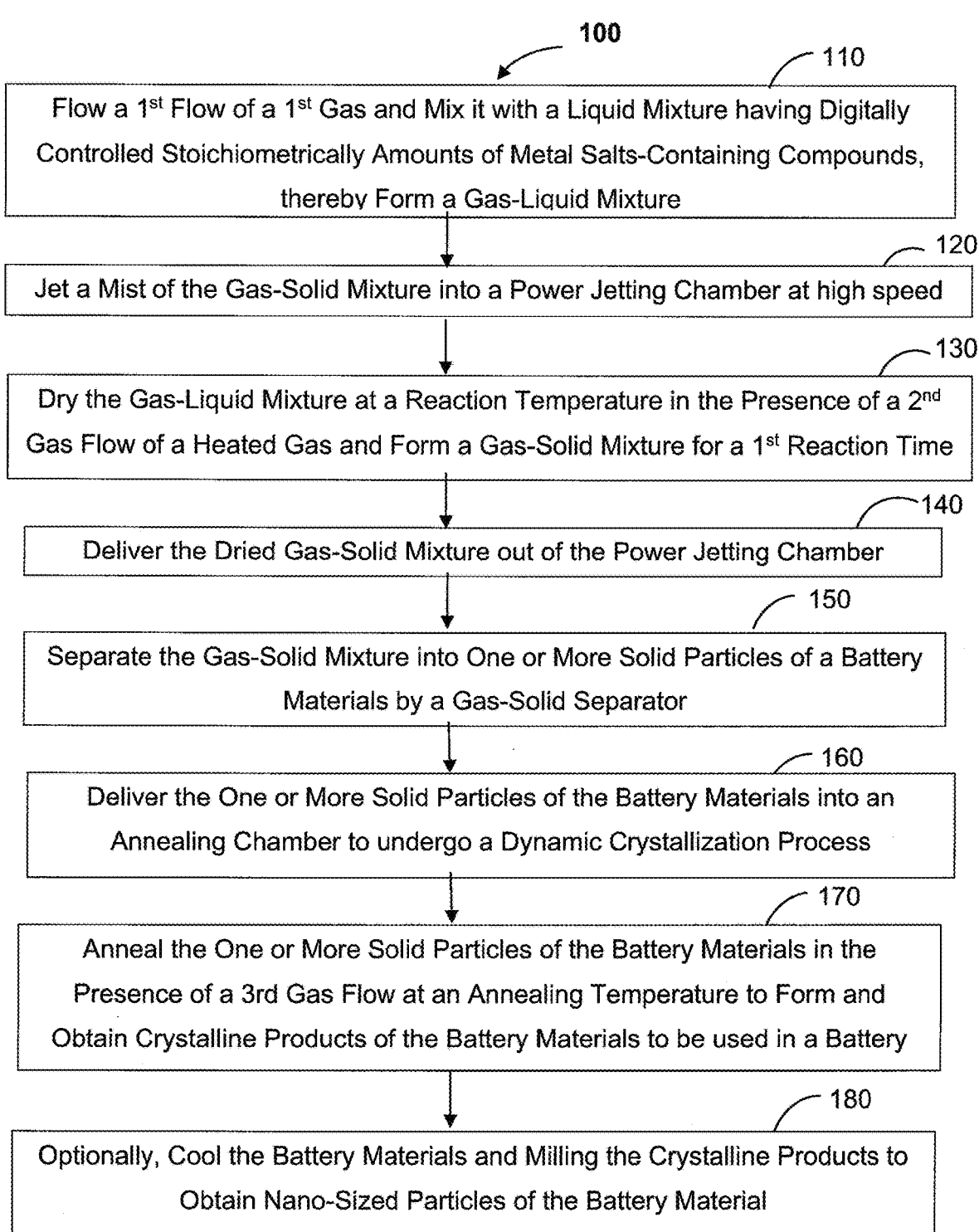

100 / 110

Flow a 1st Flow of a 1st Gas and Mix it with a Liquid Mixture having Digitally Controlled Stoichiometrically Amounts of Metal Salts-Containing Compounds, thereby Form a Gas-Liquid Mixture

120

Jet a Mist of the Gas-Solid Mixture into a Power Jetting Chamber at high speed

130

Dry the Gas-Liquid Mixture at a Reaction Temperature in the Presence of a 2nd Gas Flow of a Heated Gas and Form a Gas-Solid Mixture for a 1st Reaction Time

140

Deliver the Dried Gas-Solid Mixture out of the Power Jetting Chamber

150

Separate the Gas-Solid Mixture into One or More Solid Particles of a Battery Materials by a Gas-Solid Separator

160

Deliver the One or More Solid Particles of the Battery Materials into an Annealing Chamber to undergo a Dynamic Crystallization Process

170

Anneal the One or More Solid Particles of the Battery Materials in the Presence of a 3rd Gas Flow at an Annealing Temperature to Form and Obtain Crystalline Products of the Battery Materials to be used in a Battery

180

Optionally, Cool the Battery Materials and Milling the Crystalline Products to Obtain Nano-Sized Particles of the Battery Material

Figure 2

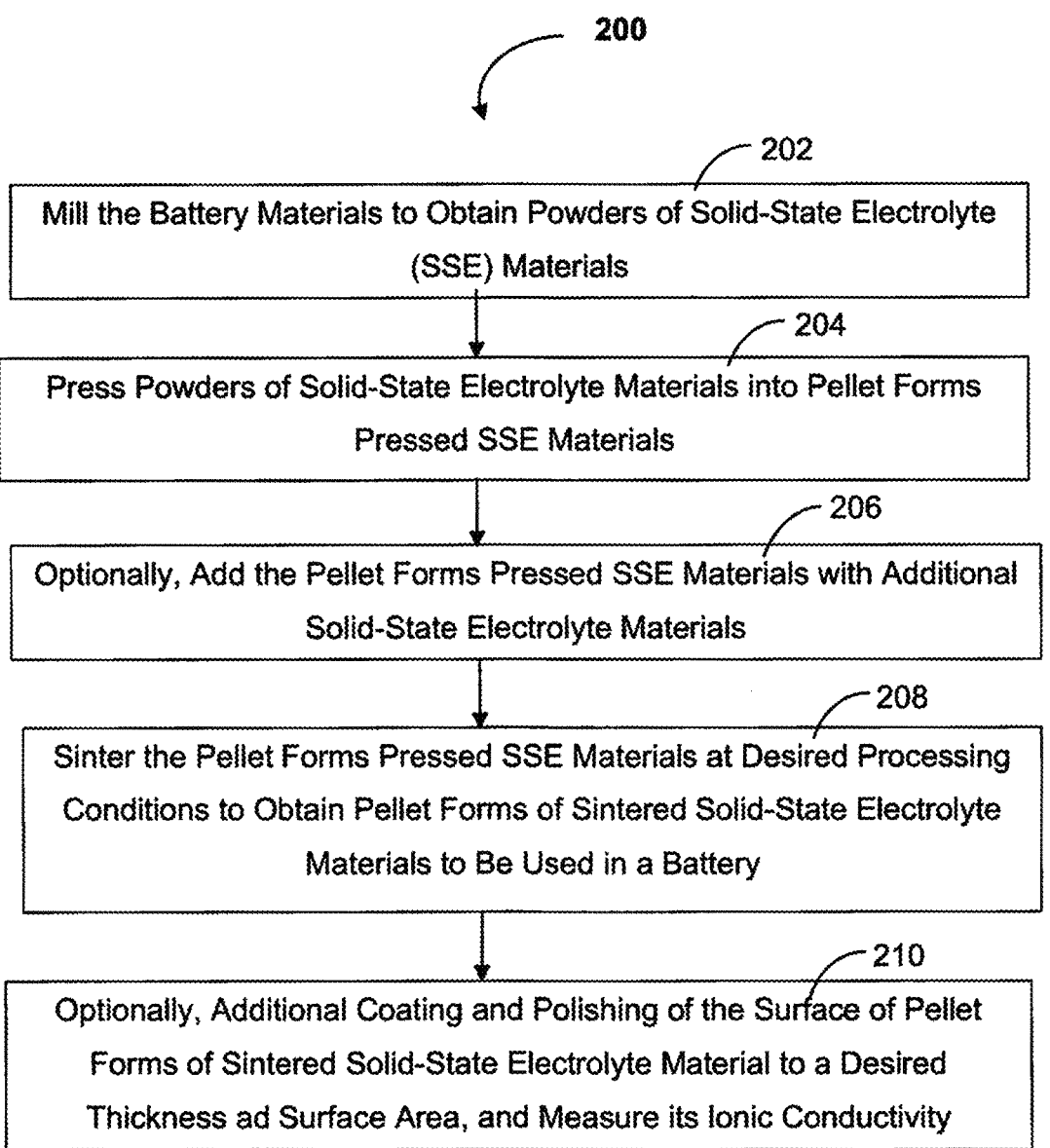

200

202

Mill the Battery Materials to Obtain Powders of Solid-State Electrolyte (SSE) Materials

204

Press Powders of Solid-State Electrolyte Materials into Pellet Forms Pressed SSE Materials

206

Optionally, Add the Pellet Forms Pressed SSE Materials with Additional Solid-State Electrolyte Materials

208

Sinter the Pellet Forms Pressed SSE Materials at Desired Processing Conditions to Obtain Pellet Forms of Sintered Solid-State Electrolyte Materials to Be Used in a Battery

210

Optionally, Additional Coating and Polishing of the Surface of Pellet Forms of Sintered Solid-State Electrolyte Material to a Desired Thickness ad Surface Area, and Measure its Ionic Conductivity

Figure 3

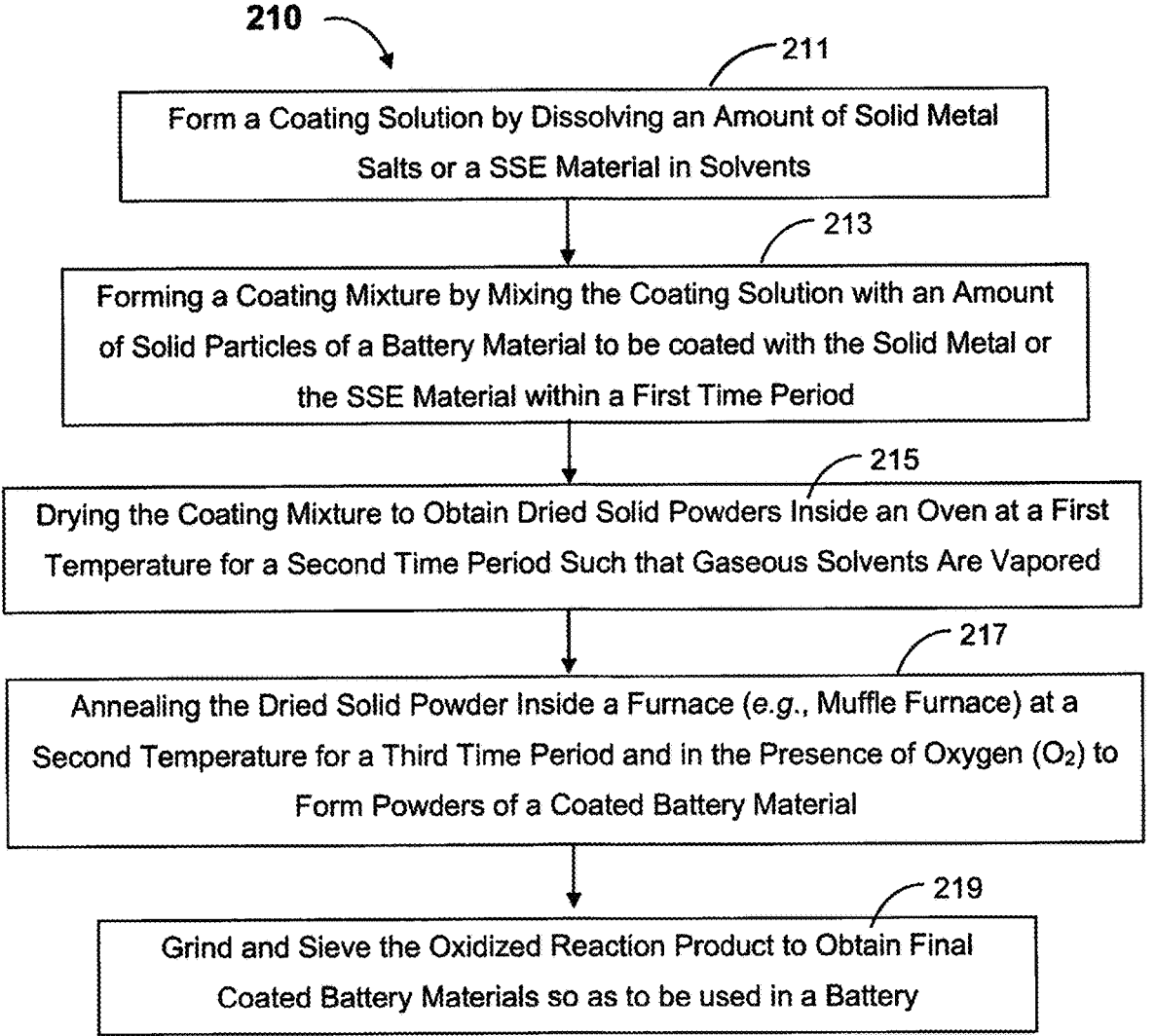

210

211

Form a Coating Solution by Dissolving an Amount of Solid Metal Salts or a SSE Material in Solvents

213

Forming a Coating Mixture by Mixing the Coating Solution with an Amount of Solid Particles of a Battery Material to be coated with the Solid Metal or the SSE Material within a First Time Period

215

Drying the Coating Mixture to Obtain Dried Solid Powders Inside an Oven at a First Temperature for a Second Time Period Such that Gaseous Solvents Are Vapored

217

Annealing the Dried Solid Powder Inside a Furnace (*e.g.*, Muffle Furnace) at a Second Temperature for a Third Time Period and in the Presence of Oxygen ($O_2$) to Form Powders of a Coated Battery Material

219

Grind and Sieve the Oxidized Reaction Product to Obtain Final Coated Battery Materials so as to be used in a Battery

Figure 4

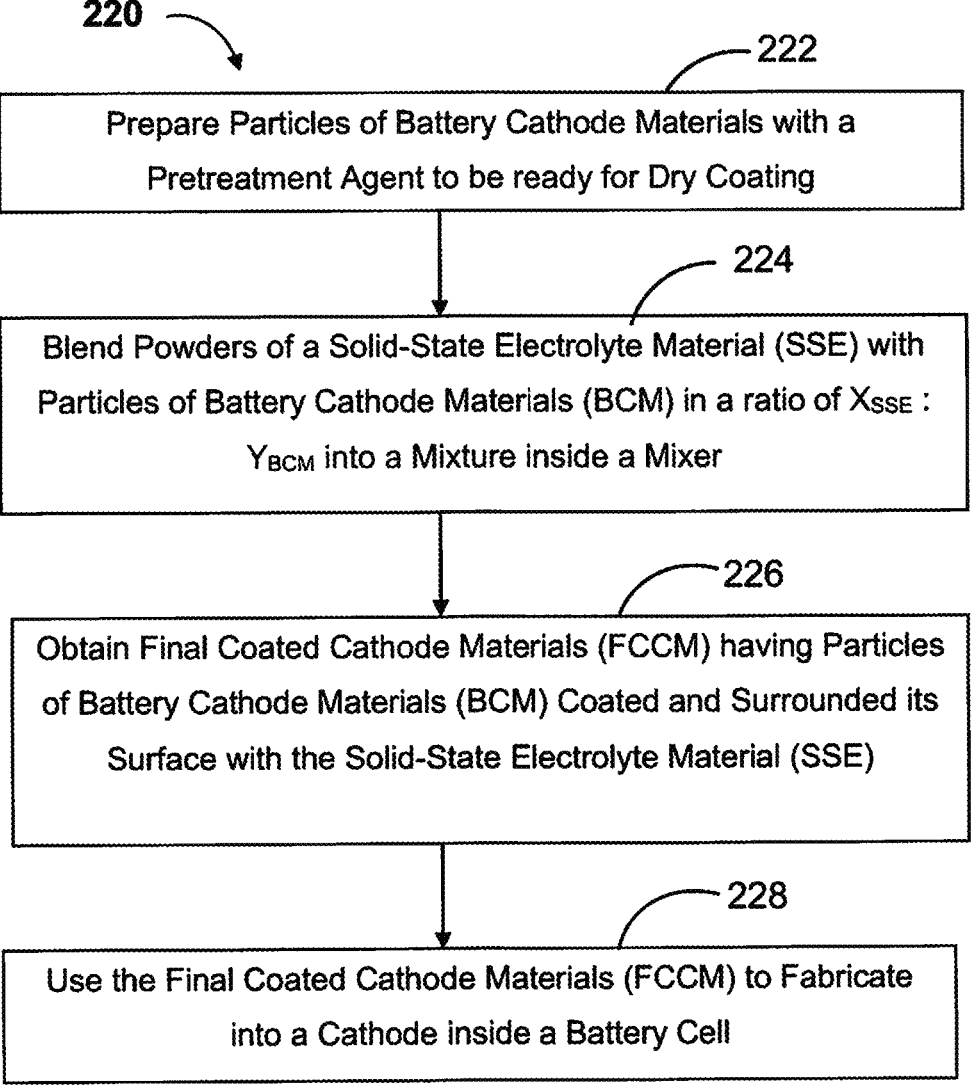

220

222

Prepare Particles of Battery Cathode Materials with a Pretreatment Agent to be ready for Dry Coating

224

Blend Powders of a Solid-State Electrolyte Material (SSE) with Particles of Battery Cathode Materials (BCM) in a ratio of $X_{SSE}$ : $Y_{BCM}$ into a Mixture inside a Mixer

226

Obtain Final Coated Cathode Materials (FCCM) having Particles of Battery Cathode Materials (BCM) Coated and Surrounded its Surface with the Solid-State Electrolyte Material (SSE)

228

Use the Final Coated Cathode Materials (FCCM) to Fabricate into a Cathode inside a Battery Cell

Figure 5

2θ (degree)

1410

1420

1430

1510

1610

1620

LARGE-SCALE SYNTHESIS OF POWDERS OF SOLID-STATE ELECTROLYTE MATERIAL PARTICLES FOR SOLID-STATE BATTERIES, SYSTEMS AND METHODS THEREOF

CROSS-REFERENCE TO RELATED APPLICATIONS

This application claims benefit of U.S. provisional patent application Ser. No. 63/283,214, filed on Nov. 25, 2021, which is herein incorporated by reference in its entirety.

FIELD OF THE INVENTION

This invention generally relates to the preparation of materials for battery applications. More specifically, the invention relates to a composition and a process of manufacturing structured battery cathode or anode active materials or large-scale synthesis of powders of solid-state electrolyte material particles for solid-state batteries or use in secondary and rechargeable batteries.

BACKGROUND OF THE INVENTION

In clean energy industries (e.g. batteries for electric vehicles) there is constant demand for lightweight, compact, and high-energy density batteries, and dramatic improvements are required in battery's safety, energy density, cycle life, large scale production, and low cost. In general, a conventional lithium-ion batteries (LIBs) contains a non-aqueous electrolyte which is liquid-based electrolytes having lithium salts in flammable organic solvent. However, the use of liquid-based electrolytes has its drawbacks. One of the most major drawbacks is its serious safety issues due to its flammability and the presence of the volatile organic solvents used in the electrolytes. Furthermore, the problem of growth of Li dendrites in liquid electrolytes LIBs is unavoidable and can raise the problem of short-circuiting, especially at conditions under high rates of charge/discharge. Other disadvantages for using liquid electrolytes are highly resistive solid-state electrolyte interphases (SEI) at the electrodes leading to capacity loss, leakage, leakage and/or corrosion at the electrodes electrolytic decomposition at high voltages limiting the use of high voltages cathode materials, and formation of hydrogen fluoride (HF) at thermal runaway.

While most liquid electrolytes are flammable, solid electrolytes are nonflammable, and are believed to have lower risk of catching fire. In addition, the development of solid-state batteries which would help in overcoming the main problems of batteries containing liquid electrolytes, e.g., leakage and/or corrosion at the electrodes, required the use of solid electrolytes with high ionic conductivity; and resist lithium dendrite in a great degree and the cycle life could be extended longer than lithium batteries based on liquid-based electrolyte. Solid-state batteries are usually refer to secondary batteries that use solid-state electrolyte materials instead of liquid-based electrolyte. In solid-state batteries, conventional liquid electrolyte based on flammable carbonate components is replaced by solid electrolyte. Solid-state batteries generally have excellent safety efficiency, high energy density, high ionic conductivity, and a wide variety of operating temperatures.

The solid-state batteries offers opportunities for large battery cells, especially in electric vehicle applications. Since solid systems do not require any cooling system, solid-state batteries weigh less and require less space than lithium-ion batteries for powering electric vehicles.

In general, there are various synthesis methods for solid-state electrolyte materials, such as pulsed laser deposition, RF magnetron sputtering, solid-state pyrolysis synthesis, sol-gel method, combustion synthesis, ball milling, electrospinning, molten salt method, spark plasma sintering route, atomic layer deposition, etc. However, all these methods are very expensive and not economical for large-scale manufacturing because the methods take a long time to obtain final products (too many production steps), cannot provide products in large amount (e.g., in tons, as compared to grams or kilograms), cannot achieve and sustain intimate solid-solid contact. Therefore, developing a novel manufacturing method for large-scale synthesis and manufacturing of solid-state battery materials for solid-state secondary batteries with high energy density and superior safety performance is desired.

Most conventional processes for manufacturing solid-state electrolyte materials include many steps of mixing, adding excess lithium to make up loss of lithium during a high heat sintering process, and many of the steps cannot be performed in a continuous manner in a large scale production line. Also, most conventional processes are static in nature with such disadvantages in costing a large amount of sintered energy, long cycle life, short chamber lifetime, complicated operation steps, low production efficiency, uneven heating, difficulty to control cooling time such that the resulting battery materials are either over heated or not being heated enough.

Thus, there is a significant need for an improved method and system to large-scale manufacture solid-state battery materials, including properly crystalized solid-state electrolyte materials in order to obtain high-power battery performance, high capacity, high energy density, long cycle life, excellent thermal stability.

SUMMARY OF THE INVENTION

Embodiments of the invention generally provide solid-state battery materials, methods and systems for producing solid-state battery materials. One embodiment of the invention provides a method of producing a solid-state electrolyte (SSE) material, including flowing a first flow of a first gas to be mixed with a liquid mixture of digitally-controlled stoichiometrically amounts of a lithium-containing salt, one or more inorganic salts containing one or more metals $D_1$, $D_2$, ..., $D_N$, forming a gas-liquid mixture and jetting a mist of the liquid mixture at high-powered speed into a power jetting chamber, and delivering a second gas flow of a heated gas into the power jetting chamber. Examples of $D_1$, $D_2$, ..., $D_N$ includes of La, Zr, Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, Cl, I, Br, and combinations thereof.

The method also includes drying the gas-liquid mixture for a first reaction time period of less than 20 min to undergo one or more oxidation reactions in the presence of the second gas flow and form a gas-solid mixture, deliver the gas-solid mixture out of the power jetting chamber, separate the gas-solid mixture into one or more solid particles of the SSE material, and deliver the one or more solid particles into an annealing chamber. In one example, the first reaction time is less than 3 minutes. In another example, the powdered particles are annealed in the dynamic crystallization process in the presence of an oxygen gas flow.

Next, the method further includes annealing the one or more solid particles of the SSE material for a second reaction time period of more than 2 hours to undergo a dynamic crystallization process in the presence of a third gas flow and obtain crystalline products. The method optionally includes milling the crystalline products of the ceramic material to obtain nano-sized particles.

In one embodiment, the method also includes sintering the crystalline products of the ceramic material at an annealing temperature of 900° C. or higher to further process the ceramic material and measuring the ionic conductivity of the ceramic material.

Example of ceramic SSE material includes $Li_7La_3Zr_2O_{12}$, $Li_7La_3Zr_2O_{12}$ doped with one ore more metals, $Li_{6.75}La_3Zr_{1.75}Ta_{0.25}O_{12}$, $Li_{6.5}La_3Zr_2Al_{0.25}O_{12}$, $Li_{6.5}La_3Zr_2Al_{0.24}O_{12}$, $Li_{6.5}La_3Zr_2Al_{0.22}O_{12}$, $Li_{6.76}La_{2.87}Zr_{2.0}Al_{0.24}O_{12.35}$, $Li_{6.74}La_{2.96}Zr_{2.0}Al_{0.25}O_{12.45}$, $Li_{6.27}La_{3.22}Zr_{2.0}Al_{0.3}O_{12.39}$, $Li_{6.4}La_{2.87}Zr_{2.0}Al_{0.24}O_{11.98}$, $Li_{6.43}La_{2.93}Zr_{2.0}Al_{0.24}O_{12.08}$, $Li_{6.32}La_{3.2}Zr_{2.0}Al_{0.46}O_{12.9}$, $Li_{6.57}La_{2.99}Zr_{2.0}Al_{0.22}O_{12.22}$, $Li_{6.4}La_3Zr_2Al_{0.2}O_{12}$, $Li_{6.54}La_{2.82}Zr_{2.0}Al_{0.24}O_{12.08}$, $Li_{6.49}La_{3.28}Zr_{2.0}Al_{0.31}O_{12.7}$, $Li_{6.28}La_3Zr_2Al_{0.24}O_{12}$, $Li_{6.25}La_{3.01}Zr_{2.0}Al_{0.22}O_{11.92}$, $Li_{6.49}La_{3.02}Zr_{2.0}Al_{0.23}O_{12.2}$, $Li_{6.5}La_3Zr_{1.5}Ta_{0.5}O_{12}$, $Li_{6.15}La_3Zr_{1.75}Ta_{0.25}Al_{0.2}O_{12}$, $Li_{6.25}La_3Zr_2Al_{0.25}O_{12}$, $Li_{6.15}La_3Zr_{1.75}Ta_{0.25}Ga_{0.2}O_{12}$, $Li_{6.25}La_3Zr_2Ta_{0.25}Ga_{0.2}O_{12}$, $Li_{6.4}La_3Zr_2Ga_{0.2}O_{12}$, $Li_{6.4}La_3Zr_{1.4}Ta_{0.6}O_{12}$, $Li_6La_3Nb_2O_{12}$, $Li_5La_3Ta_2O_{12}$, $Li_5La_3Ti_2O_{12}$, $Li_6La_3Sr_1Ta_2O_{12}$, $Li_6La_3Ba_1Ta_2O_{12}$, $Li_6La_3Ba_1Ti_2O_{12}$, $Li_{1.26}La_{2.24}Ti_4O_{12}$, $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$, $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$, $Li_{1.36}La_{2.24}Ti_4O_{12}$, $Li_{1.72}La_{2.24}Ti_{3.8}Ge_{0.2}O_{12}$, $Li_{1.2}La_{2.24}Ti_{3.8}Ge_{0.2}O_{12}$, and combinations thereof.

In one embodiment, the crystalline products of the SSE material are in spherical clusters under scanning electronic microscopy (SEM) analysis. In another embodiment, the tap density of the SSE material is more than 1.0 g/ml. For example, the tap density of the SSE material is more than 1.4 g/ml after annealing the SSE material at more than 900° C. for more than 8 hours.

In still another embodiment, the ionic conductivity (a) of the SSE material is larger than $10^{-4}$ S per centimeter at 25° C. One example of the crystalline products is a garnet type ceramic material with a cubic structure as measured by X-ray diffraction (XRD) analysis. In another example, the liquid mixture includes a lithium-containing salt, a lanthanum-containing salt, a zirconium-containing salt, and the crystalline products of the SSE material as measured by X-ray diffraction (XRD) analysis are garnet type ceramic material with a cubic structure. In still another example, the liquid mixture includes a lithium-containing salt, a lanthanum-containing salt, a zirconium-containing salt, and an aluminum-containing salt, and the crystalline products of the SSE material as measured by X-ray diffraction (XRD) analysis are garnet type ceramic material with a cubic structure. Another example of the liquid mixture includes a lithium-containing salt, a lanthanum-containing salt, a zirconium-containing salt, and the crystalline products of the SSE material as measured by X-ray diffraction (XRD) analysis are garnet type ceramic material with a tetragonal structure.

In still another embodiment, the liquid mixture includes a lithium-containing salt, a lanthanum-containing salt, a tantalum-containing salt, and the crystalline products of the SSE material as measured by X-ray diffraction (XRD) analysis are garnet type ceramic material with a cubic structure. Another example of the liquid mixture includes a lithium-containing salt, an aluminum-containing salt, a phosphorus-containing salt, and the crystalline products of the SSE material as measured by X-ray diffraction (XRD) analysis are sodium superionic conductor (NASICON) type ceramic material with a hexagonal structure.

In a further embodiment, the liquid mixture includes a lithium-containing salt, a lanthanum-containing salt, a titanium-containing salt, and the crystalline products of the SSE material are perovskite type ceramic material. Still further, the liquid mixture includes a lithium-containing salt, a germanium-containing salt, and the SSE material is a ceramic material. In a further embodiment, the liquid mixture includes a lithium-containing salt, a sulfur-containing salt, and the SSE material is a sulfide material.

One embodiment of the invention include a method of producing a solid-state electrolyte ceramic material having a measured ionic conductivity (a) of larger than $10^{-4}$ S per centimeter at 25° C., and a chemical composition of $Li_a La_b Zr_c D1_d D2_e ... DN_n O_v$, wherein $6.25 \le a \le 7.2$, $2.8 \le b \le 3.5$, $1.2 \le c \le 2.2$, $2.0 \le v \le 12$, and wherein at least one of $D_1$, $D_2, ..., D_N$ is a metal, $N \ge 0$, $0 \le d \le 0.8$, $0 \le e \le 0.8$, and $0 \le n \le 0.8$. The method includes forming a liquid mixture of digitally-controlled stoichiometrically amounts of a lithium-containing salt, a lanthanum-containing salt, a zirconium-containing salt, and one or more inorganic salts containing one or more metals $D_1, D_2, ..., D_N$ to be mixed with a first gas flow to form a gas-liquid mixture, jetting a mist of the liquid mixture into a power jetting chamber; and drying the gas-liquid mixture for a first reaction time period of less than 20 min to undergo one or more oxidation reactions in the presence of a second gas flow of a heated gas and form a gas-solid mixture. Next, the gas-solid mixture is delivered out of the power jetting chamber, and the gas-solid mixture is separated into one or more solid particles of the SSE material. Then, the one or more solid particles are delivered into an annealing chamber and the one or more solid particles of the SSE material are annealed for a second reaction time period of more than 2 hours to undergo a dynamic crystallization process in the presence of a third gas flow so as to obtain final crystalline products of the SSE materials.

Another embodiment of the invention provides a solid-state electrolyte material, including a ceramic material having a chemical composition of $Li_a La_b Zr_c D1_d D2_e ... DN_n O_v$, wherein $6.25 \le a \le 7.2$, $2.8 \le b \le 3.5$, $1.2 \le c \le 2.2$, $2.0 \le v \le 12$, and wherein at least one of $D_1, D_2, ..., D_N$ is a metal, $N \ge 0$, $0 \le d \le 0.8$, $0 \le e \le 0.8$, and $0 \le n \le 0.8$. The SSE material is synthesized at large scale by a method, including forming a liquid mixture of digitally-controlled stoichiometrically amounts of a lithium-containing salt, a lanthanum-containing salt, a zirconium-containing salt, and one or more inorganic salts containing one or more metals. The method also include mixing the liquid mixture with a first gas flow to form a gas-liquid mixture, jetting a mist of the gas-liquid mixture into a power jetting chamber at high speed, drying the gas-liquid mixture for a first reaction time period of less than 20 min to undergo one or more oxidation reactions by delivering a second gas flow of a heated gas and forming a gas-solid mixture inside the power jetting chamber, delivering the gas-solid mixture out of the power jetting chamber obtaining powdered particles of the ceramic material; and annealing the powdered particles for a second reaction time period of more than 2 hours to undergo a dynamic crystallization process in the presence of a third gas flow and form crystalline products, wherein the crystalline products of the ceramic material are in clusters under scanning electronic microscopy (SEM) analysis, wherein $D_1, D_2, ..., D_N$ is selected from the group consisting of Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, Cl, I, Br, and combinations thereof.

In one example, the method of producing the solid-state electrolyte material of further includes milling the crystalline products of the ceramic material to obtain nano-sized particles, wherein the tap density of the ceramic material is more than 1.0 g/ml. In another example, the method further includes sintering the crystalline products of the ceramic material at an annealing temperature of 900° C. or higher to further process the ceramic material; and measuring the ionic conductivity of the ceramic material. In still another example, the crystalline products of the solid-state electrolyte material obtained from the invention as measured by X-ray diffraction (XRD) analysis are garnet type ceramic material with a cubic structure and its measured ionic conductivity ($\sigma$) is larger than $10^{-4}$ S per centimeter at 25° C.

Another embodiment of the invention provides a solid-state electrolyte material, comprising, a ceramic material having a chemical composition of $Li_a\ La_b\ Zr_c\ Al_d\ D1_e\ .\ .\ .\ DN_n\ O_v$, wherein $6.2 \leq a \leq 7.2$, $2.8 \leq b \leq 3.5$, $1.2 \leq c \leq 2.2$, $2.0 \leq v \leq 12$, and wherein at least one of $D_1, \ldots, D_N$ is a metal, $N \geq 0$, $0 \leq d \leq 0.8$, $0 \leq e \leq 0.8$, and $0 \leq n \leq 0.8$, and being synthesized by a method, which includes: forming a liquid mixture of digitally-controlled stoichiometrically amounts of a lithium-containing salt, a lanthanum-containing salt, a zirconium-containing salt, and one or more inorganic salts containing one or more metals $D_1, D_2, \ldots, D_N$; jetting a mist of the liquid mixture by mixing the liquid mixture with a first gas flow into a power jetting chamber at high speed to form a gas-liquid mixture; drying the gas-liquid mixture for a first reaction time period of less than 20 min to undergo one or more oxidation reactions by delivering a second gas flow of a heated gas and forming a gas-solid mixture inside the power jetting chamber; delivering the gas-solid mixture out of the power jetting chamber obtaining powdered particles of the ceramic material; and annealing the powdered particles for a second reaction time period of more than 2 hours to undergo a dynamic crystallization process in the presence of a third gas flow and form crystalline products, wherein the crystalline products of the ceramic material are in clusters under scanning electronic microscopy (SEM) analysis, wherein $D_1, D_2, \ldots, D_N$ is selected from the group consisting of Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, Cl, I, Br, and combinations thereof.

In another embodiment, a solid-state electrolyte material being synthesized by a process, comprising: forming a liquid mixture of digitally-controlled stoichiometrically amounts of a lithium-containing salt, a lanthanum-containing salt, a zirconium-containing salt, and one or more inorganic salts containing one or more metals $D_1, D_2, \ldots, D_N$; jetting a mist of the liquid mixture into a power jetting chamber to be mixed with a first gas flow to form a gas-liquid mixture; drying the lithium-containing salt, the lanthanum-containing salt, the zirconium-containing salt together for a first reaction time period of less than 20 min to undergo one or more oxidation reactions by delivering a second gas flow of a heated gas and form powdered particles of the ceramic material; and annealing the powdered particles for a second reaction time period of more than 2 hours to undergo a dynamic crystallization process in the presence of a third gas flow and form crystalline products of the ceramic material, wherein the final crystalline products of the ceramic material are in clusters under scanning electronic microscopy (SEM)

analysis, and wherein the crystalline products of as measured by X-ray diffraction (XRD) analysis are garnet type ceramic material with a cubic structure and its measured ionic conductivity ($\sigma$) is larger than $10^{-4}$ S/cm at 25° C.

Various solid-state electrolyte materials that can be formed using method of the invention includes, but not limited to, ceramic solid-state electrolyte material, garnet-type solid-state oxide electrolyte materials, lithium lanthanum zirconium oxide material, Li6ALa3Ta2O12 (A=Sr, Ba), NASICON (NaM2(PO4)3 M=Ge, Ti, Zr), LLTO Perovskite-Type Structure Electrolytes synthesis and transport properties of two-dimensional LixM⅓Nb1−xTixO3 (M=La, Nd) perovskite (ABO3)-type oxides, Li superionic conductor (LISICON)-type structure oxide electrolytes, lithium phosphorous-oxynitride (LiPON)), and combinations thereof. In addition, solid-state sulfide electrolyte materials, such as Argyrodit Electrolyte, lithium phosphorus sulfide ($Li_3PS_4$, LPS) electrolyte, $Li_7P_3S_{11}$, $Li_7P_2S_8$, Li11−xM2−xP1+xS12 (M=Ge, Sn, Si) (LGPS)-Type Structures: LGPS, and combinations thereof, can be synthesized ad formed using the method of the invention.

The invention also provides a method of fabricating a solid-state battery by forming an anode material layer, forming a solid-state electrolyte material layer, and forming a cathode material layer, where one or more of the anode material layer, the solid-state electrolyte material layer, the cathode material layer, or a combination thereof, includes a material prepared by the method of the invention. The material formed by the method of the invention may be ceramic solid-state electrolyte material, garnet-type solid-state oxide electrolyte materials, lithium lanthanum zirconium oxide material, Li6ALa3Ta2O12 (A=Sr, Ba), NASICON (NaM2(PO4)3 M=Ge, Ti, Zr), LLTO Perovskite-Type Structure Electrolytes synthesis and transport properties of two-dimensional LixM⅓Nb1-xTixO3 (M=La, Nd) perovskite (ABO3)-type oxides, Li superionic conductor (LISICON)-type structure oxide electrolytes, lithium phosphorous-oxynitride (LiPON)), and combinations thereof. In addition, solid-state sulfide electrolyte materials, such as Argyrodit Electrolyte, lithium phosphorus sulfide ($Li_3PS_4$, LPS) electrolyte, $Li_7P_3S_{11}$, Li7P2S8, Li11−xM2−xP1+xS12 (M=Ge, Sn, Si) (LGPS)-Type Structures: LGPS, and combinations thereof.

As an example, a material formed by the method of the invention may be used as the material within the solid-state electrolyte material layer. As another example, the material formed by the method of the invention may be used as the material to coat (e.g., using a dry coating process and/or a wet coating process) a cathode material. The resulting solid-state electrolyte material coated cathode material can be used to form a cathode material layer. Such coated cathode materials can be used to fabricate a solid-state battery together with a convention solid-state electrolyte material or using solid-state electrolyte material formed by the method of the invention.

In one embodiment, a solid-state electrolyte material, which contains lithium (Li), one or more metals, is synthesized by forming a liquid mixture of stoichiometrically amounts of a lithium-containing salt and one or more metal-containing salts and jetting the liquid mixture into a power jetting reactor for the lithium-containing salts and one or more metal-containing salts to oxidize these salts together at high temperature of between 350 degree Celsius to 1200 degree Celsius for only a few minutes to undergo rapid reaction and form the reacted final product of the solid-state electrolyte materials.

On example of the solid-state electrolyte material is lithium lanthanum zirconium oxide ($Li_7La_3Zr_2O_{12}$) (LLZO) material. The LLZO solid-state material is obtained by forming a liquid mixture of molar ratio amounts of a lithium-containing salt (e.g., lithium nitrate ($LiNO_3$), a lanthanum nitrate ($La(NO_3)_3$), and one or more metal-containing salts and jetting the liquid mixture into a power jetting reactor for the lithium-containing salts and one or more metal-containing salts to react together in less than 30 minutes and undergo rapid reaction and form the reacted final product of the solid-state electrolyte materials. The resulting solid-state electrolyte materials exhibit crystalline structures comparable to solid-state electrolyte materials prepared by prior solid phase reactions and/or reaction-gelling processes.

BRIEF DESCRIPTION OF THE DRAWING

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates one embodiment of a method of producing battery materials.

FIG. 3 is another embodiment of a method of producing battery materials.

FIG. 4 illustrates another embodiment of a method of wet coating a battery material with another material.

FIG. 5 illustrates another embodiment of a method of dry coating a battery material with another material.

DETAILED DESCRIPTION

This invention generally relates to compositions, battery oxide materials, battery SSE materials, apparatuses, and a dynamic crystallization process (DCP) thereof in proper molar solution ratio to precisely and digitally control stoichiometrically amounts of metal material content and obtain proper atomic-level ratios of the metal components and make-up of a battery active material to be used for a solid-state battery. The battery materials and methods and apparatus provided here results in highly pure, accurate stoichiometric phases battery cathode materials and can be used, in turn, to make lithium-ion batteries with characteristics associated with high battery cycling performance, including high electric capacity.

A solid-state battery generally includes a positive electrolyte, an negative electrolyte, and a solid-state electrolyte/separator (i.e., the solid-state electrolyte can act as a separator between the positive electrolyte (i.e. cathode) and the negative electrolyte (i.e. anode). The positive electrode generally includes positive electrode active materials (i.e., cathode materials), and the negative electrode includes negative electrode active materials (i.e., anode materials). The SSE within a solid-state battery can be a simple solid-state electrolyte material or composite of a polymer and a SSE material. The cathode material may be LiCoO2 (LCO), Li(NixMnyCoz)O2 (NMC), LiFePO4 (LFP), or LiMn2O4 (LMO), and in some cases intercalated binary oxides, whereas Li metal, Li—In alloys, graphite, Li4Ti5O12 (LTO), or Si, Sn—Co—C mixed composites are used as anode materials. In addition, the electrode preparation techniques for solid-state batteries differs from those of prior lithium-ion batteries.

Figure 1A:
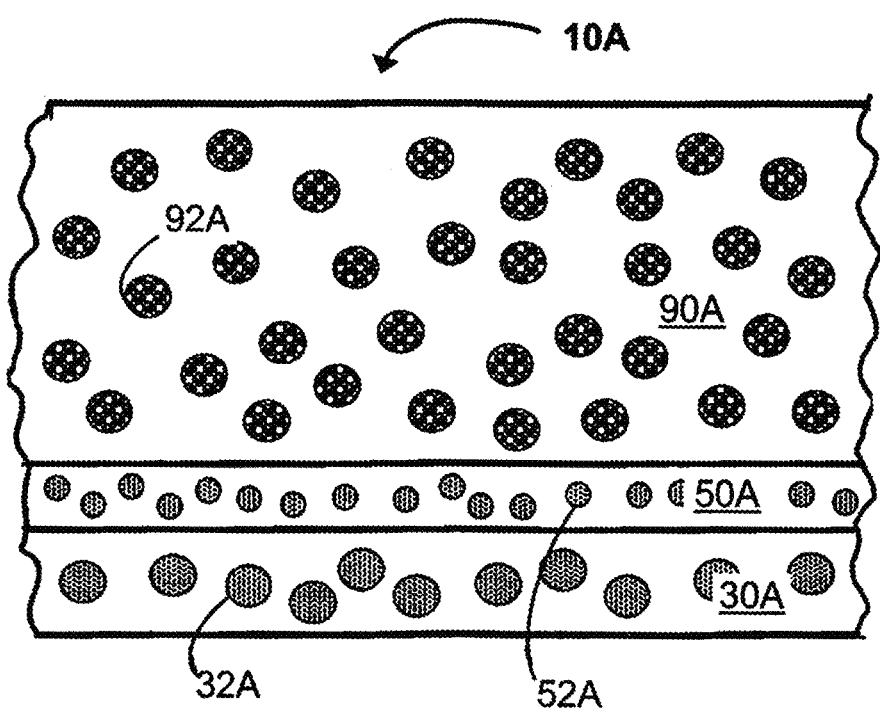
FIG. 1A is a cross-sectional view of an exemplary solid-state battery according to one embodiment of the invention.

FIG. 1A shows an exemplary solid-state battery, showing an exemplary layer structure of a solid-state battery layer structure 10A according to an aspect of the invention. The solid-state battery layer structure 10A includes a positive electrode layer 90A, a negative electrode layer 30A, and a solid-state electrolyte layer 50A sandwiched between the positive electrode layer 90A and the negative electrode layer 30A.

In one embodiment, the solid-state electrolyte layer 50A includes a solid-state electrolyte material 52A therein, which is prepared using methods and systems of the invention as described below in FIGS. 2, 3, 6, 7, 8A, 8B, 8C, 8D, 8E, 8F, or another suitable processes according to one or more embodiments. In another embodiment, the positive electrode layer 90A includes a cathode active material 92A therein, which can be prepared using methods and systems of the invention as described below in FIGS. 2, 3, 6, 7, 8A, 8B, 8C, 8D, 8E, 8F, or another suitable processes according to one or more embodiments. In addition, the negative electrode layer 30A includes an anode material 32A therein, which can be prepared using any suitable anode material preparation processes and systems.

Figure 1B:
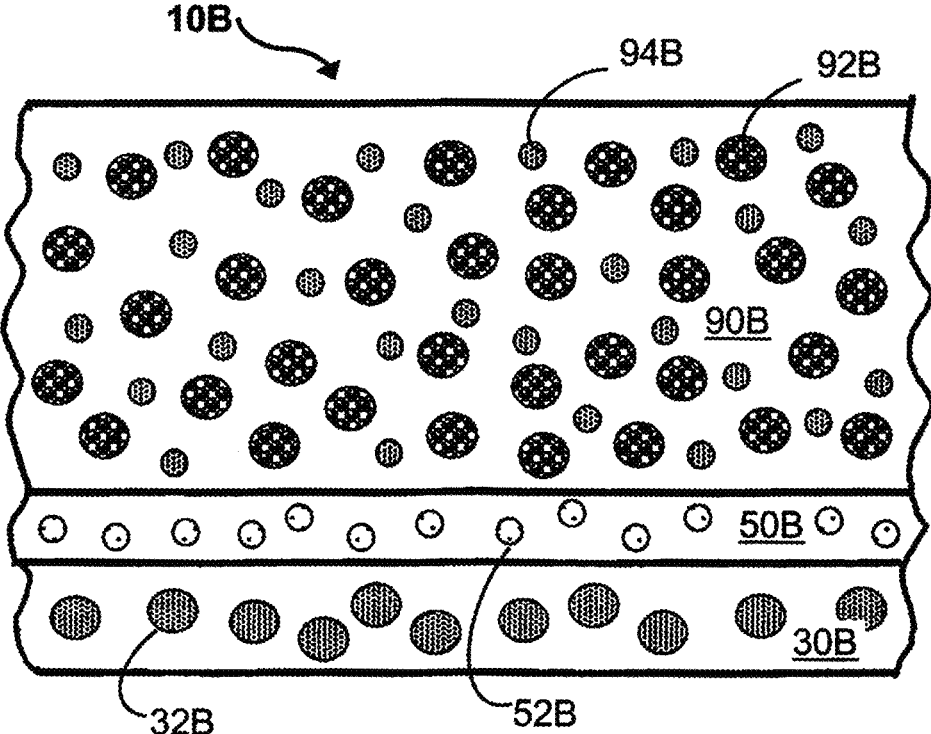
FIG. 1B is a cross-sectional view of an exemplary solid-state battery according to another embodiment.

FIG. 1B shows another example of a solid-state battery layer structure 10B according to an aspect of the invention. The solid-state battery layer structure 10B include a positive electrode layer 90B, a negative electrode layer 30B, and a solid-state electrolyte layer 50B sandwiched between the positive electrode layer 90B and the negative electrode layer 30B. In one embodiment, the solid-state electrolyte layer 50B includes a solid-state electrolyte material 52B therein, which is prepared using methods and systems of the invention as described below in FIGS. 2, 3, 6, 7, 8A, 8B, 8C, 8D, 8E, 8F, or another suitable processes according to one or more embodiments. In addition, the negative electrode layer 30B includes an anode material 32B therein, and the solid-state electrolyte layer 50B includes a solid-state electrolyte material 52B therein which is prepared according to methods and systems of the invention.

In another embodiment, the positive electrode layer 90B includes a mixture of a cathode active material 92B and a solid-state electrolyte material 94B, where they are prepared according to methods and systems of the invention. The cathode active material 92B and the solid-state electrolyte material 94B can be mixed together by a blending method using a blender or any other suitable apparatus. It is contemplated that the solid-state electrolyte material 94B is included in the positive electrode layer 90B to assist the conductivity of the cathode active material 92B within the solid-state battery layer structure 10B.

Figure 1C:
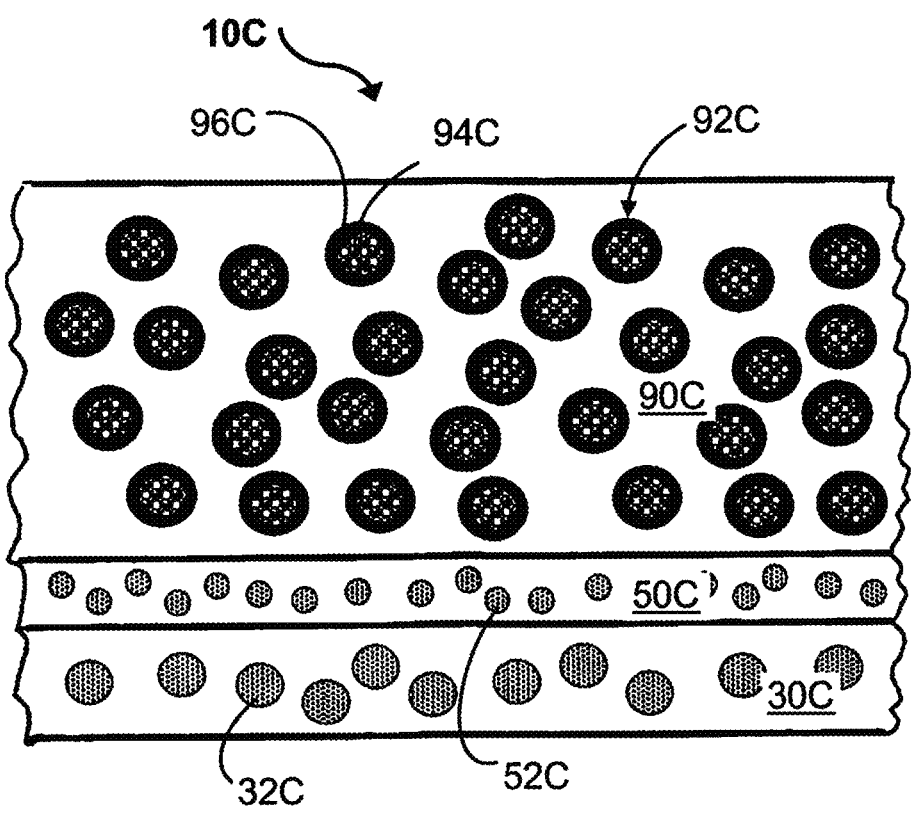
FIG. 1C is a cross-sectional view of an exemplary solid-state battery according to another embodiment.

FIG. 1C shows an exemplary solid-state battery, a solid-state battery layer structure 10C, according to an aspect of the invention. The solid-state battery layer structure 10C include a positive electrode layer 90C having a coated cathode active material 92C therein, a negative electrode layer 30C having an anode material 32C therein, and a solid-state electrolyte layer 50C sandwiched between the positive electrode layer 90C and the negative electrode layer 30C. In one embodiment, the solid-state electrolyte layer 50C includes a solid-state electrolyte material 52C therein, which is prepared using methods and systems of the invention as described below in FIGS. 2, 3, 6, 7, 8A, 8B, 8C, 8D, 8E, 8F, or another suitable processes according to one or more embodiments.

In another embodiment, the coated cathode active material 92C is prepared according to one or more embodiments of the invention and include particles of a cathode active material 96C (e.g., a battery cathode material being prepared using methods and systems of the invention or any other suitable battery cathode materials, etc.) which is coated with an outer layer of a solid-state electrolyte material 94C (e.g., a battery SSE material being prepared using methods and systems of the invention or any other suitable battery SSE materials, etc.). Coating of the particles of the cathode active material 96C with the solid-state electrolyte material 94C is performed using methods and systems as described below in FIGS. 4 and 5, or another suitable dry coating or wet coating processes. It is contemplated that blending of the solid-state electrolyte material 94C with the particles of a cathode active material 96C within the coated cathode active material 92C helps to facilitate the conductivity within the solid-state battery layer structure 10C.

Figure 1D:
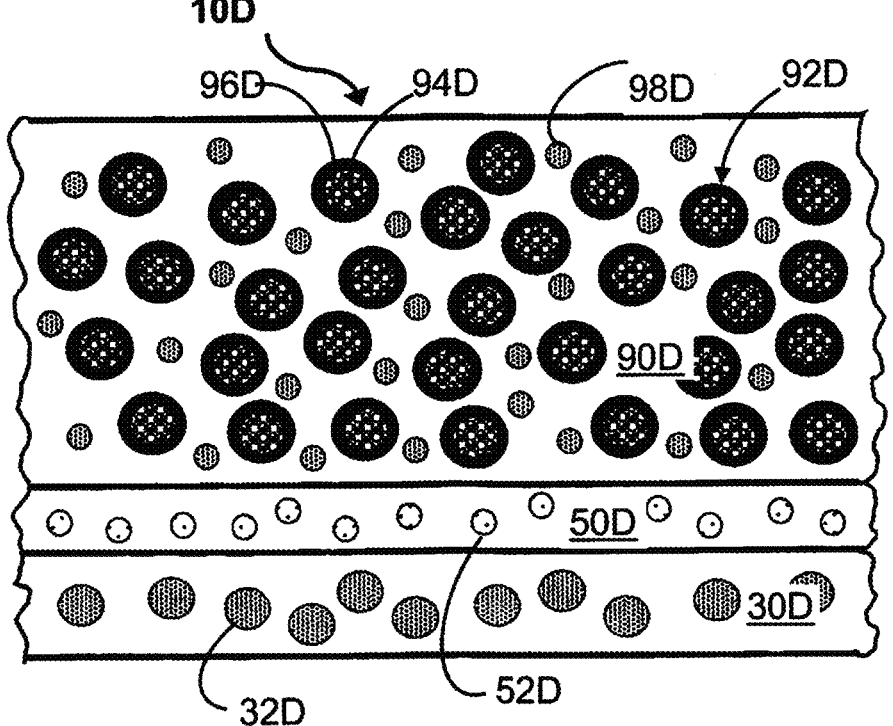
FIG. 1D is a cross-sectional view of an exemplary solid-state battery according to another embodiment.

FIG. 1D shows another example of a solid-state battery layer structure 10D, which includes a positive electrode layer 90D, a negative electrode layer 30C having an anode material 32D therein, and a solid-state electrolyte layer 50D sandwiched between the positive electrode layer 90D and the negative electrode layer 30D. The solid-state electrolyte layer 50D includes a solid-state electrolyte material 52D prepared using methods and systems of the invention as described below in FIGS. 2, 3, 6, 7, 8A, 8B, 8C, 8D, 8E, 8F, or another suitable processes, according to one or more embodiments.

In one embodiment, the positive electrode layer 90D include a mixture of coated cathode active materials 92D and a solid-state electrolyte material 98D, where they are mixed by a blending method using a blender or any other suitable apparatus. In another embodiment, the coated cathode active material 92D is prepared using methods and systems described as described herein according to one or more embodiments of the invention. For example, the coated cathode active material 92D may include particles of a cathode active material 96D coated with an outer layer of a solid-state electrolyte material 94D (e.g., a battery SSE material being prepared using methods and systems of the invention or any other suitable battery SSE materials, etc.). Coating of the particles of the cathode active material 96D with the solid-state electrolyte material 94D is performed using methods and systems as described below in FIGS. 4 and 5, or another suitable dry coating or wet coating processes.

In FIGS. 1A-1D, the thickness of the positive electrode layer, the solid-state electrolyte layer, and the negative electrode layer in a solid-state battery layer structure is not particularly limited. For example, the solid-state battery layer structure 10A, 10B, 10C, 10D may include one or more layers of the solid-state electrolyte layers (e.g., 2-3 layers or 10 layers of SSE layers, etc.) sandwiched between the positive electrode layer 90A, 90B, 90C, 90D and the negative electrode layer 30A, 30B, 30C, 30D.

Embodiments of the invention provide that the solid-state electrolyte materials 52A, 52B, 52C, 52D, 94B, 94C, 94D, 98D, and the cathode active materials 92A, 92B, 96C, 96D, are prepared using methods and systems of the invention as described below or another suitable processes, and these materials can be used to fabricate and syntheses solid-state batteries. Additional embodiments of producing the solid-state electrolyte materials or the cathode active materials can be found in U.S. patent application Ser. Nos. 13/900,915, 16/114,114, 16/747,450, 17/319,974, 17/319,974, 17/901, 796, 13/901,035, 16/104,841, 17/133,478, 17/970,342, 13/901,121, 15/846,094, 16/679,085, 17/899,048, and the disclosure of each and every aforementioned patent application is hereby incorporated by reference in its entirety.

In one embodiment, solid-state electrolyte materials in a solid-state battery according to an aspect of the invention includes the solid-state electrolyte layer 50A, 50B, 50C, 50D that contains the solid-state electrolyte material 52A, 52B, 52C, 52D. In another embodiment, the positive electrode layer within the solid-state battery may further include both the cathode active materials and the solid-state electrolyte materials that are mixed with the cathode active materials via direct blending, dry coating or wet coating processes.

In another embodiment, examples of solid-state electrolyte materials (e.g., solid-state electrolyte materials 52A, 52B, 52C, 52D, 94B, 94C, 94D, 98D as shown in FIGS. 1A-1D) may include, but are not limited to, oxide-based solid-state electrolytes, garnet-type solid-state electrolytes, sodium superionic conductor (NASICON)-type ($NaM_2$ $(PO_4)_3$ M=Ge, Ti, Zr) structures (e.g., lithium aluminum titanium phosphate oxide materials, $Li(Al, Ti)_2(PO_4)_3$, LATP, such as $Li_{1.5}Al_{0.5}Ti_{1.5}P_3O_{12}$, $Li_{1.4}Al_{0.4}Ti_{1.6}P_3O_{12}$, $Li_{1.6}Al_{00.6}Ti_{1.4}P_3O_{12}$, etc.), perovskite-type structure solid-state electrolytes (e.g., $Li_xLa_yTiO_3$, LLTO, etc.), transport properties of two-dimensional $Li_xM_{1/3}Nb_{1-x}Ti_xO_3$ (M=La, Nd) perovskite (ABO$_3$)-type oxides, $Li_{1.5}Al_{0.5}Ge_{1.5}P_3O_{12}$, $Li_{1.4}Al_{0.4}Ge_{1.6}P_3O_{12}$, $Li_{1.6}Ge_{0.6}Ti_{1.4}P_3O_{12}$, $Li_{12}Ge_{0.5}Al_{1.0}Si_{0.5}P_{1.0}O_{12}$, $Li_{10.59}Ge_{1.58}V_{0.9}P_{0.53}O_{12}$, sulfide SSE electrolyte materials (e.g., $Li_7P_3S_{11}$, $Li_3P_1S_4$, $Li_6P_1S_5Cl$, $Li_6P_1S_5Br_1$, $Li_6PiS_5I$, $Li_6P_1S_5F_1$, $Li_7P_2S_8I_1$, $Li_7P_2S_8Br_1$, $Li_7P_2S_8Cl_1$, $Li_7P_2S_8F_1$, $Li_{15}P_4S_{16}Cl_3$, $Li_{14.8}$ $Mg_{0.1}P_4S_{16}Cl_3$, $Li_{9.54}Si_{1.74}P_{1.4}S_{11.7}Cl_{0.3}$, $Li_{10}Ge_1P_2S_{12}$, $Li_{10}Si_1P_2S_{12}$, $Li_{10}Sn_1P_2S_{12}$, $Li_{10}Si_{0.3}Sn_{0.7}P_2S_{12}$, $Li_{10}Al_{0.3}Sn_{0.7}P_2S_{12}$, $Li_{11}Al_1P_2S_{12}$, $Li_{10}SiP_2S_{11.3}O_{0.7}$, $Li_{9.42}Si_{1.02}P_{2.1}S_{9.96}O_{2.04}$, etc.), Li superionic conductor (LISICON)-type structure oxide electrolytes, amorphous thin film solid-state electrolytes (e.g., Lithium phosphorous-oxynitride (LiPON), $Li_{2.88}P_{1.0}O_{3.73}N_{0.14}$, $Li_{1.9}Si_{0.28}P_{1.0}O_{1.1}N_{1.0}$, etc.), argyrodite-type solid-state electrolytes, lithium phosphorus sulfide ($Li_3PS_4$, LPS) solid-state electrolyte, $Li_7P_3S_{11}$, $Li_7P_2S_8$, $Li_{11-x}M_{2-x}P_{1+x}S_{12}$ (M=Ge, Sn, Si, etc.) (LGPS)-type structures, Li-argyrodite solid-state electrolyte (e.g., $Li_xPS_yX$ (where X═Cl, Br or I), $Li_6PS_5Cl$, $Li_6PS_5Br$, $Li_6PS_5I$, etc.), and combinations thereof.

The SSE materials can be undoped SSE materials or SSE materials doped with one or more metals or other atoms (e.g., La, Zr, Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, P, S, Os, Ir, Au, F, Cl, I, Br, and combinations thereof, etc.), such as those lithium oxide-based garnet type SSE materials that are doped with Al, Ge, Ti, Ta, etc.

Examples of the solid-state electrolyte materials 52A, 52B, 52C, 52D, 94B, 94C, 94D, 98D as shown in FIGS. 1A-1D may include, but are not limited to, one or more lithium-containing garnet type oxide-based solid-state electrolyte (SSE) materials with cubic or tetragonal crystal structure, lithium lanthanum zirconium oxide garnets, lithium lanthanum zirconium oxide garnets doped with Al, Ge, Ti, Ta, etc., such as $Li_7La_3Zr_2O_{12}$, $Li_7La_3Zr_2O_{12}$ doped with one or more metals, $Li_{6.75}La_3Zr_{1.75}Ta_{0.25}O_{12}$, $Li_{6.5}La_3Zr_2Al_{0.25}O_{12}$, $Li_{6.5}La_3Zr_2Al_{0.24}O_{12}$, $Li_{6.5}La_3Zr_2Al_{0.22}O_{12}$, $Li_{6.76}La_{2.87}Zr_{2.0}Al_{0.24}O_{12.35}$, $Li_{6.74}La_{2.96}Zr_{2.0}Al_{0.25}O_{12.45}$, $Li_{6.27}La_{3.22}Zr_{2.0}Al_{0.3}O_{12.39}$, $Li_{6.4}La_{2.86}Zr_{2.0}Al_{0.24}O_{11.98}$, $Li_{6.43}La_{2.93}Zr_{2.0}Al_{0.24}O_{12.08}$, $Li_{6.32}La_{3.2}Zr_{2.0}Al_{0.46}O_{12.9}$, $Li_{6.57}La_{2.99}Zr_{2.0}Al_{0.22}O_{12.22}$, $Li_{6.4}La_3Zr_2Al_{0.2}O_{12}$, $Li_{6.54}La_{2.82}Zr_{2.0}Al_{0.24}O_{12.08}$, $Li_{6.49}La_{3.28}Zr_{2.0}Al_{0.31}O_{12.7}$, $Li_{6.49}La_{3.02}Zr_{2.0}Al_{0.23}O_{12.2}$, $Li_{6.28}La_3Zr_2Al_{0.24}O_{12}$, $Li_{6.25}La_{3.01}Zr_{2.0}Al_{0.22}O_{11.92}$, $Li_{6.5}La_3Zr_{1.5}Ta_{0.5}O_{12}$, $Li_{6.15}La_3Zr_{1.75}Ta_{0.25}Al_{0.2}O_{12}$, $Li_{6.25}La_3Zr_2Al_{0.25}O_{12}$, $Li_{6.4}La_3Zr_2Ga_{0.2}O_{12}$, $Li_{6.15}La_3Zr_{1.75}Ta_{0.25}Ga_{0.2}O_{12}$, $Li_{6.25}La_3Zr_2Ta_{0.25}Ga_{0.2}O_{12}$, $Li_{6.4}La_3Zr_{1.4}Ta_{0.6}O_{12}$, $Li_3La_3Nb_2O_{12}$, $Li_3La_3$ $Ta_2O_{12}$, $Li_3La_3Ti_2O_{12}$, $Li_3La_3Sr_1Ta_2O_{12}$, $Li_6La_3Ba_1Ta_2O_{12}$, $Li_6La_3Ba_1Ti_2O_{12}$, $Li_{1.26}La_{2.24}Ti_4O_{12}$, $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$, $Li_{1.36}La_{2.24}Ti_4O_{12}$, $Li_{1.72}La_{2.24}Ti_{3.8}Ge_{0.2}O_{12}$, $Li_{1.72}$ $La_{2.24}Ti_{3.8}Ge_{0.2}O_{12}$, $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$, and combinations thereof.

In one embodiment, the chemical composition of the solid-state electrolyte material may be $Li_a$ $La_b$ $Zr_c$ $D1_d$ $D2_e \ldots DN_n$ $O_v$, where $6.25 \le a \le 7.2$, $2.8 \le b \le 3.5$, $1.2 \le c \le 2.2$, $2.0 \le v \le 12$, and at least one of $D_1, D_2, \ldots, D_N$ is a metal, $N \ge 0$, $0 \le d \le 0.8$, $0 \le e \le 0.8$, and $0 \le n \le 0.8$, where $D_1, D_2, \ldots, D_N$ is selected from the group consisting of Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, Cl, I, Br, and combinations thereof. For example, the solid-state electrolyte material is garnet type lithium lanthanum zirconium oxide material, including $Li_{6.75}La_3Zr_{1.75}Ta_{0.25}O_{12}$, $Li_{6.5}La_3Zr_{1.5}Ta_{0.5}O_{12}$, $Li_{6.15}La_3Zr_{1.75}Ta_{0.25}Al_{0.2}O_{12}$, $Li_{6.25}La_3Zr_2Al_{0.25}O_{12}$, $Li_{6.15}La_3Zr_{1.75}Ta_{0.25}Ga_{0.2}O_{12}$, $Li_{6.25}La_3Zr_2Ta_{0.25}$ $Ga_{0.2}O_{12}$.

In another embodiment, the solid-state electrolyte material is $Li_a$ $La_b$ $D1_e$ $D2_d \ldots DN_n$ $O_v$, where $4.5 \le a \le 7.2$, $2.8 \le b \le 3.5$, $1.5 \le c \le 2.5$, $0 \le d \le 1.2$, $0 \le n \le 1.2$, and $2 \le v \le 12$, and at least one of $D_1, D_2, \ldots, D_N$ is a metal, and $N \ge 1$. For example, the solid-state electrolyte material may be $Li_5La_3Nb_2O_{12}$, $Li_5La_3Ta_2O_{12}$, $Li_5La_3Ti_2O_{12}$, $Li_6La_3Sr_1Ta_2O_{12}$, $Li_6La_3Ba_1Ta_2O_{12}$, $Li_8La_3Ba_1Ti_2O_{12}$, $Li_{1.281}La_{2.24}Ti_4O_{12}$. In another example, the chemical composition of the solid-state electrolyte material is $Li_a$ $Al_b$ $P_c$ $D1_d \ldots DN_n$ $O_v$, wherein $1 \le a \le 2$, $0.2 \le b \le 1.5$, $1.0 \le c \le 3.5$, $0 \le d \le 2.0$, $0 \le n \le 2.0$, and $0.2 \le v \le 12$, and wherein at least one of $D_1, D_2, \ldots, D_N$ is a metal, and $N \ge 1$; for example, and $Li_{1.5}Al_{0.5}Ti_{1.5}P_3O_{12}$, $Li_{1.5}Al_{0.5}Ge_{1.5}P_3O_{12}$.

In another embodiment, the chemical composition of the solid-state electrolyte material may be $Li_a$ $P_b$ $S_c$ $D1_d \ldots DN_n X_v$, where $5 \le a \le 16$, $0.5 \le b \le 4.5$, $3 \le c \le 16$, $0 \le d \le 1.5$, $0 \le n \le 1.5$, $0 \le v \le 4$, and at least one of $D_1, D_2, \ldots, D_N$ is a metal, $N \ge 0$, and X is a halogen; for example, $Li_7P_3S_{11}$, $Li_3P_1S_4$, $Li_3P_1S_5Cl$, $Li_3P_1S_5Br_1$, $Li_3P_1S_5I$, $Li_6P_1S_5F_1$, $Li_7P_2S_8I_1$, $Li_7P_2S_8Br_1$, $Li_7P_2S_8Cl_1$, $Li_7P_2S_8F_1$, $Li_{15}P_4S_{16}Cl_3$, $Li_{14.8}Mg_{0.1}P_4S_{16}Cl_3$, $Li_{9.54}Si_{1.74}P_{1.44}S_{11.7}Cl_{0.3}$, $Li_{10}Ge_1P_2S_{12}$, $Li_{10}Si_1P_2S_{12}$, $Li_{10}Sn_1P_2S_{12}$, $Li_{10}Si_{0.3}Sn_{0.7}P_2S_{12}$, $Li_{10}Al_{0.3}Sn_{0.7}P_2S_{12}$, $Li_{11}Al_1P_2S_{12}$. In another embodiment, the solid-state electrolyte material is $Li_a$ $Ge_b$ $P_c$ $D1_d \ldots DN_n$ $O_v$, where $10 \le a \le 13$, $0.1 \le b \le 2.0$, $0.1 \le c \le 1.5$, $0.1 \le d \le 2.0$, $0.1 \le n \le 2.0$, $2 \le v \le 12$, and at least one of $D_1, D_2, \ldots, D_N$ is a metal, $N \ge 0$ for example, $Li_{12}Ge_{0.5}Al_{1.0}Si_{0.55}P_{1.0}O_{12}$, $Li_{10.59}Ge_{1.58}V_{0.9}P_{0.53}O_{12}$.

In FIGS. 1A-1D, the cathode active materials 92A, 92B, 94C, 94D can be metal oxide materials prepared using methods and systems of the invention as described in FIGS. 2-8F or another suitable processes and may include a lithium oxide materials with intercalated metals, preferably with three or four intercalated metals. Exemplary cathode active materials are metal oxide materials containing one or more lithium (Li), nickel (Ni), manganese (Mn), cobalt (Co), aluminum (Al), titanium (Ti), sodium (Na), potassium (K), rubidium (Rb), vanadium (V), cesium (Cs), copper (Cu), magnesium (Mg), iron (Fe), among others. In addition, the cathode materials can exhibit a crystal structure of metals in the shape of layered, spinel, olivine, etc. In addition, the cathode active materials 92A, 92B, 94C, 94D are generally solid powders with its particle size ranging between 10 nm and 100 um.

Exemplary cathode active materials include, but are not limited to, lithium transitional metal oxide ($LiMeO_2$), lithium titanium oxide (e.g., $Li_4Ti_5O_{12}$), lithium cobalt oxide (e.g., $LiCoO_2$), lithium manganese oxide (e.g., $LiMn_2O_4$), lithium nickel oxide (e.g., $LiNiO_2$), olivine-type lithium metal phosphates (e.g., $LiFePO_4$, $LiNiPO_4$, $LiCoPO_4$, $LiMnPO_4$, $Li_3Fe_2(PO_4)_3$, and $Li_3V_2(PO_4)_3$), sodium iron oxide (e.g., $NaFe_2O_3$), sodium iron phosphate (e.g., $NaFeP_2O_7$), among others include, but are not limited to, lithium nickel cobalt oxide (e.g., $Li_xNi_yCo_zO_2$), lithium nickel manganese oxide (e.g., $Li_xNi_yMn_zO_2$, $Li_xNi_yMn_zO_4$, $LiCoMnO_4$, $Li_2NiMn_3O_8$, etc.), lithium nickel manganese cobalt oxide (e.g., $Li_aNi_bMn_cCo_dO_e$ in layered structures or layered-layered structures; and/or $LiNi_xMn_yCo_zO_2$, a NMC oxide material where x+y+z=1, such as $LiNi_{0.33}Mn_{0.33}Co_{0.33}O_2$, $LiNi_{0.9}Mn_{0.05}Co_{0.05}O_2$, $LiNi_{0.6}Mn_{0.2}Co_{0.2}O_2$, $LiNi_{0.5}Mn_{0.3}Co_{0.2}O_2$, $LiNi_{0.4}Mn_{0.4}Co_{0.2}O_2$, $LiNi_{0.7}Mn_{0.15}Co_{0.15}O_2$, $LiNi_{0.8}Mn_{0.1}Co_{0.1}O_2$, etc.; and/or a mixed metal oxide with doped metal, among others. Other examples include lithium cobalt aluminum oxide (e.g., $Li_xCo_yAl_zO_n$), lithium nickel cobalt aluminum oxide (e.g., $Li_xNi_yCo_zAl_aO_b$, such as $LiNi_{0.85}Co_{0.1}Al_{0.05}O_2$), sodium iron manganese oxide (e.g., $Na_xFe_yMn_zO_2$), among others. In another example, a mixed metal oxide with doped metal is obtained; for example. $Li_a(Ni_xMn_yCo_z)MeO_b$ (where Me=doped metal of Al, Mg, Fe, Ti, Cr, Zr, or C), $Li_a(Ni_xMn_yCo_z)MeO_bF_c$ (where Me=doped metal of Al, Mg, Fe, Ti, Cr, Zr, or C), among others. Other examples of cathode active materials can be found in U.S. patent application Ser. Nos. 13/900,915, 16/114,114, 16/747,450, 17/319,974, 17/319,974, 17/901, 796, 13/901,035, 16/104,841, 17/133,478, 17/970,342, 13/901,121, 15/846,094, 16/679,085, 17/899,048, all of which are incorporated herein by reference in its entirety.

In FIGS. 1A-1D, the anode materials 32A, 32B, 32C, 32D can be alkali metals (such as lithium, sodium, potassium, etc.), other metals or transition metals (such as tantalum, titanium zinc, iron, the elements on the Group 2 of the periodic table (e.g., magnesium, calcium, etc.), the elements on Group 13 of the periodic table such as aluminum (Al), geranium (Ge), etc.), a carbonaceous material, and/or metal alloys of two or more of the aforementioned metals. Exemplary anode materials include but not limited to lithium metal, lithium alloys (e.g. lithium-aluminum alloys, lithium-tin alloys, lithium-lead alloys, and lithium-silicon alloys), lithium-containing metal oxides (e.g. lithium titanium oxide), lithium-containing metal sulfides, lithium-containing metal nitrides (e.g. lithium cobalt nitride, lithium iron nitride, lithium manganese nitride), and carbonaceous materials such as graphite, carbon-based materials such as lithium titanate ($Li_4Ti_5O_2$), SiO-based composites, SiO—Sn—Co/graphite (G) composites, Si, Sn—Co—C mixed composites, and lithium coated with a solid electrolyte.

FIG. 2 is a flow chart of a digital dynamic crystallization process of a method 100 of producing a battery material for solid-state batteries. The method 100 includes a step 110 of flowing a first gas into a power jetting chamber (e.g., the system as described in FIGS. 6-8F below) and mixing the first gas with a liquid mixture to form a gas-liquid mixture. At step 120, the gas-liquid mixture is jetted into a mist in a power jetting chamber. The flow of the gas may be pumped through an air filter to remove any particles, droplets, or contaminants, and the flow rate of the gas can be adjusted by a valve or other means. In one embodiment, the gas is heated to a temperature to mix with the mist and remove moisture from the mist. The first gas can be, for example, air, oxygen, carbon dioxide, nitrogen gas, hydrogen gas, inert gas, noble gas, and combinations thereof and can be at room temperature or heated to, for example, about 40° C. or higher, such as about 80° C. or higher, e.g., between 20° C. and 200° C., or at more than 50° C.

In one example, the mist of the liquid mixture is mixed with a flow of a carrying gas inside the mist generator prior to delivering into the power jetting chamber. In another example, the mist of the liquid mixture is mixed with a flow of a drying gas inside the power jetting chamber and carrying through the power jetting chamber to be dried. In another example, the mist of the liquid mixture is mixed with a gas flow of a gas inside a mist generator to form the gas-liquid mixture. In addition, the liquid mixture is mixed with a gas flow of another gas inside a power jetting chamber. It is contemplated that these gas flows are provided to thoroughly mix the liquid mixture to uniformly form into a mixture and assist in carrying the gas-liquid mixture inside the power jetting chamber.

The liquid mixture may include digitally-controlled stoichiometrically amounts of a lithium-containing salt, one or more inorganic salts containing one or more metals $D_1$, $D_2$, . . . , $D_N$. in one embodiment, $D_1$, $D_2$, . . . , $D_N$ is selected from the group consisting of La, Zr, Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, Cl, I, Br, and combinations thereof. In another embodiment, the molar ratio of the lithium-containing salt, and one or more salts-containing compounds $M_{LiSalt}:M_{Salt1}:M_{Salt2}:M_{Salt3}:$ . . . :$M_{SaltN}$ is adjusted to be a ratio of about a:b:c: . . . :n for making the battery materials at desirable atomic ratio of LiSalt:Salt1:Salt 2:Salt 3 . . . :Salt N equaling to a:b:c: . . . :n. In one embodiment, the liquid mixture is prepared using stoichiometrically amounts of lithium-containing salt and one or more inorganic salts and then mixed with a gas. The salts are prepared in solutions and the molar ratio of the solutions of lithium-containing salt and the one or more inorganic metal salt are digitally controlled by the processing system of the invention, thereby obtaining large scale synthesis of the SSE materials.

The mist of the liquid mixture is mixed with the flow of the first gas to form a gas-liquid mixture prior to and/or after the liquid mixture is inside the power jetting chamber. The mist is formed from a liquid mixture dissolved and/or dispersed in a suitable liquid solvent. The flow of one or more gases and the flow of the mist are mixed together to form a gas-liquid mixture. The gases may be, for example, air, oxygen, carbon dioxide, nitrogen gas, hydrogen gas, inert gas, noble gas, and combinations thereof, among others. The gases may be pumped through an air filter to remove any particles, droplets, or contaminants, and the flow rate of the gases can be adjusted by a valve or other means.

For example, a desired molar ratio of $M_{LiSalt}:M_{Salt1}:M_{Salt2}:M_{Salt3}:$ . . . :$M_{SaltN}$ can be achieved by measuring and preparing appropriate amounts a lithium-containing salt (LiSalt), a first salt-containing (Salt1), a second salt containing (Salt2), a third salt containing (Salt3), . . . , and a N salt containing (SaltN) according to the final compostions of the SSE to be synthesized. For example, the molar ratio of $M_{LiSalt}:M_{Salt1}:M_{Salt2}:M_{Salt3}:$ . . . $:M_{SaltN}$ of the lithium-containing salt (LiSalt), the first salt-containing (Salt1), the second salt containing (Salt2), the third salt containing (Salt3), . . . , and the N salt containing (SaltN) can be adjusted (e.g., manually or digitally using a processing system of the invention) and prepared directly into a liquid mixture in a desired stoichiometrically prior to forming the mist of the liquid mixture. As another example, the adjusting the molar ratio $M_{Li}:M_{Salt1}:M_{Salt2}:M_{Salt3}:$ . . . $:M_{SaltN}$ of the lithium-containing salt (LiSalt), the first salt-containing (Salt1), the second salt containing (Salt2), the third salt containing (Salt3), . . . , and the N salt containing (SaltN) can be performed simultaneously with forming the mist of the liquid mixture. In addition, liquid forms of the one or more salts-containing compound, can be adjusted and prepared directly into a liquid mixture in a desired concentration.

The liquid form of the salts-containing compound can be dissolved or dispersed in a suitable solvent (e.g., water, alcohol, methanol, isopropyl alcohol, isopropanol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3HO_3$), Nitric acid ($HNO_3$), hydrochloric acid (HCl), ethanol, pyridine, ammonia, acetone, and their combinations) to form into a liquid mixture of an aqueous solution, slurry, gel, aerosol or any other suitable liquid forms. Also, suitable salt-containing compounds can be chosen, depending on the desired composition of final solid product particles by measuring and preparing appropriate amounts of the lithium-containing salt, and the inorganic salts compounds into a container with suitable amounts of a solvent. Depending on the solubility of the lithium-containing salt, the inorganic salts in a chosen solvent, pH, temperature, and mechanical stirring and mixing can be adjusted to obtain a liquid mixture where the lithium-containing salt, the one or more metal-containing inorganic salts at the desirable molar concentrations are fully dissolved and/or evenly dispersed.

Exemplary lithium-containing salts include, but not limited to, lithium sulfate ($Li_2SO_4$), lithium nitrate ($LiNO_3$), lithium carbonate ($Li_2CO_3$), lithium acetate ($LiCH_3COO$), lithium hydroxide (LiOH), lithium formate ($LiCHO_2$), lithium chloride (LiCl), and combinations thereof. Exemplary inorganic salts include, but not limited to, lithium sulfate ($Li_2SO_4$), lithium nitrate ($LiNO_3$), lithium carbonate ($Li_2CO_3$), lithium acetate ($LiCH_3COO$), lithium hydroxide (LiOH), lithium formate ($LiCHO_2$), lithium chloride (LiCl), lanthanum trichloride ($LaCl_3$), lanthanum acetate ($C_6H_9LaO_6$), and lanthanum nitrate ($La(NO_3)_3$), lanthanum sulfate ($La_2(SO_4)_3$), lanthanum formate ($C_3H_3LaO_6$), cobalt sulfate ($CoSO_4$), cobalt nitrate ($Co(NO_3)_2$), cobalt acetate ($Co(CH_3COO)_2$), cobalt formate ($Co(CHO_2)_2$), cobalt chloride ($COCl_2$), magnesium nitrate ($Mg(NO_3)_2$), zirconium nitrate ($Zr(NO_3)_4$), zirconium acetate ($C_8H_{12}O_8Zr$), zirconium chloride ($ZrCl_4$), zirconium sulfate ($Zr(SO_4)_2$), zirconium formate ($C_4H_4O_8Zr$), titanium nitrate ($Ti(NO_3)_4$), titanium sulfate ($Ti(SO_4)_2$), titanium carbonate ($Ti(CO_3)_2$), titanium acetate ($Ti(CH_3COO)_4$), titanium hydroxide (Ti(OH)$_4$), titanium formate ($Ti(HCOO)_4$), titanium chloride ($TiCl_4$), ammonium phosphate (($NH_4)_3PO_4$), magnesium acetate (MgAc, $Mg(CH_3COO)_2$), magnesium chloride ($MgCl_2$), magnesium sulfate ($MgSO_4$), magnesium formate ($C_2H_2MgO_4$), aluminum nitrate ($Al(NO_3)_3$), aluminum acetate (AlAc, $C_6H_9AlO_6$), aluminum chloride ($AlCl_3$), aluminum sulfate ($Al_2(SO_4)_3$), aluminum formate ($Al(HCOO)_3$), manganese sulfate ($MnSO_4$), manganese nitrate ($Mn(NO_3)_2$), manganese acetate ($Mn(CH_3COO)_2$), manganese formate ($Mn(CHO_2)_2$), manganese chloride ($MnCl_2$), nickel sulfate ($NiSO_4$), nickel nitrate ($Ni(NO_3)_2$), nickel acetate ($Ni(CH_3COO)_2$), nickel formate ($Ni(CHO_2)_2$), nickel chloride ($NiCl_2$), titanyl nitrate ((TiO ($NO_3)_2$)), (P)-phosphate containing compound, aluminum (Al)-containing compound, magnesium (Mg)-containing compound, titanium (Ti)-containing compound, tantalum (Ta)-containing compound, sodium (Na)-containing compound, zirconium (Zr)-containing compound, germanium (Ge)-containing compound, tin (Sn)-containing compound, silicon (Si)-containing compound, bromine (Br)-containing compound, iodine (I)-containing compound, potassium (K)-containing compound, scandium (Sc)-containing compound, niobium (Nb)-containing compound, neodymium (Nd)-containing compound, lanthanum (La)-containing compound, cerium (Ce)-containing compound, silicon (Si)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, manganese (Mn)-containing compound, zinc (Zn)-containing compound, gallium (Ga)-containing compound, barium (Ba)-containing compound, actinium (Ac)-containing compound, calcium (Ca)-containing compound, iron (Fe)-containing compound, boron (B)-containing compound, arsenic (As)-containing compound, hafnium (Hf)-containing compound, Molybdenum (Mo)-containing compound, tungsten (W)-containing compound, rhenium (Re)-containing compound, ruthenium (Ru)-containing compound, rhodium (Rh)-containing compound, platinum (Pt)-containing compound, silver (Ag)-containing compound, osmium (Os)-containing compound, iridium (Ir)-containing compound, gold (Au)-containing compound, and combinations thereof.

Not wishing to be bound by theory, it is contemplated that, all of the required inorganic salt elements are first mixed in liquid phase (e.g., into a solution, slurry, or gel) using metal-containing salts as the sources of each metal element such that the different metals can be mixed uniformly at desired ratio. As an example, to prepare a liquid mixture of an aqueous solution, slurry or gel, one or more dopants with high water solubility can be used. For example, metal nitrate, metal sulfate, metal chloride, metal acetate, and metal format, etc., can be used. Organic solvents, such as alcohols, isopropanol, etc., can be used to dissolve and/or disperse metal-containing salt with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the compounds in a chosen solvent.

In one particular embodiment, the method 100 includes a series of adjusting a molar ratio $M_{LiSalt}:M_{LaSalt}:M_{ZrSalt}:$ $M_{D1Salt}:M_{D2Salt}:$ . . . $M_{DNSalt}$ of a lithium-containing salt (LiSalt), a lanthanum-containing salt, a zirconium-containing salt, and optionally one or more metal dopant-containing inorganic salts by preparing these salts soluble in a suitable solvent into a liquid mixture, where each of the one or more metal salts or metal dopant-containing salts are chosen according to compositin of the battery material to be made. The molar ratio $M_{LiSalt}:M_{LaSalt}:M_{ZrSalt}:M_{D1Salt}:M_{D2Salt}:$ . . . $M_{DNSalt}$ of the lithium-containing salt (LiSalt), the lanthanum-containing salt, the zirconium-containing salt, and the one or more metal dopant-containing salts is adjusted to be a ratio of about a:b:c:d:e: . . . :n for making the lithium oxide doped with one or more dopants (LiaLabZrcD1$_d$ D$_2$ . . . .

$DN_nOv$) at desirable atomic ratio of Li:La:Zr:D1: D2: . . . :DN equaling to a:b:c:d:e: . . . :n, where $6.2 \le a \le 7.2$, $2.8 \le b \le 3.5$, $1.2 \le c \le 2.2$, $2.0 \le v \le 12$, and where $N \ge 0$, $0 \le d \le 0.8$, $0 \le e \le 0.8$, . . . , and $0 \le n \le 0.8$.

Next, a liquid mixture having the lithium-containing salt at the molarity of $M_{LiSalt}$, the lanthanum-containing salt at the Molarity of $M_{LaSalt}$, the zirconium-containing salt, and optionally the one or more dopant-containing salts (e.g., a First Dopant-Containing Salt at a Molarity of $M_{D1Salt}$, a Second Dopant-Containing Salt at a Molarity of $M_{D2Salt}$, . . . $M_{DNSalt}$, etc.) for producing solid-state electrolyte materials optionally doped with one or more metal dopants with a targeting composition of $LiaLabZrcD1_d$ $D2_e$ . . . . $DN_nOv$, where the one or more dopant-containing salts comprising the first dopant-containing salt, the second dopant-containing salt, . . . , the N dopant-containing salt are generated, and where the liquid mixture achieves the molar ratio of $M_{LiSalt}:M_{LaSalt}:M_{ZrSalt}:M_{D1Salt}:M_{D2Salt}: . . . M_{DNSalt}$ at about of a:b:c:d:e: . . . :n. The mist of the liquid mixture may include droplets of various reactant solution, precursor solutions, etc., in homogenous forms, sizes, shape, etc. For example, the molar ratio $M_{LiSalt}:M_{LaSalt}:M_{ZrSalt}:M_{D1Salt}:$ $M_{D2Salt}: . . . M_{DNSalt}$ of the lithium-containing salt, the lanthanum-containing salt, the zirconium-containing salt, and optionally the one or more metal dopant-containing salts can be digitally adjusted, depending on the desired composition of final solid product particles. In one embodiment, optionally, the one or more dopants (D1, D2, . . . DN) are incorporated into the solid-state electrolyte materials, wherein D1, D2, . . . DN are different dopants.

For example, each of the one or more dopants (i.e. D1, D2, DN) can be selected from a group consisting of Al, Ti, Ta, F, Cl, I, Br, Mg, Mn, Zr, Zn, Nb, La, Ce, Sn, Ga, Ba, Ac, Ca, Sc, V, Cr, Fe, Cu, B, Ge, As, Hf, Mo, W, Re, Ru, Rh, Pt, Ag, Os, Ir, Au, and combinations thereof. Next, solid particles of a solid-state electrolyte material can be adjusted manually or digitally and prepared in desirable molar ratio and mixed into a liquid mixture, such as by adjusting, measuring and preparing appropriate amounts of the lithium-containing salt compound, the lanthanum-containing salt compound, the zirconium-containing salt compound, and optionally the one or more dopant-containing salts into one solution with suitable amounts of a solvent.

The mist of the liquid mixture may be generated by a mist generator, such as a nozzle, a sprayer, an atomizer, or any other mist generators. Most mist generators employ air pressure or other means to covert a liquid mixture into liquid droplets. The mist generator can be coupled to a portion of the power jetting chamber to generate a mist (e.g., a large collection of small size droplets) of the liquid mixture directly within the power jetting chamber. As an example, an atomizer can be attached to a portion of the power jetting chamber to spray or inject the liquid mixture into a mist containing small sized droplets directly inside the power jetting chamber. In general, a mist generator that generates a mist of mono-sized droplets are desirable. Alternatively, a mist can be generated outside the power jetting chamber and delivered into the power jetting chamber.

Desired liquid droplet sizes can be adjusted by adjusting the sizes of liquid delivery/injection channels within the mist generator. Droplet size ranging from a few nanometers to a few hundreds of micrometers can be generated. Suitable droplet sizes can be adjusted according to the choice of the mist generator used, the precursor compounds, the temperature of the power jetting chamber, the flow rate of the gas, and the residence time inside the power jetting chamber. As an example, a mist with liquid droplet sizes between one tenth of a micron and one millimeter is generated inside the power jetting chamber.

Not wishing to be bound by theory, in the method 100 of manufacturing a battery material using the lithium-containing salt, and the one or more dopant-containing salts, it is contemplated that the lithium-containing salt, the one or more salts and the one or more dopant-containing salts are prepared into a liquid mixture and then converted into droplets, each droplet will have the one or more liquid mixture uniformly distributed. Then, the moisture of the liquid mixture is removed by passing the droplets through the power jetting chamber and the flow of the gas is used to carry the mist within the power jetting chamber for a suitable residence time. It is further contemplated that the concentrations of the compounds in a liquid mixture and the droplet sizes of the mist of the liquid mixture can be adjusted to control the chemical composition, particle sizes, and size distribution of final solid product particles of the battery material. It is designed to obtain spherical solid particles from a thoroughly mixed liquid mixture of two or more precursors after jetting the mist of the liquid mixture into the power jetting chamber to carry out a reaction. In contrast, conventional solid-state manufacturing processes involve mixing or milling a solid mixture of precursor compounds, resulting in uneven mixing of precursors.

As shown in FIG. 2, the method 100 includes a step 130 of drying the gas-liquid mixture for a first reaction time period to undergo one or more oxidation reactions by delivering a second gas flow of a heated gas, thereby forming a gas-solid mixture inside the power jetting chamber after high temperature drying and oxidation reactions. The first reaction time period can be advantageously performed in high speed, such as less than 20 min, e.g., less than 10 min, less than 5 min, or even less than 2 min. The gas can be, for example, air, oxygen, carbon dioxide, nitrogen gas, hydrogen gas, inert gas, noble gas, and combinations thereof and may be heated to a high temperature, for example, about 100° C. or higher, such as about 200° C. or higher, e.g., between 200° C. and 500° C., or at more than 250° C., such as 350° C. or higher. The first reaction time period can be around 1 second to 1 hour. Optionally, additional gas flow may be used to perform oxidation and/or drying reaction. The additional gas may be, for example, air, oxygen, carbon dioxide, nitrogen gas, hydrogen gas, inert gas, noble gas, and combinations thereof, among others. The additional gas flow may be pumped through an air filter to remove any particles, droplets, or contaminants, and the flow rate of the additional gas can be adjusted by a valve or other means. The mist of the liquid mixture is dried (e.g., removing its moisture, liquid, etc.) at a temperature for a desired residence time and form into a gas-solid mixture with the flow of the gases within the power jetting chamber. As the removal of the moisture from the mist of the liquid mixture is performed within the power jetting chamber filled with the gases, a gas-solid mixture comprising of the gases and the compounds is formed. To illustrate, the liquid mixture is dried inside the power jetting chamber and the temperature inside the power jetting chamber is maintained via a heating element coupled to the power jetting chamber, where the heating element can be a suitable heating mechanism, such as wall-heated furnace, electricity powered heater, fuel-burning heater, etc. In addition, one embodiment of the invention provides that one or more gases flown within the power jetting chamber are used as the gas source for carrying out oxidation reaction, drying, evaporation, dehydration, and/or other reactions inside the power jetting chamber such that gas-liquid mixtures are dried into gas-solid mixtures. In another embodiment, the gases is heated to a temperature to mix with the mist and remove moisture from the mist.

In one configuration, the gas is pre-heated to a temperature of about 200° C. or higher prior to jetting into the power jetting chamber. In another configuration, drying the mist can be carried out by heating the power jetting chamber directly, such as heating the chamber body of the power jetting chamber. For example, the power jetting chamber can be a wall-heated furnace to maintain the temperature within internal plenum of the power jetting chamber. The advantages of using heated gas are fast heat transfer, high temperature uniformity, and easy to scale up, among others. The power jetting chambers may be any chambers, furnaces with enclosed chamber body, such as a dome type ceramic power jetting chamber, a quartz chamber, a tube chamber, etc. Optionally, the chamber body is made of thermal insulation materials (e.g., ceramics, etc.) to prevent heat loss during reaction.

In another embodiment, the gases flown within the power jetting chamber is heated and the thermal energy of the heated gas is served as the energy source for carrying out reaction, oxidation, drying, evaporation, dehydration, and/or other reactions inside the power jetting chamber. The gas can be heated to a temperature by passing through a suitable heating mechanism, such as electricity powered heater, fuel-burning heater, etc. The temperature is about 200° C. or higher, for example, from 200° C. to 300° C., such as 250° C. For instance, the liquid mixture is dried in the presence of the second gas that is heated to 200° C. or higher inside the power jetting chamber and the second gas is delivered into the power jetting chamber to maintain the temperature inside the power jetting chamber. The gases may be, for example, air, oxygen, carbon dioxide, nitrogen gas, hydrogen gas, inert gas, noble gas, and combinations thereof, among others. For example, heated air can be used as an inexpensive gas source and energy source for drying the mist. The choice of the gases may be a gas that is heated to a high temperature so as to be mixed with the gas-liquid mixture and dry the gas-liquid mixture without reacting to the compounds. In some cases, the chemicals in the droplets/mist may react to the gases and/or to each other to certain extent during drying, depending on the temperature and the chemical composition of the compounds. In addition, the residence time of the mist of thoroughly mixed compounds within the power jetting chamber is adjustable and may be, for example, between one second and one hour, depending on the flow rate of the gases, and the length and volume of the path that the mist has to flow through within the power jetting chamber. The gas flows may be pumped through an air filter to remove any particles, droplets, or contaminants, and the flow rate of the gases can be adjusted by a valve or other means. Accordingly, one embodiment of the invention provides that the gases are used as the gas source for carrying out reaction, oxidation, drying, evaporation, dehydration, and/or other reactions. In another embodiment, the gases are heated to a temperature to mix with the mist and remove moisture from the mist. The gas-liquid mixture is being dried into the gas-solid mixture within the power jetting chamber using the heated gases flow continuously and/or at adjustable, variable flow rates.

At step 140, the gas-solid mixture is delivered out of the power jetting chamber and at step 150 the dried the gas-solid mixture are separated into one or more solid particles of a battery material by a gas-solid separator. For example, the dried gas-solid mixture are carried by gases, as a thoroughly-mixed gas-solid mixture, through a path within the power jetting chamber, and as more gases is flown in, the gas-solid mixture is delivered out of the power jetting chamber and continuously delivered to a gas-solid separator connected to the power jetting chamber to separate the gas-solid mixture into waste products and one or more solid particles of a SSE-battery material.

Next, at step 160, the one or more solid particles of the battery material are delivered into an annealing chamber to undergo a dynamic crystallization process, and at step 170, the one or more solid particles of the battery material are annealed for a second reaction time period in the presence of a third gas flow to form and obtain crystalline products of the battery material to be used in solid-state battery. The second reaction time period can be more than 1 hour, more than 2 hours, more than 4 hours, more than 8 hours, or even longer. In addition, steps 150, 160 and 170 can be repeated in a dynamic crystallization process to obtain better crystalline structures.

Reactions of the one or more solid particles of the battery materials within the annealing chamber may include any of oxidation, reduction, decomposition, combination reaction, phase-transformation, re-crystallization, single displacement reaction, double displacement reaction, combustion, isomerization, and combinations thereof. For example, the one or more solid particles of the battery materials may be oxidized and properly aligned into crystalline structure. Exemplary third gases include, but not limited to air, oxygen, carbon dioxide, an oxidizing gas, nitrogen gas, inert gas, noble gas, hydrogen gas, and combinations thereof. For an oxidation reaction inside the annealing chamber, an oxidizing gas can be used as the gas for annealing. If desired, the gases can be oxygen with high purity; the purity of the oxygen is more than 50%, for example more than 80%, such as 95%. Accordingly, the gas flows within the annealing chamber is served as the energy source for carrying out reaction, oxidation, and/or other reactions inside the annealing chamber.

The annealing temperature can be, for example, of 400° C. or higher for a residence time to obtain battery materials. For example, the annealing temperature can be more than 600° C., more than 700° C., more than 800° C., more than 900° C., such as 750° C. or higher, 850° C. or higher, 950° C. or higher, 1050° C. or higher, 1150° C. or higher. The residence time is about 1 second to 30 hours.

In one embodiment, the gas flown within the annealing chamber is heated and the thermal energy of the heated gas is served as the energy source for carrying out annealing reaction, and/or other reactions inside the annealing chamber. The gas can be heated to a temperature of 550° C. or higher by passing through a suitable heating mechanism, such as electricity powered heater, fuel-burning heater, etc. For instance, the one or more solid particles of the battery materials are annealed in the presence of the third gas that is heated to 550° C. or higher inside the annealing chamber and the gas is delivered into the annealing chamber to maintain the annealing temperature inside the annealing chamber. The gas may be, for example, air, oxygen, carbon dioxide, nitrogen gas, hydrogen gas, inert gas, noble gas, and combinations thereof, among others. For example, heated air can be used as an inexpensive gas source and energy source for drying the mist. In addition, the residence time within the annealing chamber is adjustable and may be, for example, between one second and one hour, depending on the flow rate of the gas, and the length and volume of the path that the solid particles have to pass through within the annealing chamber.

Another embodiment of the present invention is that the one or more solid particles of the battery materials are annealed inside the annealing chamber with its temperature is maintained via a heating element coupled to the annealing chamber, where the heating element can be a suitable heating mechanism, such as wall-heated furnace, electricity powered heater, fuel-burning heater, etc. In one configuration, the third gas is pre-heated to a temperature of about 550° C. or higher prior to flowing into the annealing chamber. In another configuration, annealing the one or more solid particles of the battery materials can be carried out by heating the annealing chamber directly, such as heating the chamber body of the annealing chamber. For example, the annealing chamber can be a wall-heated furnace to maintain the annealing temperature within internal plenum of the annealing chamber. The advantages of using heated gas are fast heat transfer, high temperature uniformity, and easy to scale up, among others. The annealing chambers may be any chambers, furnaces with enclosed chamber body, such as a dome type ceramic annealing chamber, a quartz chamber, a tube chamber, etc. Optionally, the chamber body of the annealing chamber is made of thermal insulation materials (e.g., ceramics, etc.) to prevent heat loss during annealing process.

Optionally, at step 180, the battery material is cooled to room temperature. In addition, the crystalline products are then milled so as to obtain nano-sized particles of the battery material, e.g., the SSE material, the cathode active material, etc., using the process described in FIG. 3 and a milling apparatus or any other suitable process and apparatus. For example, the battery material can be milled by a jet milling apparatus into nano sizes, such as 10 nanometers or larger, e.g., between 20 nanometers and 500 microns, between 100 microns and 300 microns in sizes.

For example, the temperature of the final solid product particles of battery materials may be slowly cooled down to room temperature to avoid interfering or destroying a process of forming into its stable energy state with uniform morphology and desired crystal structure. In another example, the cooling stage may be performed very quickly to quench the reaction product such the crystal structure of the solid particles of the reaction product can be formed at its stable energy state. As another example, a cooling processing stage in a multi-stage continuous process may include a cooling module comprised of one or more cooling mechanisms. Exemplary cooling mechanisms may be, for example, a gas-solid separator, a heat exchanger, a gas-solid feeder, a fluidized bed cooling mechanism, and combinations thereof, among others.

Accordingly, properly crystalized crystalline products of a desired SSE material can be obtained in spherical clusters under scanning electronic microscopy (SEM) analysis in micron sized, such as between 1 micron and 300 microns, e.g., between 10 microns and 100 microns in sizes. It is contemplated that the sizes of the battery material obtained are controlled by the droplet sizes of the mist used at step 120 using the mist generator within the power jetting chamber and desirable sizes of various battery material can be adjustably obtained.

In the method 100 of preparing solid particles of a battery material in multiple stages, it is contemplated to perform one or more reactions in a jetting stage, a drying stage, an oxidizing stage, two or more annealing reaction stages, one or more milling stages, one or more cooling stages, etc., in order to obtain nano-sized final solid product particles of battery materials at desired sizes, morphology and crystal structures, which are ready for further battery applications.

Not wishing to be bound by theory, it is designed to perform the reaction of the compounds in two or more reaction stages to allow sufficient time and contact of the compounds to each other, encourage nucleation of proper crystal structure and proper folding of particle morphology, incur lower-thermodynamic energy partial reaction pathways, ensure thorough reactions of all compounds, and finalize complete reactions, among others. Additional reaction modules can also be used. In one embodiment, the reaction module includes one anneal reaction to react and oxidize the one or more solid particles of battery materials into a reaction product, where a portion of them are partially reacted or oxidized. Other reaction module includes annealing the reaction product one or more times into final solid battery material particles to ensure complete reactions of all the reaction products. Accordingly, the method 100 may include a processing stage of jetting a mist of a liquid mixture and obtaining one or more solid particles of an solid-state electrolyte material using a processing module comprised of a power jetting chamber and a gas-solid separator. The method 100 may further include another processing stage of reacting, oxidizing and annealing the one or more solid particles of battery materials using a reaction module comprised of an annealing chamber.

FIG. 3 is a flow chart showing a method 200 of producing an exemplary solid-state electrolyte materials for solid-state batteries. The method 200 includes a step 202 of milling the solid-state electrolyte materials to obtain final solid product particles of solid-state electrolyte materials at desired size, morphology and crystal structure. In one embodiment, the solid-state electrolyte materials can be milled by jet milling, mortar milling, hydraulically milling, electronically milling, mechanically milling, or combinations thereof. In one embodiment, the solid-state electrolyte materials are polished and/or milled down to less than less than 900 nm, less than 800 nm, less than 500 nm, or less than 300 nm, preferably less than 100 nm, preferably less than 90 nm, preferably less than 80 nm, preferably less than 70 nm, preferably less than 60 nm, preferably less than 50 nm, preferably less than 40 nm, preferably less than 30 nm, preferably less than 20 nm, preferably less than 10 nm, preferably less than 5 nm. In another embodiment, the solid-state electrolyte materials are polished and/or milled down to nanoparticles having size estimated at a range from 1 nm to 100 nm; such as 10 nm to 20 nm; such as 10 nm to 90 nm; such as 10 nm to 50 nm; such as 10 nm to 40 nm; such as 10 nm to 70 nm; such as 20 nm to 80 nm; such as 20 nm to 60 nm; such as 20 nm to 50 nm; such as 30 nm to 70 um; such as 20 nm to 50 nm; such as 40 nm to 70 nm; such as 50 nm to 70 nm; such as 10 nm to 30 nm; such as 15 nm to 40 nm; such as 20 nm to 40 nm; such as 30 nm to 60 nm.

Secondly, the solid-state electrolyte materials can be pressed into pellets for measuring its ionic conductivity, as shown in FIG. 3, the method 200 includes a step 204 of pressing powders of solid-state electrolyte materials into pellet forms of the pressed solid-state electrolyte materials. In one embodiment, powder of solid-state electrolyte material is pressed, either hydraulically, electronically, or mechanically, in a range of 20 mm dies in multiple consecutive steps, for example more than two steps; for example more than three steps; for example more than four steps; for example more than five steps; for example more than six steps; for example more than seven steps; for example more than eight steps; for example more than nine steps; for example more than ten steps. For example, the solid-state electrolyte material is first pressed at 5-10 metric tons, then 10-15 metric tons and the final 12-20 metric tons to form a dense pellet. As another example, the solid-state electrolyte material is pressed first at 5-7 metric tons, then 7-10 metric tons and the final 11-14 metric tons to form a dense pellet. Yet another example, the solid-state electrolyte material is pressed first at 3-15 metric-tons, then 8-20 metric-tons and the final 20-30 metric-tons to form a dense pellet.

The approximate density of the pellets was more than 50%, preferably more than 60%, preferably more than 70%, preferably more than 75%, preferably more than 78%, preferably more than 80%, preferably more than 85%, preferably more than 90%, preferably more than 92%, preferably more than 95%, preferably more than 97%, preferably more than 99%.

In another embodiment, the pellet forms of the pressed solid-state electrolyte materials having a diameter of 5 mm or larger, such as 10 mm or larger, between 15 mm and 25 mm, preferably between 17 mm to 22 mm, or any other suitable diameter depending on the press and its mold used, e.g., a cold isostatic press (CIP) or any suitable press. In still another embodiment, the pellet forms of the pressed solid-state electrolyte materials having a thickness of less than 1.5 mm, or less than 1.0 mm, such as 400 micron or larger, or 500 micron or larger, e.g., between 550 micron and 750 micron, or any other suitable thickness depending on the press and its mold used.

The method 200 may optionally include a step 206 of adding the pellet forms of the pressed solid-state electrolyte ("SSE") materials with additional solid-state electrolyte (SSE) materials. In one embodiment, the pellet forms of the pressed solid-state electrolyte ("SSE") materials are cover with additional solid-state electrolyte (SSE) materials to make up the loss of lithium.

At step 208, the pellet forms of the pressed solid-state electrolyte (SSE) materials are sintered at desired processing conditions to obtain the pellet forms of the final solid-state electrolyte materials to be used in a battery. In one embodiment, the pellet forms of the formed pellets are sintered in a temperature range of 900° C. and 1300° C., such as 1000° C. and 1300° C., such as 1100° C. and 1300° C., such as 900° C. and 1200° C., such as 900° C. and 1100° C., such as 1000° C. and 1200° C., such as 1100° C. and 1200° C., such as 1150° C. and 1200° C. inside a furnace, e.g. annealing reactor, muffle furnace, push plate furnace, or a roller furnace, etc. Optionally, at step 210, the surface of the pellet forms of the final solid-state electrolyte materials is polished, e.g., using sandpaper or other polishing techniques, into a desired thickness and surfaces.

FIGS. 4-5 illustrate embodiments of a method 210 and a method 220 of coating a cathode active material with a solid-state electrolyte material and forming coated cathode active materials 92C, 92D. In FIG. 4, the method 210 is a wet coating process which includes a step 211 of forming a coating solution by dissolving a first amount of solid metal salts or a SSE material in solvents. At step 213, a coating mixture is formed by mixing the coating solution with an amount of solid particles of a battery material to be coated with the solid metal or the SSE material within a first time period.

In general, two or more metal salts in liquid form can be prepared directly into a liquid mixture in a desired concentration. Solids of two or more metal-containing salts in solid form can be dissolved or dispersed in a suitable solvent (e.g., water, alcohol, methanol, isopropyl alcohol, isopropanol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), Nitric acid ($HNO_3$), hydrochloric acid (HCl), ethanol, pyridine, ammonia, acetone, and their combinations) to form into a liquid mixture of an aqueous solution, slurry, gel, aerosol or any other suitable liquid forms. Two or more metal salts can be used, depending on the desired composition of a final reaction product. For example, two or more solid metal salts can be prepared in desirable molar ratio and mixed into a liquid mixture, such as by measuring and preparing appropriate amounts of the two or more solid metal salts into a container with suitable amounts of a solvent. Depending on the solubility of the precursors in a chosen solvent, pH, temperature, and mechanical stirring and mixing can be adjusted to obtain a liquid mixture where one or more precursor compounds at the desirable molar concentrations are fully dissolved and/or evenly dispersed.

Another aspect of the present invention is a liquid mixture made up of two or more different soluble solutions with a desired molar ratio to produce a solid-state electrolyte material in a solid-state battery that exhibits high capacity. This provides for the precise control of and the ability to obtain specific molar ratios at the atomic level as well as to produce the desired make-up of a solid-state electrolyte material as a coating solution used for the making of solid-state battery material. The soluble solutions of the liquid mixture include each metal-containing salt dissolved in appropriate solvents to achieve specific molarities of metal-containing salts solutions, which are mixed together to form a liquid mixture of a desired molar ratio for the making of solid-state electrolyte materials. The said process of making the liquid mixture is efficient for the making of the active material that has highly pure, accurate stoichiometric phases. This provides for a solid-state battery with desired properties such as a high Coulombic efficiency and a high nominal capacity.

Next, at step 215, the coating mixture is dried inside an oven or other suitable machine, at a first temperature for a second time period, and dried solid powders of a coated battery material coated with the solid metal or the SSE material are obtained. The first temperature is about 100° C. or higher, or 150° C. or higher, for example, from 200° C. to 300° C., such as 250° C. The second time period is around ten minutes or long, for example, between ten minutes and one hours, such as thirty minutes.

At step 217, the dried solid powders is annealed inside a furnace (e.g. muffle furnace, annealing chamber, etc.) at a second temperature for a third time period and in the presence of a gas, e.g., oxygen ($O_2$), to form powders of a coated battery material. For example, a flow of high purity of gas or oxygen is flown inside an anneal reactor (e.g. muffle furnace) to serve as the energy source for oxidizing and/or reacting the various types of unreacted, partially and/or completely reacted metal-containing solid particles into fifth weight amount of powders of a coated battery material. In one aspect, the purity of the oxygen is more than 50%, for example more than 80%, such as 90%, 95%, or 97%. In one embodiment, the second temperature is more than 600° C., for example, between 650° C. to 800° C., such as 750° C. The third time period is about 15 min or longer, such as one hour or longer, for example, between one hour and ten hours, such as eight hours.

At step 219, the powders of a coated battery materials are grinded and sieved into obtain final coated battery materials. In one embodiment, step 219 includes milling the powders of the coated battery materials into separated material powders, and sieving the separated material powders to a desired particle size to obtain an amount of the final coated battery material.

FIG. 5 shows an example of a dry coating method, the method 220, to coat solid particles of a battery material with the solid metal or the SSE material, including a step 222 of preparing particles of battery cathode materials with a pre-treatment agent to be ready for dry coating. At step 224, powders of a solid-state electrolyte material (SSE) are blended with particles of a battery cathode materials (BCM) in a ratio of $X_{SSE}:Y_{BCM}$ into a mixture inside a mixer or blender, e.g., a high energy mixer at first for 1 min at 500 rpm, to homogeneously mix the two powders. After mixing, the powder intensity of the blender can be increased to 2000 rpm for 6 min to deagglomerate the two powders into smaller aggregates so the SSE material can adhere at the surface of BCM.

In one embodiment, the ratio of $X_{SSE}:Y_{BCM}$ can be range from 1-50: 50-99 wt %, such as from 1-40: 60-99 wt %; such as from 1-30: 70-99 wt %; such as from 5-40: 60-95 wt %; such as from 5-30: 70-95 wt %; such as from 5-20: 80-95 wt %; such as from 10-40: 60-90 wt %; such as from 10-30: 70-90 wt %; such as from 10-20: 80-90 wt %; such as from 15-50: 50-85 wt %; such as from 15-40: 60-85 wt %; such as 15-30: 70-85 wt %, such as from 15-35: 65-85 wt %; such as from 20-30: 70-80 wt %; such as from 20-40: 60-80 wt %; such as from 20-50: 50-80 wt %; such as from 20-50: 50-80 wt %; such as from 30-50: 50-70 wt %; such as from 30-60: 40-70 wt %; such as from 30-40: 60-70 wt %; such as from 35-50: 50-65 wt %; such as from 35-30: 70-65 wt %; such as from 35-40: 60-65 wt %; such as from 40-50: 50-60 wt %; such as from 45-50: 50-55 wt %.

In one embodiment, the ratio of $Y_{BCM}:X_{SSE}$ can be range from 1-50: 50-99 wt %, such as from 1-40: 60-99 wt %; such as from 1-30: 70-99 wt %; such as from 5-40: 60-95 wt %; such as from 5-30: 70-95 wt %; such as from 5-20: 80-95 wt %; such as from 10-40: 60-90 wt %; such as from 10-30: 70-90 wt %; such as from 10-20: 80-90 wt %; such as from 15-50: 50-85 wt %; such as from 15-40: 60-85 wt %; such as 15-30: 70-85 wt %, such as from 15-35: 65-85 wt %; such as from 20-30: 70-80 wt %; such as from 20-40: 60-80 wt %; such as from 20-50: 50-80 wt %; such as from 20-50: 50-80 wt %; such as from 30-50: 50-70 wt %; such as from 30-60: 40-70 wt %; such as from 30-40: 60-70 wt %; such as from 35-50: 50-65 wt %; such as from 35-30: 70-65 wt %; such as from 35-40: 60-65 wt %; such as from 40-50: 50-60 wt %; such as from 45-50: 50-55 wt %.

Next, at step 226, final coated cathode materials (FCCM) having particles of battery cathode materials (BCM) coated and surrounded with solid-state electrolyte material (SSE) are obtaied. In one embodiment of the dry coating process, the larger core particles can be coated directly with the smaller fine particles by external mechanical forces without using any solvents and binders. In another embodiment, a single particle of cathode material is able to be successfully coated with the fine particles of solid-state electrolyte material. At step 228, the final coated cathode materials (FCCM) are used as a cathode to be fabricate into a solid-state battery.

For obtaining the coated positive electrode active materials 92C, 92D, the solid-state electrolyte material 96C, 96D can be coated onto the cathode active material 94C, 94D using the wet coating process or the dry coating process, as shown FIG. 4 and FIG. 5, respectively. In one embodiment of the dry coating process, the larger core particles can be coated directly with the smaller fine particles by external mechanical forces without using any solvents and binders. In another embodiment, a single particle of cathode material is able to be successfully coated with the fine particles of solid-state electrolyte material. For example, the dry coating process includes dry powder mixing, powder to film formation and film to current collector lamination; all executed in a solventless fashion. In another embodiment, the wet coating process includes mixing the active cathode battery materials, solid-state electrolyte materials, and an organic or inorganic solvents such as water, alcohol, methanol, isopropyl alcohol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), Nitric acid ($HNO_3$), hydrochloric acid (HCl), ethanol, pyridine, ammonia, acetone, and their combinations, the mixture to obtain a coated solid-state electrolyte materials.

Figure 6:
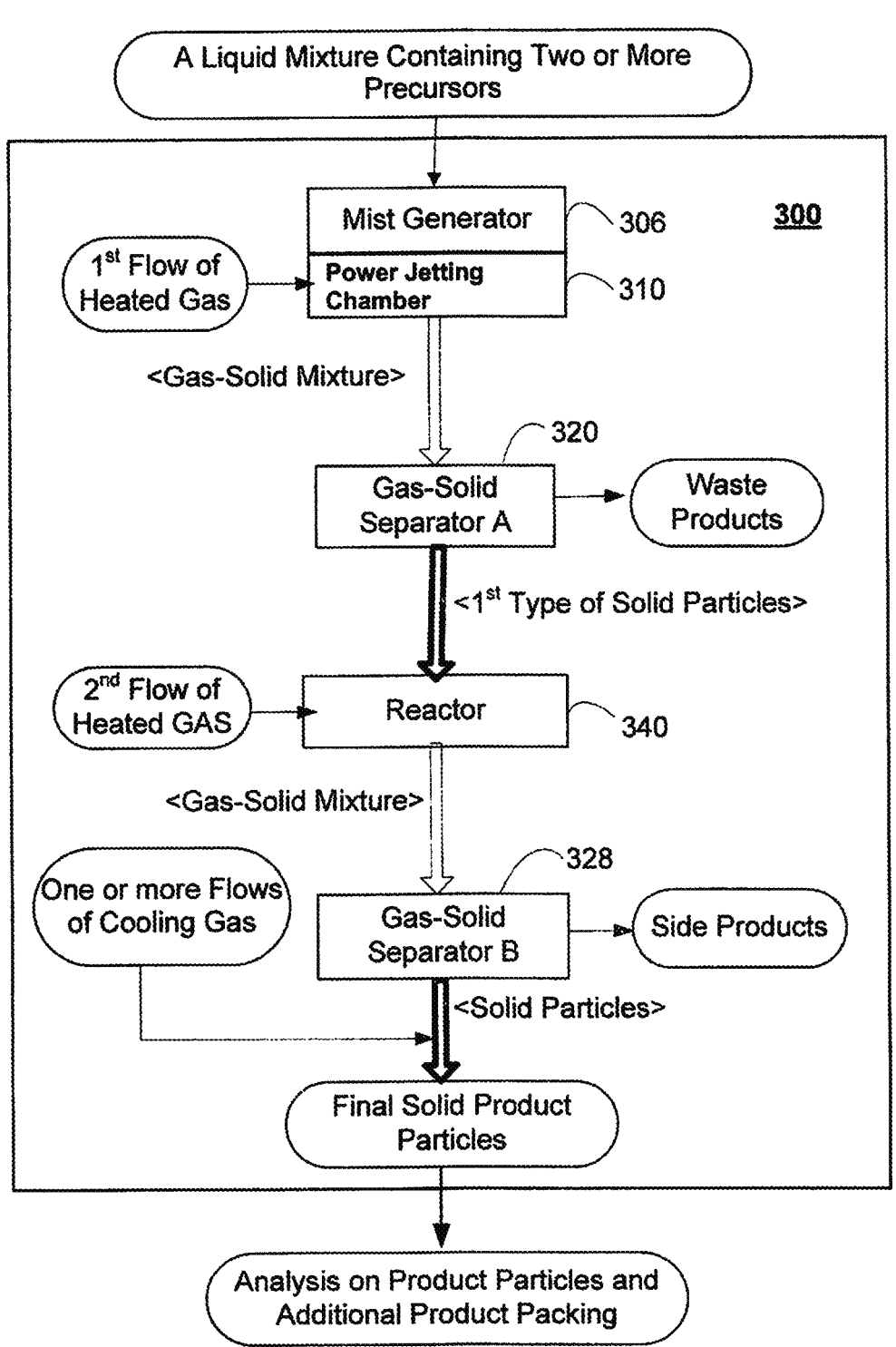
FIG. 6 is a schematic of an exemplary processing system useful in preparing a material for a battery electrochemical cell according to one embodiment of the invention.

FIG. 6 illustrates a flow chart of incorporating the method 100 of preparing a material for a battery electrochemical cell using a system 300 fully equipped with all of the required manufacturing tools. The system 300 generally includes a mist generator 306, a power jetting chamber 310, a power jet module 314, a gas-solid separator 320, and a reactor 340. First, a liquid mixture containing two or more precursors is prepared and delivered into the mist generator 306 of the system 300. The mist generator 306 is coupled to the power jetting chamber 310 and adapted to generate a mist from the liquid mixture. A flow of heated gases can be flowed into the power jetting chamber 310 to fill and pre-heat an internal volume of the power jetting chamber 310 prior to the formation of the mist or at the same time when the mist is generated inside the power jetting chamber 310. The mist is mixed with the heated gas and its moisture is removed such that a gas-solid mixture, which contains the heated gases, two or more precursors, and/or other gas-phase waste product or by-products, etc., is formed.

Next, the gas-solid mixture is continuously delivered into the gas-solid separator 320 which separates the gas-solid mixture into solid particles and waste products. The solid particles is then delivered into the reactor 340 to be mixed with a flow of heated gas and form a gas-solid mixture. The reaction inside the reactor is carried out for a reaction time until reaction products can be obtained. Optionally, the reaction product gas-solid mixture can be delivered into a gas-solid separator (e.g., a gas-solid separator 328) to separate and obtain final solid product particles and a gaseous side product. In addition, one or more flows of cooling fluids (e.g., gases or liquids) may be used to cool the temperature of the reaction products. The final solid product particles can be delivered out of the system 300 for further analysis on their properties (e.g., specific capacity, power performance, battery charging cycle performance, etc.), particle sizes, morphology, crystal structure, etc., to be used as a material in a battery cell. Finally, the final particles are packed into a component of a battery cell.

Figure 7:
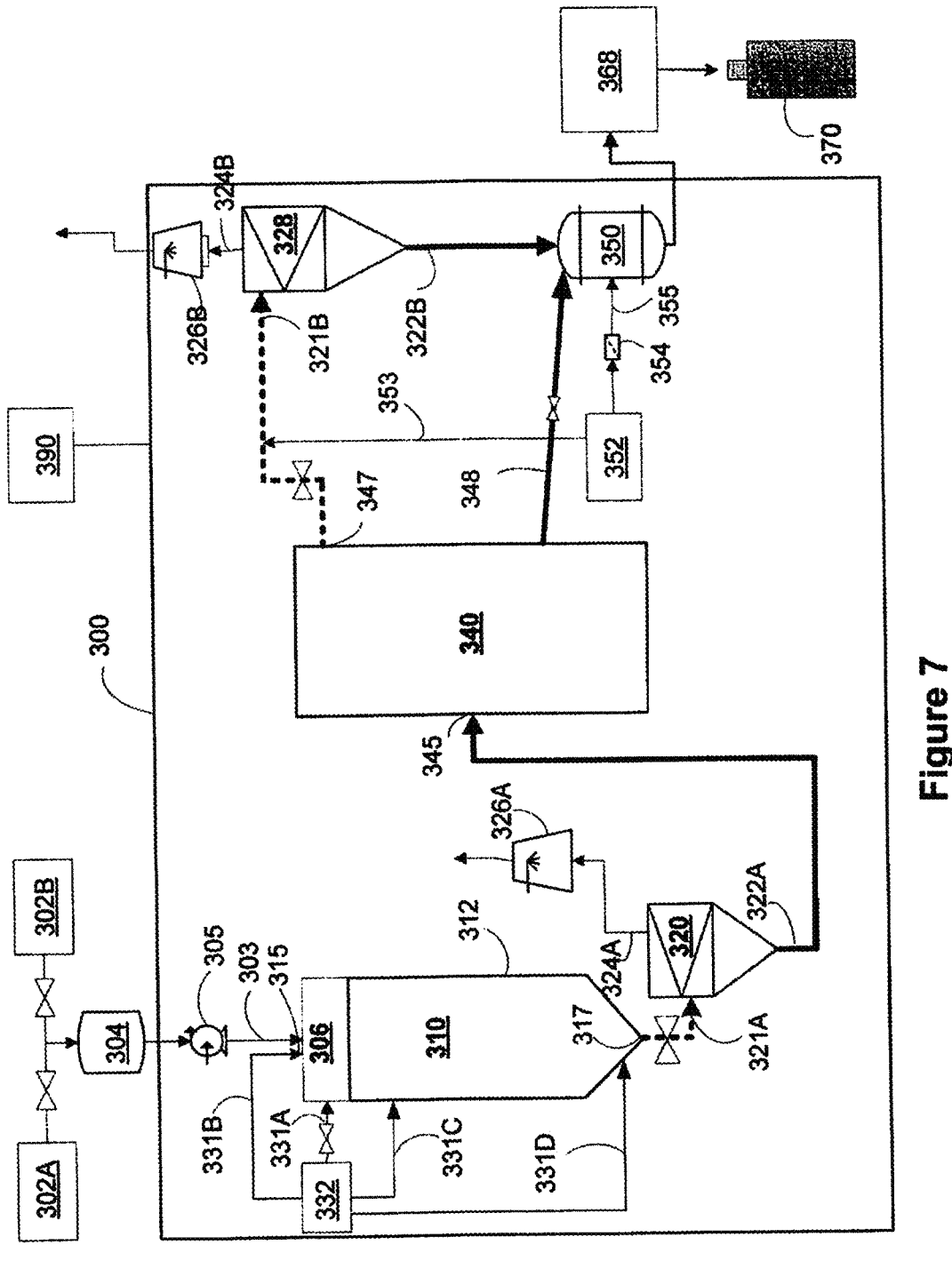
FIG. 7 is a schematic of another exemplary processing system according to another embodiment.

FIG. 7 is a schematic of the system 300, which is one example of an integrated tool/apparatus that can be used to carry out a fast, simple, continuous and low cost manufacturing process for preparing a material for a battery electrochemical cell. The system 300 is connected to a liquid mixer 304, which in turn is connected to two or more reactant sources 302A, 302B. The reactant sources 302A, 302B are provided to store various precursor compounds and liquid solvents. Desired amounts of precursor compounds (in solid or liquid form) and solvents are dosed and delivered from the reactant sources 302A, 302B to the liquid mixer 304 so that the precursor compounds can be dissolved and/or dispersed in the solvent and mix well into a liquid mixture. If necessary, the liquid mixer 304 is heated to a temperature, such as between 30° C. and 90° C. to help uniformly dissolve, disperse, and/or mix the precursors. The liquid mixer 304 is optionally connected to a pump 305, which pumps the liquid mixture from the liquid mixer 304 into the mist generator 306 of the system 300 to generate a mist.

The mist generator 306 converts the liquid mixture into a mist with desired droplet size and size distribution. In addition, the mist generator 306 is coupled to the power jetting chamber 310 in order to dry and remove moisture from the mist and obtain thoroughly-mixed solid precursor particles. In one embodiment, the mist generator 306 is positioned near the top of the power jetting chamber 310 that is positioned vertically (e.g., a dome-type power jetting chamber, etc.) to inject the mist into the power jetting chamber 310 and pass through the power jetting chamber vertically downward. Alternatively, the mist generator can be positioned near the bottom of the power jetting chamber 310 that is vertically positioned to inject the mist upward into the power jetting chamber to increase the residence time of the mist generated therein. In another embodiment, when the power jetting chamber 310 is positioned horizontally (e.g., a tube power jetting chamber, etc.) and the mist generator 306 is positioned near one end of the power jetting chamber 310 such that a flow of the mist, being delivered from the one end through another end of the power jetting chamber 310, can pass through a path within the power jetting chamber 310 for the length of its residence time.

The power jetting chamber 310 generally includes one or more power jet module 314 (e.g., power jet modules 314A, 314B, 314C, 314D, etc), a chamber inlet 315, a chamber body 312, and a chamber outlet 317. In one configuration, the mist generator 306 is positioned inside the power jetting chamber 310 near the chamber inlet 315 and connected to a liquid line 303 adapted to flow the liquid mixture therein from the liquid mixer 304. For example, the liquid mixture within the liquid mixer 304 can be pumped by the pump 305 through the liquid line 303 connected to the chamber inlet 315 into the internal volume of the power jetting chamber 310. Pumping of the liquid mixture by the pump 305 can be configured, for example, continuously at a desired delivery rate (e.g., adjusted by a metered valve or other means) to achieve good process throughput of system 300. In another configuration, the mist generator 306 is positioned outside the power jetting chamber 310 and the mist generated therefrom is delivered to the power jetting chamber 310 via the chamber inlet 315.

One or more gas lines (e.g., gas lines 331A, 331B, 331C, 331D, etc.) can be coupled to various portions of the power jetting chamber 310 and adapted to flow a gas from a gas source 332 into the power jetting chamber 310. A flow of the gas stored in the gas source 332 can be delivered, concurrently with the formation of the mist inside power jetting chamber 310, into the power jetting chamber 310 to carry the mist through the power jetting chamber 310, remove moisture from the mist, and form a gas-solid mixture containing the precursors. The flow of the gas can be delivered into the power jetting chamber 310 prior to formation the mist to fill and preheat an internal volume of the power jetting chamber 310 prior to generating the mist inside the power jetting chamber 310.

In one example, the gas line 331A is connected to the top portion of the power jetting chamber 310 to deliver the gas into the mist generator 306 positioned near the chamber inlet 315 to be mixed with the mist generated by the mist generator 306 inside the power jetting chamber 310. In one embodiment, the gas is preheated to a temperature of between 70° C. and 600° C. to mix with and remove moisture from the mist. As another example, the gas line 331B delivering the gas therein is connected to the chamber inlet 315 of the power jetting chamber 310, in close proximity with the liquid line 303 having the liquid mixture therein. Accordingly, the gas can thoroughly mix with the mist of the liquid mixture inside the power jetting chamber 310.

In another example, the gas line 331C is connected to the chamber body 312 of the power jetting chamber 310 to deliver the gas therein and mix the gas with the mist generated from the mist generator 306. In addition, the gas line 331D connected to the power jetting chamber 310 near the chamber outlet 317 may be used to ensure the gas-solid mixture formed within the power jetting chamber 310 is uniformly mixed with the gas.

The flow of the gas may be pumped through an air filter to remove any particles, droplets, or contaminants, and the flow rate of the gas can be adjusted by a valve or other means. In one embodiment, the gas is heated to a temperature to mix with the mist and remove moisture from the mist. It is designed to obtain spherical solid particles from a thoroughly-mixed liquid mixture of two or more precursors after drying the mist of the liquid mixture. In contrast, conventional solid-state manufacturing processes involve mixing or milling a solid mixture of precursor compounds, resulting in uneven mixing.

Once the mist of the liquid mixture is dried and formed into a gas-solid mixture with the gas, the gas-solid mixture is delivered out of the power jetting chamber 310 via the chamber outlet 317. The power jetting chamber 310 is coupled to the gas-solid separator 320 of the system 300. The gas-solid separator 320 collects chamber products (e.g., a gas-solid mixture having the gas and the one or more solid particles of a solid-state electrolyte material mixed together) from the chamber outlet 317.

The gas-solid separator 320 includes a separator inlet 321A, two or more separator outlets 322A, 324A. The separator inlet 321A is connected to the chamber outlet 317 and adapted to collect the gas-solid mixture and other chamber products from the power jetting chamber 310. The gas-solid separator 320 separates the gas-solid mixture from the power jetting chamber 310 into one or more solid particles of solid-state electrolyte material and waste products. The separator outlet 322A is adapted to deliver the one or more solid particles of a solid-state electrolyte material to the reactor 340 for further processing and reactions. The separator outlet 324A is adapted to deliver waste products out of the gas-solid separator 320.

The waste products may be delivered into a gas abatement device 326A to be treated and released out of the system 300. The waste product may include, for example, water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the one or more solid particles of a solid-state electrolyte material, and combinations thereof.

The one or more solid particles of a solid-state electrolyte material may include at least particles of the two or more precursors that are dried and uniformly mixed together. It is contemplated to separate the one or more solid particles of a solid-state electrolyte material away from any side products, gaseous products or waste products, prior to reacting the two or more precursors in the reactor 340. Accordingly, the system 300 is designed to mix the two or more precursors uniformly, dry the two or more precursors, separate the dried two or more precursors, and react the two or more precursors into final solid product particles of the crystalized solid-state electrolyte materials continuously. Suitable gas-solid separators include cyclones, electrostatic separators, electrostatic precipitators, gravity separators, inertia separators, membrane separators, fluidized beds, classifiers, electric sieves, impactors, particles collectors, leaching separators, elutriators, air classifiers, leaching classifiers, and combinations thereof, among others.

Once the one or more solid particles of a solid-state electrolyte material are separated and obtained, it is delivered into the reactor 340 for further reaction. The reactor 340 includes a gas inlet 333, a reactor inlet 345, and a reactor outlet 347. The reactor inlet 345 is connected to the separator outlet 322A and adapted to receive the solid particles. Optionally, a vessel 325 is adapted to store the solid particles prior to adjusting the amounts of the solid particles delivered into the reactor 340. The gas inlet 333 of the reactor 340 is coupled to a heating mechanism 380 to heat a gas from a gas source 334 to an annealing temperature of between 400° C. and 1200° C. The heating mechanism 380 can be, for example, an electric heater, a gas-fueled heater, a burner, among other heaters. Additional gas lines can be used to deliver heated air or gas into the reactor 340, if needed. The pre-heated gas can fill the reactor 340 and maintained the internal temperature of the reactor 340, much better and energy efficient than conventional heating of the chamber body of a reactor.

The gas flown inside the reactor 340 is designed to be mixed with the one or more solid particles of a solid-state electrolyte material and form an oxidized reaction product inside the reactor 340. Thermal energy from the pre-heated gas is used as the energy source for reacting the one or more solid particles of a solid-state electrolyte material within the reactor 340. The reaction process includes, but not limited to, reduction, decomposition, combination reaction, phase-transformation, re-crystallization, single displacement reaction, double displacement reaction, combustion, isomerization, and combinations thereof. The oxidized reaction product is then going through annealing process for a residence time of between 1 second and ten hours, or longer, depending on the annealing temperature and the type of the precursors initially delivered into the system 300. One embodiment of the invention provides the control of the temperature of the reactor 340 by the temperature of the heated gas.

Once the reactions inside the reactor 340 are complete, for example, upon the formation of desired crystal structure, particle morphology, and particle size, oxidized reaction products are delivered out of the reactor 340 via the reactor outlet 347 and/or a reactor outlet 348. The cooled reaction products include final solid product particles of the crystallized solid-state electrolyte materials containing, for example, oxidized product particles of the precursor compounds which are suitable as a material of a battery cell.

Optionally, the system 300 includes a gas-solid separator, such as a gas-solid separator 328, which collects the reaction products from the reactor outlet 347 of the reactor 340. The gas-solid separator 328 may be a particle collector, such as cyclone, electrostatic separator, electrostatic precipitator, gravity separator, inertia separator, membrane separator, fluidized beds classifiers electric sieves impactor, leaching separator, elutriator, air classifier, leaching classifier, and combinations thereof.

The gas-solid separator 328 of the system 300 generally includes a separator inlet 321B, a separator outlet 322B and a separator outlet 324B and is used to separate the reaction products into the solid particles and gaseous side products. The gaseous side products may be delivered into a gas abatement device 326B to be treated and released out of the system 300. The gaseous side products separated by the gas-solid separator 328 may generally contain water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the solid particles, and combinations thereof. In addition, the system 300 may further include one or more cooling fluid lines 353, 355 connected to the reactor outlet 347 or the separator outlet 322A of the gas solid separator 328 and adapted to cool the reaction products and/or the solid particles. The cooling fluid line 353 is adapted to deliver a cooling fluid (e.g., a gas or liquid) from a source 352 to the separator inlet 321B of the gas-solid separator 328. The cooling fluid line 355 is adapted to deliver a cooling fluid, which may filtered by a filter 354 to remove particles, into a heat exchanger 350.

The heat exchanger 350 is adapted to collect and cool the solid particles and/or reaction products from the gas-solid separator 328 and/or the reactor 340 by flowing a cooling fluid through them. The cooling fluid has a temperature lower than the temperature of the reaction products and the solid particles delivered from the gas-solid separator 328 and/or the reactor 340. The cooling fluid may have a temperature of between 4° C. and 30° C. The cooling fluid may be liquid water, liquid nitrogen, an air, an inert gas or any other gas which would not react to the reaction products.

Final solid products particles are collected and cooled by one or more separators, cooling fluid lines, and/or heat exchangers, and once cooled, the solid particles are delivered out of the system 300 and collected in a final product collector 368. The solid particles may include oxidized form of precursors, such as an oxide material, suitable to be packed into a battery cell 370. Additional pumps may also be installed to achieve the desired pressure gradient.

A process control system 390 can be coupled to the system 300 at various locations to automatically control the manufacturing process performed by the system 300 and adjust various process parameters (e.g., flow rate, mixture ratio, temperature, residence time, etc.) within the system 300. For example, the flow rate of the liquid mixture into the system 300 can be adjusted near the reactant sources 302A, 302B, the liquid mixer 304, or the pump 305. The droplet size and generation rate of the mist generated by the mist generator 306 can be adjusted. In addition, flow rate and temperature of various gases flown within the gas lines 331A, 331B, 331C, 331D, 333, 353, 355, 515, etc., can be controlled by the process control system 390. In addition, the process control system 390 is adapted to control the temperature and the residence time of various gas-solid mixture and solid particles at desired level at various locations.

Accordingly, a continuous process for producing a material of a battery cell using a system having a mist generator, a power jetting chamber, one or more gas-solid separators and a reactor is provided. A mist generated from a liquid mixture of one or more metal precursor compounds in desired ratio is mixed with air and dried inside the power jetting chamber, thereby forming gas-solid mixtures. One or more gas-solid separators are used in the system to separate the gas-solid mixtures from the power jetting chamber into solid particles packed with the one or more metal precursors and continuously deliver the solid particles into the reactor for further reaction to obtain final solid material particles with desired ratio of two or more intercalated metals.

The invention provides the preparation and manufacturing of a SSE material or a metal oxide material. Depending on the details and ratios of the metal precursor compounds that are delivered into the system 300, the resulting final solid material particles obtained from the system 300 may be a metal oxide material, a doped metal oxide material, an inorganic metal salts, among others. In addition, the metal oxide materials can exhibit a crystal structure of metals in the shape of layered, spinel, olivine, etc. The morphology of the solid product particles (such as the oxidized reaction product prepared using the method 100 and the system 300 as described herein) exists as desired solid powders. The particle sizes of the solid powders range between 1 nm and 100 μm.

In operation, a mist is mixed with a gas flow of a gas inside a mist generator to form a gas-liquid mixture, where the liquid mixture includes a lithium-containing salt compound, and one or more salt-containing compounds. In addition, the liquid mixture is mixed with a gas flow of another gas inside a power jetting chamber. It is contemplated that these gas flows are provided to thoroughly mix the liquid mixture to uniformly form into the gas-liquid mixture and assist in carrying the gas-liquid mixture inside the power jetting chamber. The liquid mixture can be adjusted digitally or manually prepared in a desirable molar ratio of the lithium-containing salt compound, the one or more inorganic salts compounds inside reactant sources and delivered into one or more liquid mixers.

Adjusting the molar ratio of the lithium-containing salt compound, and the one or more salt-containing compounds is performed prior to the forming the mist of the liquid mixture inside a liquid mixer. Desired molar ratio of the lithium-containing salt, and the one or more salts are digitally or manually measured and delivered from reactant sources to the liquid mixer so that the lithium-containing salt compound, and the one or more salt-containing compounds can be dissolved and/or dispersed in the solvent and mix well into the liquid mixture inside the liquid mixer. The lithium-containing salt compound, and the one or more salt-containing compounds are all soluble in a suitable solvent within the liquid mixture.

Also, adjusting the molar ratio of the lithium-containing salt compound, and the one or more salt-containing compounds is performed simultaneously with the forming the mist of the liquid mixture. The desirable molar ratio of the lithium-containing salt compound, and the one or more inorganic salt compounds can be adjusted digitally or manually from each reactant source and delivered into the mist generator to generate the mist of the liquid mixture inside the mist generator.

The liquid mixture comprising the lithium-containing salt compound, and the one or more salt-containing compounds is mixed with a gas flow to form a gas-liquid mixture inside a power jetting chamber. Then, the gas-liquid mixture is dried at a temperature inside the power jetting chamber to form a gas-solid mixture of solid particles of a solid-state electrolyte material. The gas-solid mixture is continuously delivered into the gas-solid separator which separates the gas-solid mixture into one or more solid particles of the solid-state electrolyte material and waste products.

The one or more solid particles of the oxide material are then delivered into an annealing chamber to be mixed with a flow of a gas. The one or more solid particles of the solid-state electrolyte material are reacted and annealed at an annealing temperature inside the annealing chamber to obtain high quality solid-state electrolyte materials optionally doped with one or more dopants at desired size, morphology and crystal structure.

Figure 8A:
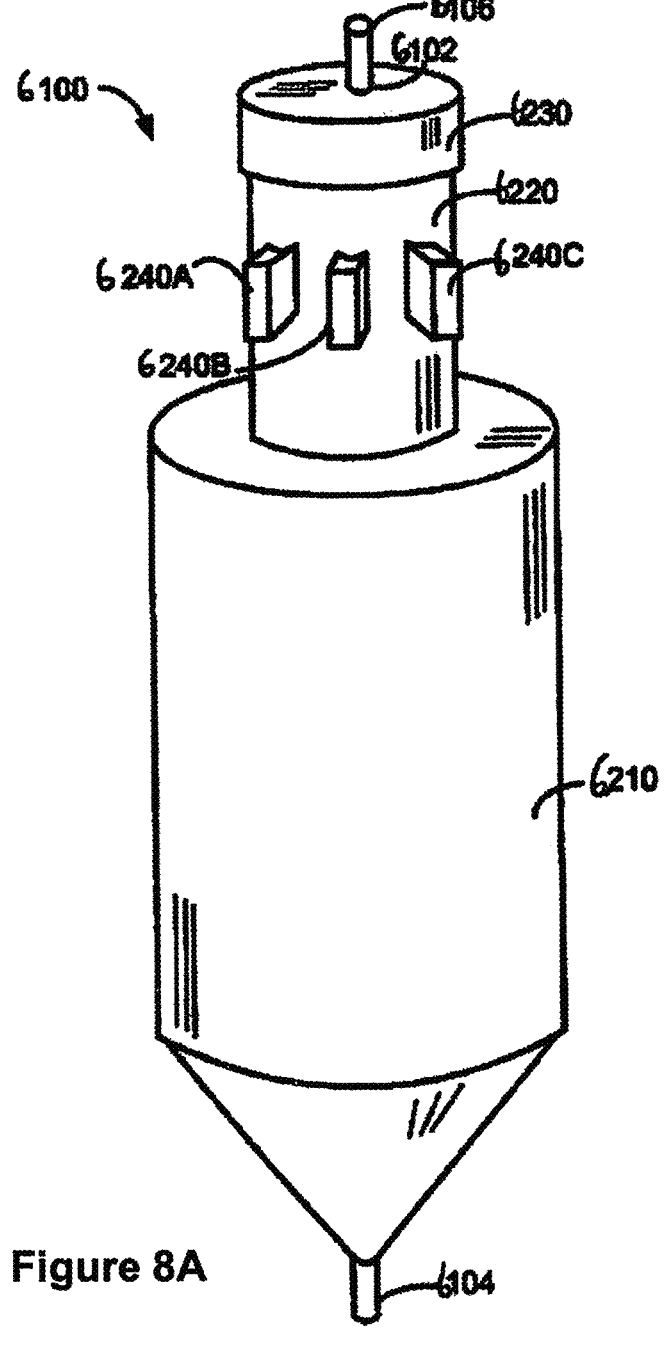
FIG. 8A is a perspective view of one embodiment of a processing system for producing a battery particulate material.

FIG. 8A is a perspective view of one embodiment of a processing system for producing a particulate material. This exemplary embodiment of the processing system 6100 includes a system inlet 6102 for delivering one or more gases through gas line 6106 and system outlet 6104 for delivering particulate material out of the processing system. The one or more gases may be selected from gas source of air, oxygen, carbon dioxide, nitrogen gas, hydrogen gas, inert gas, noble gas, and combinations thereof, among others. In one embodiment, such processing system further includes an array of one or more power jet modules for jetting the liquid mixture into one or more streams of droplets and to force the one or more streams of droplets into the processing system. The processing system further includes a reaction chamber for processing the one or more streams of droplets and the one or more gases into the particulate material.

The liquid mixture is prepared from two or more precursor compounds and then converted into droplets, each droplet will have the two or more precursors uniformly distributed together. Then, the moisture of the liquid mixture is removed by passing the droplets through the dispersion chamber and the flow of the gas is used to carry the mist within the dispersion chamber for a suitable residence time. It is further contemplated that the concentrations of the precursor compounds in a liquid mixture and the droplet sizes of the mist of the liquid mixture can be adjusted to control the chemical composition, particle sizes, and size distribution of final product particles of the battery material.

Such processing system further includes, as illustrated by FIG. 8A, at least one buffer chamber configured to the system inlet 6102 for delivering gas source into multiple uniform gas flows. Further in one embodiment, the processing system includes the dispersion chamber 6220, and power jet modules 6240A, 6240B and 6240C for preparing precursor liquid mixture into desirable size and delivering the desired precursor liquid mixture into the processing system. The power jet modules can be attached to a portion of the dispersion chamber to and employ air pressure to jet the liquid mixture and convert it into a mist containing small sized droplets directly inside the dispersion chamber. Alternatively, a mist can be generated outside the dispersion chamber and delivered into the dispersion chamber. Suitable droplet sizes can be adjusted according to the choice of the power jet module used, the liquid mixture compounds, the temperature of the dispersion chamber, the flow rate of the gas, and the residence time inside the dispersion chamber. As an example, a mist with liquid droplet sizes between one tenth of a micron and one millimeter is generated inside the dispersion chamber.

The power jet module 6240A is coupled to a portion of the dispersion chamber 6220 to generate a mist (e.g., a large collection of small size droplets) of the liquid mixture directly within the dispersion chamber. In general, the power jet module 6240A is able to generate a mist of mono-sized droplets. In one embodiment, the dispersion chamber 6220 is connected to the one or more power jet modules 6240A, 6240B and 6240C, for receiving multiple uniform gas flows from the buffer chamber and dispersing the multiple uniform gas flows with one or more streams of droplets jetted from the array of one or more power jet modules 6240A, 6240B and 6240C into each other.

In one embodiment, the dispersion chamber 6220 then connects to the reaction chamber 6210 for processing the one or more streams of droplets and the one or more gases into the particulate material. Further, the reaction chamber 6210 connects to the system outlet 6104 for delivering the particulate material out of the processing system.

Figure 8B:
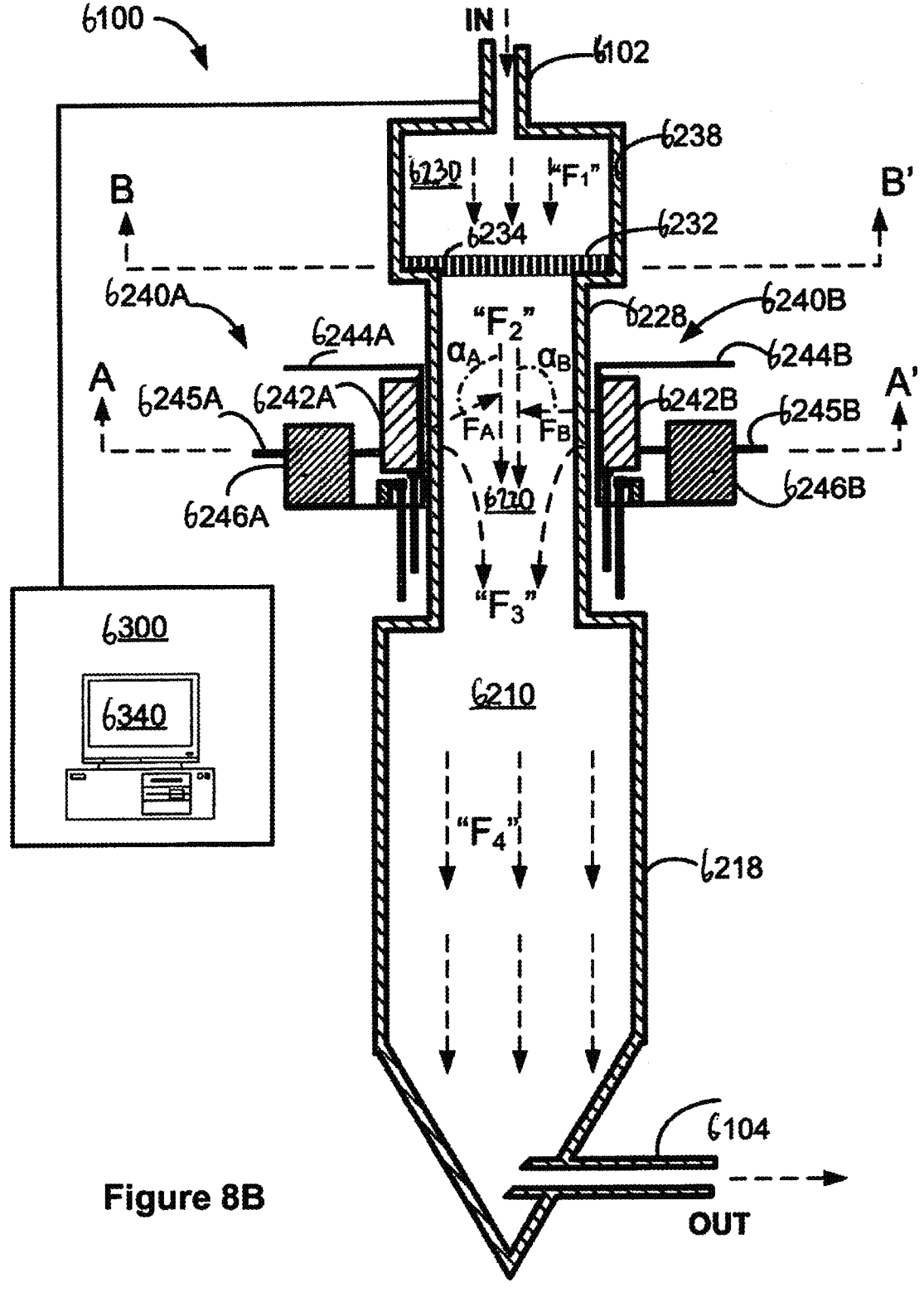
FIG. 8B is a cross-section view of another embodiment of a processing system for producing a particulate material.

FIG. 8B is an exemplary processing system 6100 that can be used to carry out a fast, simple, continuous and low-cost manufacturing process for producing a particulate material. The processing system 6100 includes a system inlet 6102 for delivering the one or more gases into the processing system, a buffer chamber 6230 connected to the system inlet 6102, dispersion chamber 6220 connected to the buffer chamber 6230, a reaction chamber 6210 connected to the dispersion chamber 6220, and a system outlet 6104 connected to the reaction chamber 6210.

The processing system 6100 further includes a gas distributor 6232 attached to chamber wall 6238 of the buffer chamber 6230, channels of the distributor 6232 for delivering the one or more gases F1 into multiple uniform gas flows F2 inside the processing system, dispersion chamber 6220 and one or more power jet modules 6240A and 240B attached to chamber wall 6228 of the dispersion chamber 6220.

The one or more gases $F_1$ delivered into the buffer chamber 6230 is pressured downward to flow at a certain speed through channels 6234 of the gas distributor 6232 into multiple uniform gas flows F2 out of the channels 6234 and into the dispersion chamber 6220. In one embodiment, the one or more gases $F_1$ may be pumped through an air filter to remove any particles, droplets, or contaminants, and the flow rate of the gas can be adjusted by a valve or other means. In one embodiment, the flow rate of multiple uniform gas flows F2 coming out of the channels 6234 will be higher than the flow rate of one or more gases $F_1$. Additionally, the direction of multiple uniform gas flows $F_2$ will be gathered and unified.

The power jet module 6240A include a power jet 6242A for jetting a liquid mixture supplied to the power jet module 6240A into one or more streams of droplets. The power jet module 6240A further includes a support frame 6244A for supporting the power jet module 6240A, a module actuator 6246A attached to the inner side of the support frame 6244A for actuating and forcing the one or more streams of droplets FA jetted from the power jets 6242A attached to the inner side of the support frame 6244A into the dispersion chamber 6220, and a connector 6245A connecting the module actuator 6246A and power jet 6242A. Additionally, the power jet module 6240B include a power jet 6242B for jetting a liquid mixture supplied to the power jet module 6240B into one or more streams of droplets. The power jet module 6240B further includes a support frame 6244B for supporting the power jet module 62406, a module actuator 6246B attached to the inner side of the support frame 6244B for actuating and forcing the one or more streams of droplets FB jetted from the power jets 6242B attached to the inner side of the support frame 6244B into the dispersion chamber 6220, and a connector 6245B connecting the module actuator 6246B and power jet 6242B.

The streams of droplets $F_A$ jetted into the dispersion chamber 6220 are dispersed with multiple uniform gas flows F2 in a dispersion angle $\alpha_A$ with each other and forming a gas-liquid mixture $F_3$ containing the multiple uniform gas flows $F_2$ and the streams of droplets $F_A$. Further, the streams of droplets FB jetted into the dispersion chamber 6220 are dispersed with multiple uniform gas flows F2 in a dispersion angle $\alpha_B$ with each other and forming a gas-liquid mixture $F_3$ containing the multiple uniform gas flows $F_2$ and the streams of droplets $F_B$. In one embodiment, the dispersion chamber maintained itself at a first temperate.

The one or more gases are heated to a drying temperature to mix with the streams of droplets and remove moisture from the streams of droplets. It is designed to obtain spherical solid particles from a thoroughly-mixed liquid mixture of two or more liquid mixture after drying the mist of the liquid mixture. In contrast, conventional solid-state manufacturing processes involve mixing or milling a solid mixture of liquid mixture compounds, resulting in uneven mixing of liquid mixtures.

The one or more gas may be, for example, air, oxygen, carbon dioxide, nitrogen gas, hydrogen gas, inert gas, noble gas, and combinations thereof, among others. For example, heated air can be used as an inexpensive gas source and energy source for drying the streams of droplets. The choice of the one or more gas may be a gas that mix well with the streams of droplets of the precursors and dry the mist without reacting to the precursors. In some cases, the chemicals in the streams of droplets may react to the one or more gases and/or to each other to certain extent during drying, depending on the drying temperature and the chemical composition of the precursors. In addition, the residence time of the streams of droplets of thoroughly mixed precursor compounds within the dispersion chamber is adjustable, depending on the flow rate of the one or more gas, and the length of the path that the streams of droplets has to flow within the dispersion chamber.

The processing system 6100 further includes the reaction chamber 6210 for receiving the gas-liquid mixture $F_3$ and performing a desired reaction of the gas-liquid mixture F3 into a final reaction product F4 at a second temperature and for a duration of a reaction time. Lastly, the final reaction products F4, which can be product particles, can be delivered out of the system 6100 through system outlet 6104 for further analysis on their properties (e.g., specific capacity, power performance, particulate charging cycle performance, etc.), particle sizes, morphology, crystal structure, etc., to be used as a particulate material.

The processing system 6100 is connected to an electronic control unit 6300 with a CPU 6340 for automatic control of the processing system 6100. As shown in FIG. 8B, the control unit 6300 is coupled to the processing system 6100 at various locations to automatically control the manufacturing process performed by the processing system 6100 and adjust various process parameters (e.g., flow rate, mixture ratio, temperature, residence time, etc.) within the processing system 6100. For example, the flow rate of the liquid mixture into the processing system 6100 can be adjusted near a liquid mixture container or a pump. As another example, the droplet size and generation rate of the mist generated by power jet modules 6240A and 6240B can be adjusted. In addition, flow rate and temperatures of various gases flowed within the gas lines, etc., can be controlled by the control unit 6300. In addition, the process control unit 6300 is adapted to control the temperature, air pressure, and the residence time of various gas-solid mixture and solid particles at desired level at various locations.

In operation, the control unit 6300 may be used to control the parameters of a continuous multi-stage process (e.g., the method 900 as described herein) performed within the control unit 6300 to obtain high quality and consistent active battery materials with much less time, labor, and supervision than materials prepared from conventional manufacturing processes. Representative processing profile performed by the control unit 6300 of FIG. 8B is shown as temperature-versus-time plots.

Optionally, the processing system 6100 further includes a first separator connected to the dispersion chamber 6230 and adapted to collecting and separating the gas-liquid mixture $F_3$ from the dispersion chamber into a first type of solid particles and waste products. Optionally, the first separator is connected to a power jetting chamber which is connected to the dispersion chamber 6230 and adapted to collecting and drying the gas-liquid mixture $F_3$ from the dispersion chamber into a gas-solid particles to be delivered and separated into a first type of solid particles and waste products within the first separator. In one embodiment, the first separator further includes a first separator outlet connected to the reaction chamber 6210 and adapted to deliver the first type of solid particles into the reaction chamber 6210, and a second separator outlet adapted to deliver waste products out of the first separator.

Figure 8C:
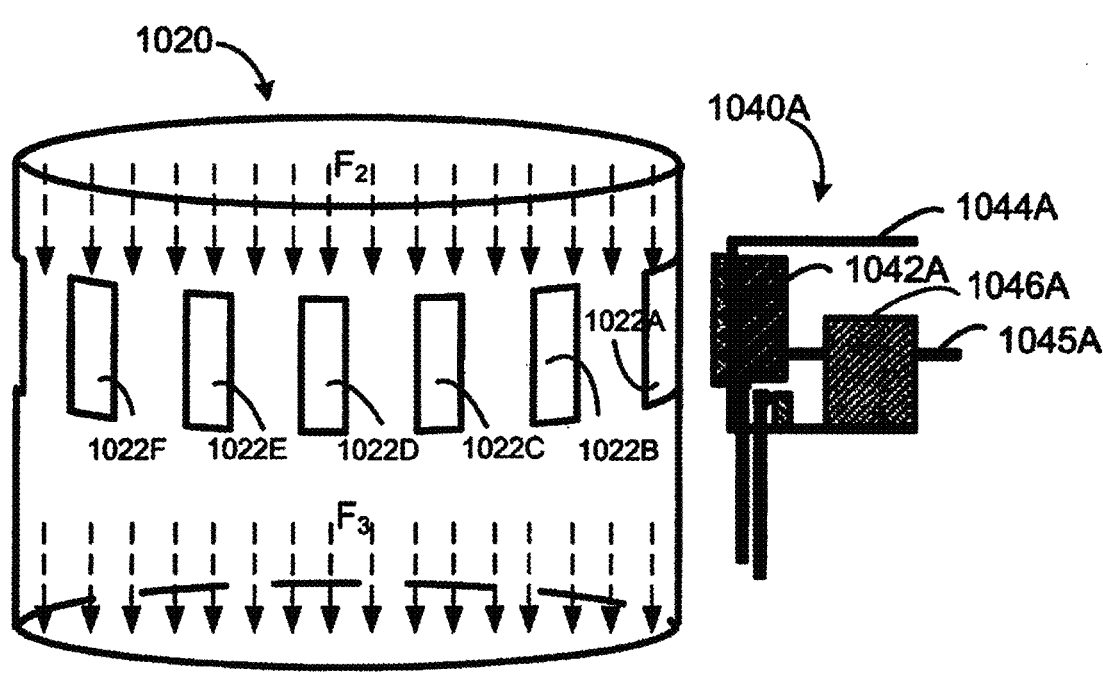
FIG. 8C illustrates another embodiment of exemplary power jet modules configured in the dispersion chamber of the processing system in a perspective view.

FIG. 8C shows examples of power jet modules configured in the dispersion chamber. The power jet module 1040A for jetting the liquid mixture into one or more streams of droplets and forcing the one or more streams into the processing system includes a power jet 1042A for jetting a liquid mixture supplied to the power jet module 1040A into one or more streams of droplets. The power jet module 1040A further includes a support frame 1044A for supporting the movement of the power jet 1042A, a first module actuator 1046A for moving the power jet to be correspondingly connected to an opening on the dispersion chamber, and a connector 1045A connecting the first module actuator 1046A and the power jet 1042A.

In FIG. 8C, the dispersion chamber 1020 includes one or more openings 1022A, 1022B, 1022C, 1022D, 1022E, and 1022F positioned on the chamber wall of the dispersion chamber 1020 and adapted to connecting to and fitting with the power jet of the power jet module on power jet's one face with nozzle array. In one embodiment, the shapes of one or more openings and the arrangement of one or more openings are shown in FIG. 8C, wherein the one or more openings are in rectangular shape with bottom width shorter than the side length, and positioned in an evenly distance adjacent to each other on a same horizontal line of the chamber wall.

As shown in FIG. 8C, the dispersion chamber 1020 is filled with multiple unified gases F2 delivered from the buffer chamber of the processing chamber. In one embodiment, multiple unified gases $F_2$ can be delivered, concurrently with the formation of the streams of droplets inside dispersion chamber 1020 jetted from the power jet of the power jet module, into the dispersion chamber 1020 to carry the streams of droplets through the dispersion chamber 1020, may or may not remove moisture from the mist, and form a gas-liquid mixture with a direction $F_3$ containing the liquid mixtures and multiple unified gases. Also, the flow of multiple unified gases $F_2$ can be delivered into the dispersion chamber 1020 prior to the formation of the streams of droplets to fill and optionally preheat to a first temperature an internal volume of the dispersion chamber 1020 prior to generating the streams of droplets inside the dispersion chamber 1020.

The one or more openings 1022A-1022F are positioned near the top of the dispersion chamber 1020 that is positioned vertically (e.g., a dome-type dispersion chamber, etc.) to connect and fit the power jet modules for injecting the streams of droplets into the dispersion chamber 1020 and passing through the dispersion chamber vertically downward. Alternatively, the one or more openings 1022A-1022F can be positioned near the bottom of the dispersion chamber 1020 that is vertically positioned and be able to connect and fit the power jet modules for injecting the streams of droplets upward into the dispersion chamber by increasing the residence time of the streams generated therein. In another embodiment, when the dispersion chamber 1020 is positioned horizontally (e.g., a tube dispersion chamber, etc.) and the one or more openings 1022A-1022F are positioned near one end of the dispersion chamber 1020 such to fit and connect to the power jet modules that injecting the streams of droplets to be delivered from the one end through another end of the dispersion chamber 1020, can pass through a path within the dispersion chamber 1020 for the length of its residence time.

Additionally, the streams of droplets jetted into the dispersion chamber 1020 are dispersed with multiple uniform gas flows $F_2$ into a gas-liquid mixture $F_3$ containing the multiple uniform gas flows $F_2$ and the streams of droplets. The dispersion chamber maintained itself at a first temperate. Also, the direction of the multiple uniform gas flows $F_2$ delivered into the dispersion chamber is parallel to the chamber wall of the dispersion chamber 1020. And the direction of the gas-liquid mixture $F_3$ delivered through the dispersion chamber 1020 is also parallel to the chamber wall of the dispersion chamber 1020. In another embodiment of the invention, the direction of the multiple uniform gas flows $F_2$ delivered into the dispersion chamber 1020 and the direction of the gas-liquid mixture $F_3$ delivered through the dispersion chamber 1020 are different.

Figure 8D:
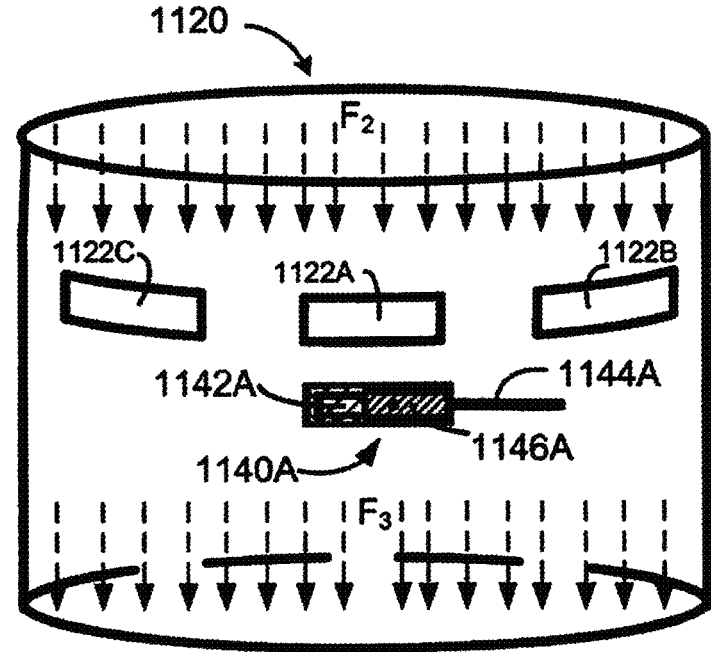
FIG. 8D illustrates exemplary power jet modules configured in the processing system according to another embodiment.

FIG. 8D shows examples of power jet modules configured in the dispersion chamber. In one embodiment, the power jet module 1140A for jetting the liquid mixture into one or more streams of droplets and forcing the one or more streams into the processing system includes a power jet 1142A for jetting a liquid mixture supplied to the power jet module 1140A into one or more streams of droplets. The power jet module 1140A further includes a support frame 1144A for supporting the movement of the power jet 1142A, a first module actuator 1146A for moving the power jet to be correspondingly connected to an opening on the dispersion chamber, and a connector connecting the first module actuator 1146A and the power jet 1142A.

As shown in FIG. 8D, the dispersion chamber 1120 includes one or more openings 1122A, 1122B, 1122C positioned on the chamber wall of the dispersion chamber 1120 and adapted to connecting to and fitting with the power jet of the power jet module on power jet's one face with nozzle array. The shapes of one or more openings and the arrangement of one or more openings are shown in FIG. 8D, wherein the one or more openings are in rectangular shape with bottom width longer than the side length, and positioned in an evenly distance adjacent to each other on a same horizontal line of the chamber wall.

In FIG. 8D, the dispersion chamber 1120 is filled with multiple unified gases F2 delivered from the buffer chamber of the processing chamber. Multiple unified gases $F_2$ can be delivered, concurrently with the formation of the streams of droplets inside dispersion chamber 1120 jetted from the power jet of the power jet module, into the dispersion chamber 1120 to carry the streams of droplets through the dispersion chamber 1120, may or may not remove moisture from the mist, and form a gas-liquid mixture with a direction $F_3$ containing the liquid mixtures and multiple unified gases. Also, the flow of multiple unified gases $F_2$ can be delivered into the dispersion chamber 1120 prior to the formation of the streams of droplets to fill and optionally preheat to a first temperature an internal volume of the dispersion chamber 1120 prior to generating the streams of droplets inside the dispersion chamber 1120.

The one or more openings 1122A-1122C are positioned near the top of the dispersion chamber 1120 that is positioned vertically (e.g., a dome-type dispersion chamber, etc.)

to connect and fit the power jet modules for injecting the streams of droplets into the dispersion chamber 1120 and passing through the dispersion chamber vertically downward. Alternatively, the one or more openings 1122A-1122C can be positioned near the bottom of the dispersion chamber 1120 that is vertically positioned and be able to connect and fit the power jet modules for injecting the streams of droplets upward into the dispersion chamber by increasing the residence time of the streams generated therein. In another embodiment, when the dispersion chamber 1120 is positioned horizontally (e.g., a tube dispersion chamber, etc.) and the one or more openings 1122A-1122C are positioned near one end of the dispersion chamber 1120 such to fit and connect to the power jet modules that injecting the streams of droplets to be delivered from the one end through another end of the dispersion chamber 1120, can pass through a path within the dispersion chamber 1120 for the length of its residence time. In one embodiment, the dispersion chamber maintained itself at a first temperate.

The direction of the multiple uniform gas flows $F_2$ delivered into the dispersion chamber is parallel to the chamber wall of the dispersion chamber 1120. And the direction of the gas-liquid mixture $F_3$ formed by dispersing multiple uniform gas flows F2 into streams of droplets from the power jets delivered through the dispersion chamber 1120 is parallel to the chamber wall of the dispersion chamber 1120.

Figure 8E:
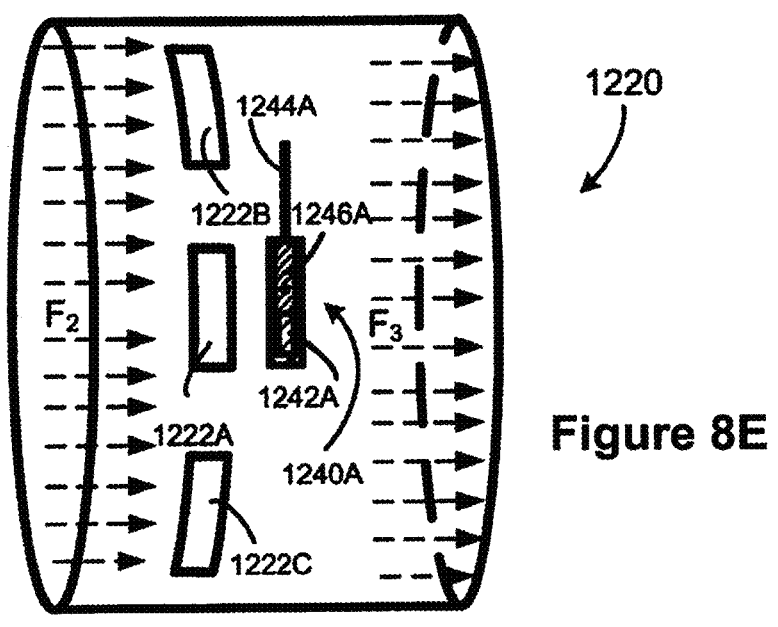
FIG. 8E illustrates exemplary power jet modules in a perspective view according to another embodiment.

FIG. 8E shows examples of power jet modules configured in the dispersion chamber of the processing system in a perspective view. In one embodiment, the power jet module 1240A for jetting the liquid mixture into one or more streams of droplets and forcing the one or more streams into the processing system includes a power jet 1242A for jetting a liquid mixture supplied to the power jet module 1240A into one or more streams of droplets. The power jet module 1240A further includes a support frame 1244A for supporting the movement of the power jet 1242A, a first module actuator 1246A for moving the power jet to be correspondingly connected to an opening on the dispersion chamber, and a connector 1245A connecting the first module actuator 1246A and the power jet 1242A.

In FIG. 8E, the dispersion chamber 1220 includes one or more openings 1222A, 12226, 1222C positioned on the chamber wall of the dispersion chamber 1220 and adapted to connecting to and fitting with the power jet of the power jet module on power jet's one face with nozzle array. In one embodiment, the shapes of one or more openings and the arrangement of one or more openings are shown in FIG. 8E, wherein the one or more openings are in rectangular shape with bottom width shorter than the side length, and positioned in an evenly distance adjacent to each other on a same vertical line of the chamber wall of the dispersion chamber 1220.

As shown in FIG. 8E, the dispersion chamber 1220 is filled with multiple unified gases F2 delivered from the buffer chamber of the processing chamber. In one embodiment, multiple unified gases $F_2$ can be delivered, concurrently with the formation of the streams of droplets inside dispersion chamber 1220 jetted from the power jet of the power jet module, into the dispersion chamber 1220 to carry the streams of droplets through the dispersion chamber 1220, may or may not remove moisture from the mist, and form a gas-liquid mixture $F_3$ containing the liquid mixtures and multiple unified gases. Also, the flow of multiple unified gases $F_2$ can be delivered into the dispersion chamber 1220 prior to the formation of the streams of droplets to fill and optionally preheat to a first temperature an internal volume of the dispersion chamber 1220 prior to generating the streams of droplets inside the dispersion chamber 1220.

The one or more openings 1222A-1222C are positioned near the left end of the dispersion chamber 1220 that is positioned horizontally (e.g., a tube dispersion chamber, etc.) to connect and fit the power jet modules for injecting the streams of droplets into the dispersion chamber 1220 and passing through the dispersion chamber from one end to the other. Alternatively, the one or more openings 1222A-1222C can be positioned near the right end of the dispersion chamber 1220 that is horizontally positioned and be able to connect and fit the power jet modules for injecting the streams of droplets upward into the dispersion chamber for the length of its residence time of the streams generated therein. In one embodiment, the dispersion chamber maintained itself at a first temperate.

The direction of the multiple uniform gas flows $F_2$ delivered into the dispersion chamber is parallel to the chamber wall of the dispersion chamber 1220. And the direction of the gas-liquid mixture $F_3$ formed by dispersing multiple uniform gas flows F2 into streams of droplets from the power jets delivered through the dispersion chamber 1220 is parallel to the chamber wall of the dispersion chamber 1220.

Figure 8F:
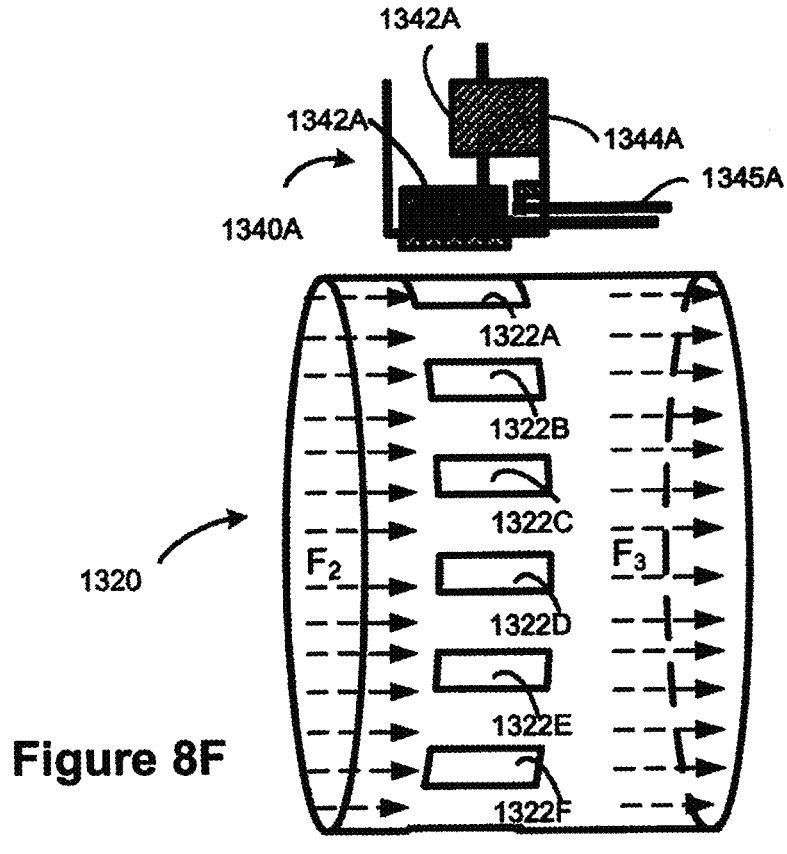
FIG. 8F illustrates exemplary power jet modules configured in the processing system in a perspective view.

FIG. 8F shows examples of power jet modules configured in the dispersion chamber of the processing system in a perspective view. In one embodiment, the power jet module 1340A for jetting the liquid mixture into one or more streams of droplets and forcing the one or more streams into the processing system includes a power jet 1342A for jetting a liquid mixture supplied to the power jet module 1340A into one or more streams of droplets. The power jet module 1340A further includes a support frame 1344A for supporting the movement of the power jet 1342A, a first module actuator 1346A for moving the power jet to be correspondingly connected to an opening on the dispersion chamber, and a connector 1345A connecting the first module actuator 1346A and the power jet 1342A.

In FIG. 8F, the dispersion chamber 1320 includes one or more openings 1322A, 1322B, 1322C, 1322D, 1322E, and 1322F positioned on the chamber wall of the dispersion chamber 1320 and adapted to connecting to and fitting with the power jet of the of the power jet module on power jet's one face with nozzle array and with a bottom width longer than the side length thereof. In one embodiment, the shapes of one or more openings and the arrangement of one or more openings are shown in FIG. 8F, wherein the one or more openings are in rectangular shape with bottom width longer than the side length, and positioned in an evenly distance adjacent to each other on a same vertical line of the chamber wall.

The one or more openings 1322A-1322F are positioned near the left end of the dispersion chamber 1220 that is positioned horizontally (e.g., a tube dispersion chamber, etc.) to connect and fit the power jet modules for injecting the streams of droplets into the dispersion chamber 1320 and passing through the dispersion chamber from one end to the other. Alternatively, the one or more openings 1322A-1322F can be positioned near the right end of the dispersion chamber 1320 that is horizontally positioned and be able to connect and fit the power jet modules for injecting the streams of droplets upward into the dispersion chamber for the length of its residence time of the streams generated therein. In one embodiment, the dispersion chamber maintained itself at a first temperate.

The direction of the multiple uniform gas flows $F_2$ delivered into the dispersion chamber is parallel to the chamber wall of the dispersion chamber 1020. And the direction of the gas-liquid mixture $F_3$ delivered through the dispersion chamber 1020 is also parallel to the chamber wall of the dispersion chamber 1020. In another embodiment of the invention, the direction of the multiple uniform gas flows $F_2$ delivered into the dispersion chamber 1020 and the direction of the gas-liquid mixture $F_3$ delivered through the dispersion chamber 1020 are different. As another example, the direction of the multiple uniform gas flows $F_2$ delivered into the dispersion chamber is parallel to the chamber wall of the dispersion chamber 1320. And the direction of the gas-liquid mixture $F_3$ formed by dispersing multiple uniform gas flows $F_2$ into streams of droplets from the power jets delivered through the dispersion chamber 1320 is parallel to the chamber wall of the dispersion chamber 1320.

Examples

Exemplary material compositions are shown in Table 1A, (Example #: A1-A3), and include lithium lanthanum zirconium oxide garnets having a chemical composition of $Li_a La_b Zr_c D1_d D2_e \ldots DN_n O_v$, is designed and prepared such that the ratio of a:b:c:d: . . . :n is about the same ratio of $M_{LiSalt}:M_{LaSalt}:M_{ZrSalt}:M_{D1Salt}: M_{D2Salt}: \ldots : M_{DNSalt}$, wherein $6.2 \le a \le 7.2$, $2.8 \le b \le 3.5$, $1.2 \le c \le 2.2$, $2.0 \le v \le 12$, and at least one of $D_1, D_2, \ldots, DN$ is a metal, $N \ge 0$, $0 \le d \le 0.8$, $0 \le e \le 0.8$, and $0 \le n \le 0.8$, and where $D_1, D_2, \ldots, DN$ includes Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, CI, I, Br, and combinations thereof. The annealing temperature and annealing time can be controlled from 700 to 1000° C. for 7 to 20 hours. In one example, the solid-state electrolyte material of the ceramic material is garnet type, cubic structure, lithium lanthanum zirconium oxide material, doped and undoped with Al, Ti, Ta, Ge, etc. In another example, the solid-state electrolyte material of the ceramic material obtained are garnet type, tetragonal structure lithium lanthanum zirconium oxide material, doped and undoped with Al, Ti, Ta, Ge, etc. In yet another example, the solid-state electrolyte material of the ceramic material includes $Li_7La_3Zr_2O_{12}$, $Li_7La_3Zr_2O_{12}$, $Li_{6.25}La_3Zr_2Ta_{0.25}Ga_{0.2}O_{12}$, $Li_{6.75}La_3Zr_{1.75}Ta_{0.25}O_{12}$, $Li_{6.5}La_3Zr_{1.5}Ta_{0.5}O_{12}$, $Li_{6.15}La_3Zr_{1.75}Ta_{0.25}Ga_{0.2}O_{12}$, $Li_{6.15}La_3Zr_{1.75} Ta_{0.25}Al_{0.2}O_{12}$, $Li_{6.25}La_3Zr_2Al_{0.25}O_{12}$.

Examples A1-A3 as shown in Table 1A were conducted to prepare solid-state electrolyte materials in the anneal temperate more than 700° C.; for example, between 700° C. to 1000° C.; such as 950° C.; such as 900° C.; such as 850° C.; such as 800° C.; such as 750° C. The examples exhibit different structures and ionic conductivities, for example, the ionic conductivity is more than $10^{-4}$ S/cm, preferably more than $5 \times 10^{-4}$, or more than $8 \times 10^{-4}$ S/cm, or more than $1.0 \times 10^{-3}$, or more than $4 \times 10^{-3}$ S/cm, more than $5 \times 10^{-3}$ S/cm, more than $6 \times 10^{-3}$ S/cm, preferably more than $7 \times 10^{-3}$ S/cm, preferably more than $8 \times 10^{-3}$ S/cm, preferably more than $9 \times 10^{-3}$ S/cm.

TABLE 1A

| Example | $M_{LiSalt}$ | $M_{LaSalt}$ | $M_{ZrSalt}$ | $M_{D1Salt}$ | $M_{D1Salt}$ | Anneal Temp (° C.) | Anneal Time (hour) |
|---|---|---|---|---|---|---|---|
| A1 | 6.2-7.2 | 2.8-3.5 | 1.0-2.2 | 0-0.8 | 0-0.8 | 700-950 | 7-20 |
| A2 | 6.5-7.1 | 2.9-3.3 | 1.2-2.0 | 0.2-0.8 | 0.2-0.8 | 700-950 | 7-20 |
| A3 | 6.7-7.0 | 3.0-3.1 | 1.5-2.0 | 0.5-0.8 | 0.5-0.8 | 700-950 | 7-20 |

| Example | a | b | c | d | e | Anneal Temp (° C.) | Anneal Time (hour) |
|---|---|---|---|---|---|---|---|
| A1 | 6.2-7.2 | 2.8-3.5 | 1.0-2.2 | 0-0.8 | 0-0.8 | 700-950 | 7-20 |
| A2 | 6.5-7.1 | 2.9-3.3 | 1.2-2.0 | 0.2-0.8 | 0.2-0.8 | 700-950 | 7-20 |
| A3 | 6.7-7.0 | 3.0-3.1 | 1.5-2.0 | 0.5-0.8 | 0.5-0.8 | 700-950 | 7-20 |

Exemplary material compositions in Table 1B (Example #: B1-B3) include lithium lanthanum zirconium oxide garnets having a composition of $Li_a La_b Zr_c D1_d D2_e \ldots DN_n O_v$, is designed and prepared such that the ratio of a:b:c:d: . . . :n is about the same ratio of $M_{LiSalt}:M_{LaSalt}:M_{ZrSalt}:M_{D1Salt}:M_{D2Salt}: \ldots :M_{DNSalt}$, etc., wherein $6.2 \le a \le 7.2$, $2.8 \le b \le 3.5$, $1.2 \le c \le 2.2$, $2.0 \le v \le 12$, and wherein at least one of $D_1, D_2, \ldots, D_N$ is a metal, $N \ge 0$, $0 \le d \le 0.8$, $0 \le e \le 0.8$, and $0 \le n \le 0.8$. The annealing temperature and annealing time can be controlled from 1000 to 1200° C. for 7 to 20 hours. In one example, the solid-state electrolyte material of the ceramic material is garnet type, cubic phase lithium lanthanum zirconium oxide material. In another example, the solid-state electrolyte material includes $Li_7La_3Zr_2O_{12}$, $Li_7La_3Zr_2O_{12}$, $Li_{6.75}La_3Zr_{1.75}Ta_{0.25}O_{12}$, $Li_{6.5}La_3Zr_{1.5}Ta_{0.5}O_{12}$, $Li_{6.15}La_3Zr_{1.75}Ta_{0.25}Al_{0.2}O_{12}$, $Li_{6.25}La_3Zr_2Al_{0.25}O_{12}$, $Li_{6.15}La_3Zr_{1.75}Ta_{0.25}Ga_{0.2}O_{12}$, $Li_{6.25}La_3Zr_2Ta_{0.25}Ga_{0.2}O_{12}$. In another example, the solid-state electrolyte material includes $Li_7La_3Zr_2O_{12}$, $Li_7La_3Zr_2O_{12}$, $Li_{6.75}La_3Zr_{1.75}Ta_{0.25}O_{12}$, $Li_{6.5}La_3Zr_{1.5}Ta_{0.5}O_{12}$, $Li_{6.15}La_3Zr_{1.75}Ta_{0.25}Al_{0.2}O_{12}$, $Li_{6.25}La_3Zr_2Al_{0.25}O_{12}$, $Li_{6.15}La_3Zr_{1.75}Ta_{0.25}Ga_{0.2}O_{12}$, $Li_{6.25}La_3Zr_2Ta_{0.25} Ga_{0.2}O_{12}$. Examples B1-B3 as described in Table 1B were conducted to prepare solid-state electrolyte materials in the anneal temperature more than 700° C.; for example, between 1000° C. to 1200° C.; such as 1050° C.; such as 1080° C.; such as 1100° C.; such as 1200° C.; such as 1150° C.

TABLE 1B

| Example | $M_{LiSalt}$ | $M_{LaSalt}$ | $M_{ZrSalt}$ | $M_{D1Salt}$ | $M_{D1Salt}$ | Anneal Temp (° C.) | Anneal Time (hour) |
|---|---|---|---|---|---|---|---|
| B1 | 6.2-7.2 | 2.8-3.5 | 1.0-2.2 | 0-0.8 | 0-0.8 | 1000-1200 | 7-20 |
| B2 | 6.5-7.1 | 2.9-3.3 | 1.2-2.0 | 0.2-0.8 | 0.2-0.8 | 1000-1200 | 7-20 |
| B3 | 6.7-7.0 | 3.0-3.1 | 1.5-2.0 | 0.5-0.8 | 0.5-0.8 | 1000-1200 | 7-20 |

TABLE 1B-continued

| Example | a | b | c | d | e | Anneal Temp (° C.) | Anneal Time (hour) |
|---------|---|---|---|---|---|--------------------|--------------------|
| B1 | 6.2-7.2 | 2.8-3.5 | 1.0-2.2 | 0-0.8 | 0-0.8 | 1000-1200 | 7-20 |
| B2 | 6.5-7.1 | 2.9-3.3 | 1.2-2.0 | 0.2-0.8 | 0.2-0.8 | 1000-1200 | 7-20 |
| B3 | 6.7-7.0 | 3.0-3.1 | 1.5-2.0 | 0.5-0.8 | 0.5-0.8 | 1000-1200 | 7-20 |

Exemplary material in Table 1C (Example #: C1-C6) have a composition of $Li_a La_b D1_c D2_d \ldots DN_n O_v$, designed and prepared such that a ratio of a:b:c:d is about the same ratio of $M_{LiSalt}:M_{LaSalt}:M_{D1Salt}:M_{D2Salt}:M_{DNSalt}$, wherein $4.5 \leq a \leq 7.2$, $2.8 \leq b \leq 3.5$, $1.5 \leq c \leq 2.5$, $0 \leq d \leq 1.2$, $0 \leq n \leq 1.2$, and $2 \leq v \leq 12$, and wherein at least one of $D_1, D_2, \ldots, D_N$ is a metal, and $N \geq 1$. The annealing temperature and annealing time can be controlled from 700 to 1200° C. for 7 to 20 hours. Examples C1-C6 in Table 1C were conducted to prepare solid-state electrolyte materials in the anneal temperate more than 700° C.; for example, between 700° C. to 1000° C.; between 900° C. to 1200° C.; such as 1050° C.; such as 1080° C.; such as 1100° C.; such as 1200° C.; such as 1150° C.; such as 950° C.; such as 900° C.; such as 850° C.; such as 800° C.; such as 750° C. In one example, the solid-state electrolyte material of the ceramic material is cubic structure. In another example, the solid-state electrolyte material includes $Li_5La_3Nb_2O_{12}$, $Li_5La_3Ta_2O_{12}$, $Li_5La_3Ti_2O_{12}$, $Li_6La_3Sr_1Ta_2O_{12}$, $Li_6La_3Ba_1Ta_2O_{12}$, $Li_6La_3Ba_1Ti_2O_{12}$, $Li_{1.26}La_{2.24}Ti_4O_{12}$. The examples can exhibit different structures and ionic conductivities, for example, the ionic conductivity is more than $10^{-3}$-$10^{-4}$ S/cm.

TABLE 1C

| Example | $M_{LiSalt}$ | $M_{LaSalt}$ | $M_{D1Salt}$ | $M_{D2Salt}$ | Anneal Temp (° C.) | Anneal Time (hour) |
|---------|--------------|--------------|--------------|--------------|--------------------|--------------------|
| C1 | 4.5-7.2 | 2.8-3.5 | 1.5-2.5 | 0-1.2 | 700-1200 | 7-20 |
| C2 | 4.4-7.1 | 2.9-3.3 | 1.5-2.2 | 0-1.1 | 700-1200 | 7-20 |
| C3 | 4.3-7.0 | 3.0-3.1 | 1.5-2.1 | 0-1.0 | 700-1200 | 7-20 |
| C4 | 4.5-7.0 | 3.0-3.2 | 1.6-2.1 | 0.1-1.2 | 700-1200 | 7-20 |
| C5 | 4.7-6.9 | 3.0-3.3 | 1.8-2.1 | 0.2-1.2 | 700-1200 | 7-20 |
| C6 | 4.6-7.0 | 3.0-3.4 | 1.9-2.1 | 0.3-1.2 | 700-1200 | 7-20 |

| Example | a | b | c | d | Anneal Temp (° C.) | Anneal Time (hour) |
|---------|---|---|---|---|--------------------|--------------------|
| C1 | 4.5-7.2 | 2.8-3.5 | 1.5-2.5 | 0-1.2 | 700-1200 | 7-20 |
| C2 | 4.4-7.1 | 2.9-3.3 | 1.5-2.2 | 0-1.1 | 700-1200 | 7-20 |
| C3 | 4.3-7.0 | 3.0-3.1 | 1.5-2.1 | 0-1.0 | 700-1200 | 7-20 |
| C4 | 4.5-7.0 | 3.0-3.2 | 1.6-2.1 | 0.1-1.2 | 700-1200 | 7-20 |
| C5 | 4.7-6.9 | 3.0-3.3 | 1.8-2.1 | 0.2-1.2 | 700-1200 | 7-20 |
| C6 | 4.6-7.0 | 3.0-3.4 | 1.9-2.1 | 0.3-1.2 | 700-1200 | 7-20 |

Table 1D shows Example #: D1-D6 of a ceramic material having a chemical composition of $Li_a La_b Ti_c D1_d \ldots DN_n O_v$, wherein $0.9 \leq a \leq 2.0$, $1.5 \leq b \leq 3.0$, $3.0 \leq c \leq 4.5$, $0 \leq d \leq 1.2$, $0 \leq n \leq 1.2$, and $2 \leq v \leq 12$, is designed and prepared such that a ratio of a:b:c:d: $\ldots$ :n is about the same ratio of $M_{LiSalt}:M_{LaSalt}:M_{TiSalt}:M_{D1Salt}: \ldots :M_{DNSalt}$. The annealing temperature and annealing time can be controlled from 700 to 1200° C. for 7 to 20 hours. Examples D1-D6 as described in Table 1D were conducted to prepare solid-state electrolyte materials in the anneal temperate more than 700° C.; for example, between 700° C. to 1000° C.; between 900° C. to 1200° C.; such as 1050° C.; such as 1080° C.; such as 1100° C.; such as 1200° C.; such as 1150° C.; such as 950° C.; such as 900° C.; such as 850° C.; such as 800° C.; such as 750° C. In one example, the solid-state electrolyte material of the ceramic material is perovskite type, cubic structure. In another example, the solid-state electrolyte material of the ceramic material includes $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$. In another example, the solid-state electrolyte material of the ceramic material is perovskite type, tetragonal structure. In another example, the solid-state electrolyte material includes $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$. In yet another example, the solid-state electrolyte material is perovskite type, hexagonal structure. In another example, the solid-state electrolyte material includes $Li_{1.36}La_{2.24}Ti_4O_{12}$, $Li_{1.72}La_{2.24}Ti_{3.8}Ge_{0.2}O_{12}$, $Li_{1.72}La_{2.24}Ti_{3.8}Ge_{0.2}O_{12}$. The examples can exhibit different structures and ionic conductivities, for example, the ionic conductivity is more than $10^{-3}$-$10^{-4}$ S/cm.

TABLE 1D

| Example # | $M_{LiSalt}$ | $M_{LaSalt}$ | $M_{TiSalt}$ | $M_{D1Salt}$ | $M_{D2Salt}$ |
|-----------|--------------|--------------|--------------|--------------|--------------|
| D1 | 0.9-2.0 | 1.5-3.0 | 3.0-4.5 | 0-1.2 | 0-1.2 |
| D2 | 1.0-1.9 | 1.8-2.9 | 3.2-4.2 | 0-1.1 | 0-1.1 |
| D3 | 1.1-1.8 | 1.9-2.8 | 3.3-4.1 | 0-1.0 | 0-1.0 |
| D4 | 1.2-1.7 | 2.0-2.7 | 3.4-4.0 | 0.1-0.9 | 0.1-0.9 |
| D5 | 1.3-1.9 | 2.1-2.7 | 3.5-4.0 | 0.2-0.8 | 0.2-0.8 |
| D6 | 1.3-1.8 | 2.2-2.6 | 3.6-4.0 | 0.3-0.7 | 0.3-0.7 |

| Example # | a | b | c | d | e |
|-----------|---|---|---|---|---|
| D1 | 0.9-2.0 | 1.5-3.0 | 3.0-4.5 | 0-1.2 | 0-1.2 |
| D2 | 1.0-1.9 | 1.8-2.9 | 3.2-4.2 | 0-1.1 | 0-1.1 |
| D3 | 1.1-1.8 | 1.9-2.8 | 3.3-4.1 | 0-1.0 | 0-1.0 |
| D4 | 1.2-1.7 | 2.0-2.7 | 3.4-4.0 | 0.1-0.9 | 0.1-0.9 |
| D5 | 1.3-1.9 | 2.1-2.7 | 3.5-4.0 | 0.2-0.8 | 0.2-0.8 |
| D6 | 1.3-1.8 | 2.2-2.6 | 3.6-4.0 | 0.3-0.7 | 0.3-0.7 |

Exemplary material compositions are shown in Table 1E (Example #: E1-E6), having a composition of $Li_a Al_b P_c D1_d \ldots DN_n O_v$, wherein $1 \leq a \leq 2$, $0.2 \leq b \leq 1.5$, $1.0 \leq c \leq 3.5$, $0 \leq d \leq 2.0$, $0 \leq n \leq 2.0$, and $0.2 \leq v \leq 12$, and wherein at least one of $D_1, D_2, \ldots, DN$ is a metal, and $N \geq 1$, is designed and prepared such that the ratio of a:b:c: d: $\ldots$ :n is about the same ratio of $M_{Lisalt}: M_{AlSalt}:M_{PSalt}:M_{D1Salt}: \ldots :M_{DNSalt}$, and wherein at least one of $D_1, D_2, \ldots, DN$ is a metal, and $N \geq 0$. The annealing temperature and annealing time can be controlled from 700 to 1200° C. for 7 to 20 hours. In one example, the solid-state electrolyte material (e.g. lithium aluminum titanium phosphate oxide material) is sodium superionic conductor (NASICON) type, hexagonal structure (net sure if needed). In another example, the solid-state electrolyte material includes $Li_{1.5}Al_{0.5}Ti_{1.5}P_3O_{12}$, $Li_{1.4}Al_{0.4}Ti_{1.6}P_3O_{12}$, $Li_{1.6}Al_{0.6}Ti_{1.4}P_3O_{12}$, $Li_{1.5}Al_{0.5}Ge_{1.5}P_3O_{12}$, $Li_{1.4}Al_{0.4}Ge_{1.6}P_3O_{12}$, $Li_{1.6}Ge_{0.6}Ti_{1.4}P_3O_{12}$, and combinations thereof. The examples can exhibit different structures and ionic conductivities, for example, the ionic conductivity is more than $10^{-3}$-$10^{-4}$ S/cm, or more than $5 \times 10^{-4}$ S/cm, more than $8 \times 10^{-3}$ S/cm, more than $9 \times 10^{-3}$ S/cm.

TABLE 1E

| Example # | $M_{LiSalt}$ | $M_{AlSalt}$ | $M_{PSalt}$ | $M_{D1Salt}$ | $M_{D2Salt}$ |
|---|---|---|---|---|---|
| E1 | 1.0-2.0 | 0.2-1.5 | 1.0-3.5 | 0-2.0 | 0-2.0 |
| E2 | 1.2-1.9 | 0.3-1.3 | 1.2-3.3 | 1.0-1.9 | 1.0-1.9 |
| E3 | 1.4-1.8 | 0.3-1.2 | 1.4-3.2 | 1.1-1.9 | 1.1-1.9 |
| E4 | 1.4-1.7 | 0.4-1.0 | 1.6-3.1 | 1.1-1.8 | 1.1-1.8 |
| E5 | 1.4-1.8 | 0.4-0.8 | 2.0-3.1 | 1.2-1.7 | 1.2-1.7 |
| E6 | 1.4-1.9 | 0.4-0.7 | 2.5-3.1 | 1.3-1.6 | 1.3-1.6 |

| Example # | a | b | c | d | e |
|---|---|---|---|---|---|
| E1 | 1.0-2.0 | 0.2-1.5 | 1.0-3.5 | 0-2.0 | 0-2.0 |
| E2 | 1.2-1.9 | 0.3-1.3 | 1.2-3.3 | 1.0-1.9 | 1.0-1.9 |
| E3 | 1.4-1.8 | 0.3-1.2 | 1.4-3.2 | 1.1-1.9 | 1.1-1.9 |
| E4 | 1.4-1.7 | 0.4-1.0 | 1.6-3.1 | 1.1-1.8 | 1.1-1.8 |
| E5 | 1.4-1.8 | 0.4-0.8 | 2.0-3.1 | 1.2-1.7 | 1.2-1.7 |
| E6 | 1.4-1.9 | 0.4-0.7 | 2.5-3.1 | 1.3-1.6 | 1.3-1.6 |

Exemplary material compositions shown in Table 1F (Example #: F1-F6) is a ceramic material having a composition of $Li_a Ge_b P_c D1_d \ldots DN_n O_v$, wherein $10 \leq a \leq 13$, $0.1 \leq b \leq 2.0$, $0.1 \leq c \leq 1.5$, $0.1 \leq d \leq 2.0$, $0.1 \leq n \leq 2.0$, $2 \leq v \leq 12$, and wherein at least one of $D_1, D_2, \ldots, D_N$ is a metal, $N \geq 0$, is designed and prepared such that the ratio of a:b:c:d is about the same ratio of $M_{LiSalt}:M_{GeSalt}:M_{PSalt}:M_{D1Salt}: \ldots : M_{DNSalt}$. The annealing temperature and annealing time can be controlled from 700 to 1200° C. for 7 to 20 hours. In one example, the solid-state electrolyte material of the ceramic material is Lithium Super Ionic CONductor (LISiCON) type structure, $Li_{12}Ge_{0.5}Al_{1.0}Si_{0.5}P_{1.0}O_{12}$, $Li_{10.59}Ge_{1.5}V_{0.9}P_{0.53}O_{12}$, and combinations thereof.

TABLE 1F

| Example # | $M_{LiSalt}$ | $M_{GeSalt}$ | $M_{PSalt}$ | $M_{D1Salt}$ | $M_{D2Salt}$ |
|---|---|---|---|---|---|
| F1 | 10-13 | 0.1-2.0 | 0.1-1.5 | 0.1-2.0 | 0-2.0 |
| F2 | 10-12.5 | 0.2-1.9 | 0.2-1.4 | 0.2-1.8 | 0-1.8 |
| F3 | 10-12 | 0.3-1.8 | 0.3-1.3 | 0.3-1.6 | 0-1.6 |
| F4 | 10.5-12.5 | 0.4-1.7 | 0.4-1.2 | 0.4-1.5 | 0-1.5 |
| F5 | 10.5-12 | 0.4-1.6 | 0.5-1.1 | 0.5-1.0 | 0-1.0 |
| F6 | 10.5-11 | 0.5-1.6 | 0.5-1.0 | 0.5-0.8 | 0-0.8 |

| Example # | a | b | c | d | e |
|---|---|---|---|---|---|
| F1 | 10-13 | 0.1-2.0 | 0.1-1.5 | 0.1-2.0 | 0-2.0 |
| F2 | 10-12.5 | 0.2-1.9 | 0.2-1.4 | 0.2-1.8 | 0-1.8 |
| F3 | 10-12 | 0.3-1.8 | 0.3-1.3 | 0.3-1.6 | 0-1.6 |
| F4 | 10.5-12.5 | 0.4-1.7 | 0.4-1.2 | 0.4-1.5 | 0-1.5 |
| F5 | 10.5-12 | 0.4-1.6 | 0.5-1.1 | 0.5-1.0 | 0-1.0 |
| F6 | 10.5-11 | 0.5-1.6 | 0.5-1.0 | 0.5-0.8 | 0-0.8 |

Exemplary materials shown in Table 1G (Example #: G1-G6) are a ceramic material having a chemical composition of $Li_a P_b O_c N_d$, wherein $1.5 \leq a \leq 4.0$, $0.5 \leq b \leq 2.0$, $1.0 \leq c \leq 4.0$, and $0.01 \leq d \leq 2.0$, is designed and prepared such that the ratio of a: b:c:d is about the same ratio of $M_{Lisalt}:M_{PSalt}: M_{NSalt}$. The annealing temperature and annealing time can be controlled from 700 to 1200° C. for 7 to 20 hours. In one example, the solid-state electrolyte material is lithium phosphorus oxynitride (LiPON) type having amorphous structure, e.g., $Li_{2.88}P_{1.0}O_{3.73}N_{0.14}$, $Li_{1.9}Si_{0.28}P_{1.0}O_{1.1}N_{1.0}$, with ionic conductivity of more than $10^{-5}$-$10^{-6}$ S/cm, or more than $6 \times 10^{-6}$, or more than $6 \times 10^{-5}$ S/cm, or more than $9 \times 10^{-5}$ S/cm.

TABLE 1G

| Example # | $M_{LiSalt}$ | $M_{PSalt}$ | O??? | $M_{NSalt}$ |
|---|---|---|---|---|
| G1 | 1.5-4.0 | 0.2-2.0 | 1.0-4.0 | 0.01-2.0 |
| G2 | 1.8-3.5 | 0.3-1.8 | 1.1-3.8 | 0.1-1.8 |

TABLE 1G-continued

| | | | | |
|---|---|---|---|---|
| G3 | 1.9-3.2 | 0.4-1.7 | 1.3-3.8 | 0.1-1.6 |
| G4 | 2.1-3.0 | 0.5-1.6 | 1.5-3.8 | 0.1-1.5 |
| G5 | 2.3-2.9 | 0.6-1.5 | 1.7-3.8 | 0.1-1.3 |
| G6 | 2.6-2.9 | 0.7-1.4 | 1.9-3.8 | 0.1-1.2 |

| Example # | a | b | c | d |
|---|---|---|---|---|
| G1 | 1.5-4.0 | 0.2-2.0 | 1.0-4.0 | 0.01-2.0 |
| G2 | 1.8-3.5 | 0.3-1.8 | 1.1-3.8 | 0.1-1.8 |
| G3 | 1.9-3.2 | 0.4-1.7 | 1.3-3.8 | 0.1-1.6 |
| G4 | 2.1-3.0 | 0.5-1.6 | 1.5-3.8 | 0.1-1.5 |
| G5 | 2.3-2.9 | 0.6-1.5 | 1.7-3.8 | 0.1-1.3 |
| G6 | 2.6-2.9 | 0.7-1.4 | 1.9-3.8 | 0.1-1.2 |

Exemplary materials shown in Table 2A (Example #: H1-H6) are sulfide material with a composition of $Li_a P_b S_c D1_d \ldots DN_n X_v$, wherein $3 \leq a \leq 16$, $0.5 \leq b \leq 4.5$, $3 \leq c \leq 16$, $0 \leq d \leq 1.5$, $0 \leq n \leq 1.5$, $0 \leq v \leq 4$, and wherein at least one of $D_1$, $D_2, \ldots, D_N$ is a metal, $N \geq 0$, and X is a halogen, is designed and prepared such that the ratio of a:b:c:d: ... :n is about the same ratio of $M_{LiSalt}:M_{PSalt}:M_{SSalt}:M_{D1Salt}: \ldots :M_{DNSalt}$. The annealing temperature and annealing time can be controlled from 700 to 1200° C. for 7 to 20 hours. In one example, the solid-state electrolyte material of the sulfide material is amorphous structure. In another example, the solid-state electrolyte material of the sulfide material is cubic structure. The solid-state electrolyte material of the sulfide material includes $Li_7P_3S_{11}$, $Li_3P_1S_4$, $Li_6P_1S_5Cl$, $Li_6P_1S_5Br_1$, $Li_6P_1S_5I$, $Li_6P_1S_5F_1$, $Li_7P_2S_8I_1$, $Li_7P_2S_8Br_1$, $Li_7P_2S_8Cl_1$, $Li_7P_2S_8F_1$, $Li_{15}P_4S_{16}Cl_3$, $Li_{14.8} Mg_{0.1}P_4S_{16}Cl_3$, $Li_{9.54}Si_{1.74}P_{1.44}S_{11.7}Cl_{0.3}$, $Li_{10}Ge_1P_2S_{12}$, $Li_{10}Si_1P_2S_{12}$, $Li_{10}Sn_1P_2S_{12}$, $Li_{10}Si_{0.3}Sn_{0.7}P_2S_{12}$, $Li_{10}Al_{0.3}Sn_{0.7}P_2S_{12}$, $Li_{11}Al_1P_2S_{12}$, with ionic conductivities, for example, of more than $10^{-3}$-$10^{-9}$ S/cm, preferably more than $8 \times 10^{-5}$ S/cm, preferably more than $4 \times 10^{-3}$ S/cm, preferably more than $5 \times 10^{-3}$ S/cm, preferably more than $6 \times 10^{-3}$ S/cm, preferably more than $7 \times 10^{-3}$ S/cm, preferably more than $8 \times 10^{-3}$ S/cm, preferably more than $9 \times 10^{-3}$ S/cm.

TABLE 2A

| Example # | $M_{LiSalt}$ | $M_{PSalt}$ | $Ms_{Salt}$ | $M_{D1Salt}$ | $M_{D2Salt}$ |
|---|---|---|---|---|---|
| H1 | 3.0-16.0 | 0.5-4.5 | 3.0-16 | 0.0-1.5 | 0.0-1.5 |
| H2 | 4.0-15.0 | 0.8-4.0 | 3.3-16 | 0.1-1.3 | 0.0-1.3 |
| H3 | 5.0-14.0 | 0.9-3.8 | 3.6-16 | 0.3-1.1 | 0.0-1.1 |
| H4 | 6.0-13.0 | 1.0-3.6 | 3.8-16 | 0.5-1.0 | 0.0-1.0 |
| H5 | 6.0-12.0 | 1.0-3.3 | 3.9-16 | 0.6-1.0 | 0.0-0.9 |
| H6 | 6.0-11.0 | 1.0-3.0 | 4.0-16 | 0.7-1.0 | 0.1-1.0 |

| Example # | a | b | c | d | e |
|---|---|---|---|---|---|
| H1 | 3.0-16.0 | 0.5-4.5 | 3.0-16 | 0.0-1.5 | 0.0-1.5 |
| H2 | 4.0-15.0 | 0.8-4.0 | 3.3-16 | 0.1-1.3 | 0.0-1.3 |
| H3 | 5.0-14.0 | 0.9-3.8 | 3.6-16 | 0.3-1.1 | 0.0-1.1 |
| H4 | 6.0-13.0 | 1.0-3.6 | 3.8-16 | 0.5-1.0 | 0.0-1.0 |
| H5 | 6.0-12.0 | 1.0-3.3 | 3.9-16 | 0.6-1.0 | 0.0-0.9 |
| H6 | 6.0-11.0 | 1.0-3.0 | 4.0-16 | 0.7-1.0 | 0.1-1.0 |

Exemplary material compositions in Table 2B (Example #: I1-I6) include a sulfide material having a composition of $Li_a P_b S_c$, where $3 \leq a \leq 16$, $0.5 \leq b \leq 4.5$, and $3 \leq c \leq 16$, is designed and prepared such that the ratio of a:b:c is about the same ratio of $M_{LiSalt}:M_{PSalt}:M_{SSalt}$. The annealing temperature and annealing time can be controlled from 700 to 1200° C. for 7 to 20 hours. Examples I1-I6 as described in Table 2B were conducted to prepare solid-state electrolyte materials in the anneal temperate more than 700° C.; for example, between 700° C. to 1000° C.; between 900° C. to 1200° C.; such as 1050° C.; such as 1080° C.; such as 1100° C.; such as 1200° C.; such as 1150° C.; such as 950° C.; such as 900° C.; such as 850° C.; such as 800° C.; such as 750° C.

In one example, the solid-state electrolyte material of the sulfide material is in orthorhombic structure or triclinic structure, and includes $Li_3PS_4$, $Li_7P_3S_{11}$, with different ionic conductivities, for example, the ionic conductivity is more than $10^{-3}$ S/cm, preferably more than $8\times10^{-4}$ S/cm, preferably more than $9\times10^{-4}$ S/cm, preferably more than $2\times10^{-3}$ S/cm, preferably more than $4\times10^{-3}$ S/cm, preferably more than $5\times10^{-3}$ S/cm, preferably more than $6\times10^{-3}$ S/cm, preferably more than $7\times10^{-3}$ S/cm, preferably more than $8\times10^{-3}$ S/cm, preferably more than $9\times10^{-3}$ S/cm.

TABLE 2B

| Example # | $M_{LiSalt}$ | $M_{PSalt}$ | $Ms_{Salt}$ | Anneal Temp (° C.) | Anneal Time (hour) |
|---|---|---|---|---|---|
| I1 | 3.0-16.0 | 0.5-4.5 | 3.0-16 | 700-1200 | 7-20 |
| I2 | 3.0-15.0 | 0.8-4.0 | 3.3-16 | 700-1200 | 7-20 |
| I3 | 3.0-14.0 | 0.9-3.8 | 3.6-16 | 700-1200 | 7-20 |
| I4 | 3.0-13.0 | 1.0-3.6 | 3.8-16 | 700-1200 | 7-20 |
| I5 | 3.0-12.0 | 1.0-3.3 | 3.9-16 | 700-1200 | 7-20 |
| I6 | 3.0-11.0 | 1.0-3.0 | 4.0-16 | 700-1200 | 7-20 |

| Example | a | b | c | Anneal Temp (° C.) | Anneal Time (hour) |
|---|---|---|---|---|---|
| I1 | 3.0-16.0 | 0.5-4.5 | 3.0-16 | 700-1200 | 7-20 |
| I2 | 3.0-15.0 | 0.8-4.0 | 3.3-16 | 700-1200 | 7-20 |
| I3 | 3.0-14.0 | 0.9-3.8 | 3.6-16 | 700-1200 | 7-20 |
| I4 | 3.0-13.0 | 1.0-3.6 | 3.8-16 | 700-1200 | 7-20 |
| I5 | 3.0-12.0 | 1.0-3.3 | 3.9-16 | 700-1200 | 7-20 |
| I6 | 3.0-11.0 | 1.0-3.0 | 4.0-16 | 700-1200 | 7-20 |

Exemplary materials shown in Table 2C (Example #: J1-J6) are sulfide material having a composition of $Li_a\ P_b\ S_c\ D1_d\ \ldots\ DN_n\ O_v$, wherein $5\leq a\leq16$, $0.5\leq b\leq4.5$, $3\leq c\leq16$, $0\leq d\leq1.5$, $0\leq n\leq1.5$, $0\leq v\leq4$, is designed and prepared such that the ratio of a:b:c: . . . :n is about the same ratio of $M_{LiSalt}:M_{PSalt}:M_{SSalt}:M_{D1Salt}:\ \ldots\ :M_{DNSalt}$. The annealing temperature and annealing time can be controlled from 700 to 1200° C. for 7 to hours, and the solid-state electrolyte material includes $Li_{10}SiP_2S_{11.3}O_{0.7}$, $Li_{9.42}Si_{1.02}P_{2.1}S_{9.96}O_{2.04}$.

TABLE 2C

| Example # | $M_{LiSalt}$ | $M_{PSalt}$ | $Ms_{Salt}$ | $M_{D1Salt}$ | $M_{D2Salt}$ |
|---|---|---|---|---|---|
| J1 | 5.0-16.0 | 0.5-4.5 | 3.0-16 | 0.0-1.5 | 0.0-1.5 |
| J2 | 6.0-15.0 | 0.8-4.0 | 4.0-15 | 0.1-1.3 | 0.0-1.3 |
| J3 | 7.0-14.0 | 0.9-3.8 | 5.0-14 | 0.3-1.1 | 0.0-1.1 |
| J4 | 8.0-13.0 | 1.5-3.6 | 6.0-13 | 0.5-1.0 | 0.0-1.0 |
| J5 | 8.0-12.0 | 1.8-3.3 | 7.0-12 | 0.6-1.0 | 0.0-0.9 |
| J6 | 8.0-11.0 | 2.0-3.0 | 8.0-12 | 0.7-1.0 | 0.1-1.0 |

| Example # | a | b | c | d | e |
|---|---|---|---|---|---|
| J1 | 5.0-16.0 | 0.5-4.5 | 3.0-16 | 0.0-1.5 | 0.0-1.5 |
| J2 | 6.0-15.0 | 0.8-4.0 | 4.0-15 | 0.1-1.3 | 0.0-1.3 |
| J3 | 7.0-14.0 | 0.9-3.8 | 5.0-14 | 0.3-1.1 | 0.0-1.1 |
| J4 | 8.0-13.0 | 1.5-3.6 | 6.0-13 | 0.5-1.0 | 0.0-1.0 |
| J5 | 8.0-12.0 | 1.8-3.3 | 7.0-12 | 0.6-1.0 | 0.0-0.9 |
| J6 | 8.0-11.0 | 2.0-3.0 | 8.0-12 | 0.7-1.0 | 0.1-1.0 |

Exemplary material compositions in Table 2D (Example #: K1-K6) are sulfide material having a composition of $Li_a\ X_b\ P_c\ S_d$, wherein $9\leq a\leq12$, $0.5\leq b\leq1.5$, $1.5\leq c\leq3.0$, and $11\leq d\leq15$, and wherein X is a metal, is designed and prepared such that the ratio of a:b:c:d is about the same ratio of $M_{LiSalt}:M_{XSalt}:M_{PSalt}:M_{SSalt}$. The annealing temperature and annealing time can be controlled from 700 to 1200° C. for 7 to 20 hours. The solid-state electrolyte material of the sulfide material includes $Li_{10}GeP_2S_{12}$, $Li_{10}SiP_2S_{12}$, exhibiting different structures and ionic conductivities, for example, the ionic conductivity is more than $10^{-3}$-$10^{-8}$ S/cm, preferably more than $5\times10^{-7}$ S/cm, preferably more than $8\times10^{-5}$ S/cm, preferably more than $9\times10^{-5}$ S/cm, preferably more than $5\times10^{-4}$, preferably more than $8\times10^{-4}$ S/cm, preferably more than $2\times10^{-3}$, preferably more than $4\times10^{-3}$ S/cm, preferably more than $5\times10^{-3}$ S/cm, preferably more than $6\times10^{-3}$ S/cm, preferably more than $7\times10^{-3}$ S/cm, preferably more than $8\times10^{-3}$ S/cm, preferably more than $9\times10^{-3}$ S/cm.

TABLE 2D

| Example # | $M_{LiSalt}$ | $M_{XSalt}$ | $M_{PSalt}$ | $M_{SSalt}$ |
|---|---|---|---|---|
| K1 | 9.0-12.0 | 0.5-1.5 | 1.5-16 | 11-15 |
| K2 | 9.5-11.8 | 0.6-1.3 | 1.6-15 | 11.1-14.8 |
| K3 | 9.8-11.7 | 0.7-1.2 | 1.7-14 | 11.3-14.5 |
| K4 | 9.9-11.6 | 0.8-1.1 | 1.8-13 | 11.5-14.0 |
| K5 | 9.9-11.7 | 0.9-1.1 | 1.9-12 | 11.6-13.5 |
| K6 | 10.0-11.9 | 0.9-1.0 | 2.0-12 | 11.7-13.0 |

| Example # | a | b | c | d |
|---|---|---|---|---|
| K1 | 9.0-12.0 | 0.5-1.5 | 1.5-16 | 11-15 |
| K2 | 9.5-11.8 | 0.6-1.3 | 1.6-15 | 11.1-14.8 |
| K3 | 9.8-11.7 | 0.7-1.2 | 1.7-14 | 11.3-14.5 |
| K4 | 9.9-11.6 | 0.8-1.1 | 1.8-13 | 11.5-14.0 |
| K5 | 9.9-11.7 | 0.9-1.1 | 1.9-12 | 11.6-13.5 |
| K6 | 10.0-11.9 | 0.9-1.0 | 2.0-12 | 11.7-13.0 |

Table 3-5 are testing results of measured solid-state electrolyte materials lithium-oxide garnets (Example #1-#3) annealed at 950° C. for 8 hours having a chemical composition of $Li_a\ La_b\ Zr_c\ Al_d\ O_v$, is designed and prepared such that the ratio of a:b:c:d is about the same ratio of $M_{LiSalt}:M_{LaSalt}:M_{ZrSalt}:M_{AlSalt}$, wherein $6.2\leq a\leq7.2$, $2.8\leq b\leq3.5$, $1.2\leq c\leq2.2$, $2.0\leq v\leq12$. In one example, one observation is that the testing results of the ratio of the measured Al-doped LLZO material compositions of Li:La:Zr:Al after annealing are within an expected range from the prepared molar ratio of $M_{LiSalt}:M_{LaSalt}:M_{ZrSalt}:M_{AlSalt}$; being prepared; for example, the ratio of Al-doped LLZO being prepared is between $6.2\leq M_{LiSalt}\leq7.2:2.8\leq M_{LaSalt}\leq3.5:1.0\leq M_{ZrSalt}\leq2.2:0\leq M_{AlSalt}\leq0.8$; such as $6.4\leq M_{LiSalt}\leq6.9:2.4\leq M_{LaSalt}\leq3.0:1.3\leq M_{ZrSalt}\leq2.0:0\leq M_{AlSalt}\leq0.5$; such as $6.5\leq M_{LiSalt}\leq6.9:2.5\leq M_{LaSalt}\leq2.95:1.5\leq M_{ZrSalt}\leq2.0:0.1\leq M_{AlSalt}\leq0.25$; such as $6.8\leq M_{LiSalt}\leq7.2:2.6\leq M_{LaSalt}\leq3.2:1.7\leq M_{ZrSalt}\leq2.1:0.2\leq M_{AlSalt}\leq0.3$; such as $6.9\leq M_{LiSalt}\leq7.1:2.8\leq M_{LaSalt}\leq2.9:1.8\leq M_{ZrSalt}\leq2.1:0.2\leq M_{AlSalt}\leq0.28$; such as $6.4\leq M_{LiSalt}\leq7.2:2.6\leq M_{LaSalt}\leq2.98:1.9\leq M_{ZrSalt}\leq2.0:0.2\leq M_{AlSalt}\leq0.29$.

The content of each metal within the obtained Al-doped LLZO materials are being analyzed by an inductively coupled plasma ("ICP") analyzer after annealing process which is between $6.2\leq a\leq7.2:2.8\leq b\leq3.5:1.0\leq c\leq2.2:0\leq d\leq0.8$; such as $6.4\leq a\leq6.9:2.4\leq b\leq3.0:1.3\leq c\leq2.0:0\leq d\leq0.5$; such as $6.5\leq a\leq6.9:2.5\leq b\leq2.95:1.5\leq c\leq2.0:0.1\leq d\leq0.25$; such as $6.8\leq a\leq7.2:2.6\leq b\leq3.2:1.7\leq c\leq2.1:0.25\leq d\leq0.3$; such as $6.9\leq a\leq7.1:2.8\leq b\leq2.9:1.8\leq c\leq2.1:0.2\leq d\leq0.28$; such as $6.4\leq a\leq7.2:2.6\leq b\leq2.98:1.95\leq c\leq2.0:0.2\leq d\leq0.26$.

TABLE 3

Exemplary compositions of measured Al-doped LLZO materials

| Example #1 | Li | La | Zr | Al |
|---|---|---|---|---|
| Content of Metal Salts Solutions | 6.45 | 2.95 | 2.0 | 0.24 |
| Content of Each Metal within the Obtained Powder Material as measured by ICP | 6.91 | 2.59 | 2.0 | 0.24 |
| Content of Each Metal within the Obtained Material after Annealing | 6.76 | 2.87 | 2.0 | 0.24 |

TABLE 4

Exemplary compositions of measured Al-doped LLZO materials

| Example #2 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.69 | 2.87 | 2.0 | 0.22 |
| Content of Each Metal within the Obtained Material after Annealing | 6.54 | 2.82 | 2.0 | 0.24 |

In one example, the compositions of the tested Al-doped LLZO materials is $Li_{6.76} La_{2.87} Zr_{2.0} Al_{0.24} O_{12.35}$ as shown in Table 3; and its X-ray Diffraction ("XRD") result exhibits a cubic structure. In another example, the compositions of the tested Al-doped LLZO materials is $Li_{6.54} La_{2.82} Zr_{2.0} Al_{0.24} O_{12.08}$ as shown in Table 4; and its X-ray Diffraction ("XRD") result exhibits a cubic structure. In yet another example, the compositions of the tested Al-doped LLZO materials is $Li_{6.74} La_{2.96} Zr_{2.0} Al_{1.25} O_{12.45}$ as shown in Table 5; and its X-ray Diffraction ("XRD") result exhibits a cubic structure.

TABLE 5

Exemplary compositions of measured Al-doped LLZO materials

| Example #3 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.74 | 2.96 | 2.0 | 0.25 |

Table 6-8 illustrates testing results of measured solid-state electrolyte materials (Example #4-#6) annealed at 1150° C. for 15 hours having a chemical composition of $Li_a La_b Zr_c Al_d O_v$, is designed and prepared such that the ratio of a:b:c:d is about the same ratio of $M_{LiSalt}:M_{LaSalt}:M_{ZrSalt}:M_{AlSalt}$, wherein $6.2 \leq a \leq 7.2$, $2.8 \leq b \leq 3.5$, $1.2 \leq c \leq 2.2$, $2.0 \leq v \leq 12$. In one example, one observation is that the testing results of the ratio of the measured Al-doped LLZO material compositions of Li:La:Zr:Al after annealing are within an expected range from the prepared molar ratio of $M_{LiSalt}:M_{LaSalt}:M_{ZrSalt}:M_{AlSalt}$ being prepared; for example, between $6.2 \leq M_{LiSalt} \leq 7.2 : 2.8 \leq M_{LaSalt} \leq 3.5 : 1.0 \leq M_{ZrSalt} \leq 2.2 : 0 \leq M_{AlSalt} \leq 0.8$; such as $6.4 \leq M_{LiSalt} \leq 6.9 : 2.4 \leq M_{LaSalt} \leq 3.0 : 1.3 \leq M_{ZrSalt} \leq 2.0 : 0 \leq M_{AlSalt} \leq 0.5$; such as $6.5 \leq M_{LiSalt} \leq 6.9 : 2.5 \leq M_{LaSalt} \leq 2.95 : 1.5 \leq M_{ZrSalt} \leq 2.0 : 0.1 \leq M_{AlSalt} \leq 0.25$; such as $6.8 \leq M_{LiSalt} \leq 7.2 : 2.6 \leq M_{LaSalt} \leq 3.2 : 1.7 \leq M_{ZrSalt} \leq 2.1 : 0.2 \leq M_{AlSalt} \leq 0.3$; such as $6.9 \leq M_{LiSalt} \leq 7.1 : 2.8 \leq M_{LaSalt} \leq 2.9 : 1.8 \leq M_{ZrSalt} \leq 2.1 : 0.2 \leq M_{AlSalt} \leq 0.28$; such as $6.4 \leq M_{LiSalt} \leq 7.2 : 2.6 \leq M_{LaSalt} \leq 2.98 : 1.9 \leq M_{ZrSalt} \leq 2.0 : 0.2 \leq M_{AlSalt} \leq 0.29$.

The content of each metal within the obtained Al-doped LLZO materials are being analyzed by an inductively coupled plasma ("ICP") analyzer after annealing process which is between $6.2 \leq a \leq 7.2 : 2.8 \leq b \leq 3.5 : 1.0 \leq c \leq 2.2 : 0 \leq d \leq 0.8$; such as $6.4 \leq a \leq 6.9 : 2.4 \leq b \leq 3.0 : 1.3 \leq c \leq 2.0 : 0 \leq d \leq 0.5$; such as $6.5 \leq a \leq 6.9 : 2.5 \leq b \leq 2.95 : 1.5 \leq c \leq 2.0 : 0.1 \leq d \leq 0.25$; such as $6.8 \leq a \leq 7.2 : 2.6 \leq b \leq 3.2 : 1.7 \leq c \leq 2.1 : 0.2 \leq d \leq 0.3$; such as $6.9 \leq a \leq 7.1 : 2.8 \leq b \leq 2.9 : 1.8 \leq c \leq 2.1 : 0.2 \leq d \leq 0.28$; such as $6.4 \leq a \leq 7.2 : 2.6 \leq b \leq 2.98 : 1.9 \leq c \leq 2.0 : 0.2 \leq d \leq 0.26$.

TABLE 6

Exemplary compositions of measured Al-doped LLZO materials

| Example #4 | Li | La | Zr | Al |
|---|---|---|---|---|
| Content of Metal Salts Solutions | 6.45 | 2.95 | 2.0 | 0.24 |
| Content of Each Metal within the Obtained Powder Material as measured by ICP | 6.91 | 2.59 | 2.0 | 0.24 |
| Content of Each Metal within the Obtained Material after Annealing | 6.32 | 3.20 | 2.0 | 0.46 |

TABLE 7

Exemplary compositions of measured LLZO materials

| Example #5 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.69 | 2.87 | 2.0 | 0.24 |
| Content of Each Metal within the Obtained Material after Annealing | 6.49 | 3.28 | 2.0 | 0.31 |

In one example, the compositions of the tested Al-doped LLZO materials is $Li_{6.32} La_{3.2} Zr_{2.0} Al_{0.46} O_{12.9}$ as shown in Table 6; and its X-ray Diffraction ("XRD") result exhibits a cubic structure. In another example, the compositions of the tested Al-doped LLZO materials is $Li_{6.49} La_{3.28} Zr_{2.0} Al_{0.31} O_{12.7}$ as shown in Table 7; and its X-ray Diffraction ("XRD") result exhibits a cubic structure. In yet another example, the compositions of the tested Al-doped LLZO materials is $Li_{6.27} La_{3.22} Zr_{2.0} Al_{0.3} O_{12.39}$ as shown in Table 8; and its X-ray Diffraction ("XRD") result exhibits a cubic structure.

TABLE 8

Exemplary compositions of measured LLZO materials

| Example #6 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.27 | 3.22 | 2.0 | 0.30 |

Table 9 illustrates testing results of measured solid-state electrolyte materials (Example #7) annealed at 1050° C. for 8 hours having a chemical composition of $Li_a La_b Zr_c Al_d O_v$, is designed and prepared such that the ratio of a:b:c:d is about the same ratio of $M_{LiSalt}:M_{LaSalt}:M_{ZrSalt}:M_{AlSalt}$, wherein $6.2 \leq a \leq 7.2$, $2.8 \leq b \leq 3.5$, $1.2 \leq c \leq 2.2$, $2.0 \leq v \leq 12$.

In one example, one observation is that the testing results of the ratio of the measured Al-doped LLZO material compositions of Li:La:Zr:Al after annealing are within an expected range from the prepared molar ratio of $M_{LiSalt}:M_{LaSalt}:M_{ZrSalt}:M_{AlSalt}$ being prepared; for example, between $6.2 \leq M_{LiSalt} \leq 7.2 : 2.8 \leq M_{LaSalt} \leq 3.5 : 1.0 \leq M_{ZrSalt} \leq 2.2 : 0 \leq M_{AlSalt} \leq 0.8$; such as $6.4 \leq M_{LiSalt} \leq 6.9 : 2.4 \leq M_{LaSalt} \leq 3.0 : 1.3 \leq M_{ZrSalt} \leq 2.0 : 0 \leq M_{AlSalt} \leq 0.5$; such as $6.5 \leq M_{LiSalt} \leq 6.9 : 2.5 \leq M_{LaSalt} \leq 2.95 : 1.5 \leq M_{ZrSalt} \leq 2.0 : 0.1 \leq M_{AlSalt} \leq 0.25$; such as $6.8 \leq M_{LiSalt} \leq 7.2 : 2.6 \leq M_{LaSalt} \leq 3.2 : 1.7 \leq M_{ZrSalt} \leq 2.1 : 0.2 \leq M_{AlSalt} \leq 0.3$; such as $6.9 \leq M_{LiSalt} \leq 7.1 : 2.8 \leq M_{LaSalt} \leq 2.9 : 1.8 \leq M_{ZrSalt} \leq 2.1 : 0.2 \leq M_{AlSalt} \leq 0.28$; such as $6.4 \leq M_{LiSalt} \leq 7.2 : 2.6 \leq M_{LaSalt} \leq 2.98 : 1.9 \leq M_{ZrSalt} \leq 2.0 : 0.2 \leq M_{AlSalt} \leq 0.29$.

The content of each metal within the obtained Al-doped LLZO materials are being analyzed by an inductively coupled plasma ("ICP") analyzer after annealing process which is $6.2 \leq a \leq 7.2 : 2.8 \leq b \leq 3.5 : 1.0 \leq c \leq 2.2 : 0 \leq d \leq 0.8$; such as $6.4 \leq a \leq 6.9 : 2.4 \leq b \leq 3.0 : 1.3 \leq c \leq 2.0 : 0 \leq d \leq 0.5$; such as $6.5 \leq a \leq 6.9 : 2.5 \leq b \leq 2.95 : 1.5 \leq c \leq 2.0 : 0.1 \leq d \leq 0.25$; such as $6.8 \leq a \leq 7.2 : 2.6 \leq b \leq 3.2 : 1.7 \leq c \leq 2.1 : 0.2 \leq d \leq 0.3$; such as $6.9 \leq a \leq 7.1 : 2.8 \leq b \leq 2.9 : 1.8 \leq c \leq 2.1 : 0.2 \leq d \leq 0.28$; such as $6.4 \leq a \leq 7.2 : 2.6 \leq b \leq 2.98 : 1.9 \leq c \leq 2.0 : 0.2 \leq d \leq 0.26$.

In one example, the compositions of the tested Al-doped LLZO materials is $Li_{6.4}La_{2.86}Zr_{2.0}Al_{0.24}O_{11.98}$ as shown in Table 9; and its X-ray Diffraction ("XRD") result exhibits a cubic structure.

TABLE 9

| Exemplary compositions of measured Al-doped LLZO materials | | | | |
|---|---|---|---|---|
| Example #7 | Li | La | Zr | Al |
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.40 | 2.86 | 2.0 | 0.24 |

Table 10-11 illustrates testing results of measured solid-state electrolyte materials (Example #8-9) annealed at 850° C. for 8 hours having a chemical composition of $Li_a La_b Zr_c Al_d O_v$, is designed and prepared such that a ratio of a:b:c:d is about the same ratio of $M_{LiSalt} : M_{LaSalt} : M_{ZrSalt} : M_{AlSalt}$, wherein $6.2 \leq a \leq 7.2$, $2.8 \leq b \leq 3.5$, $1.2 \leq c \leq 2.2$, $2.0 \leq v \leq 12$.

In one example, one observation is that the testing results of the ratio of the measured Al-doped LLZO material compositions of Li:La:Zr:Al after annealing are within an expected range from the prepared molar ratio of $M_{LiSalt} : M_{LaSalt} : M_{ZrSalt} : M_{AlSalt}$ being prepared; for example, between $6.2 \leq M_{LiSalt} \leq 7.2 : 2.8 \leq M_{LaSalt} \leq 3.5 : 1.0 \leq M_{ZrSalt} \leq 2.2 : 0 \leq M_{AlSalt} \leq 0.8$; such as $6.4 \leq M_{LiSalt} \leq 6.9 : 2.4 \leq M_{LaSalt} \leq 3.0 : 1.3 \leq M_{ZrSalt} \leq 2.0 : 0 \leq M_{AlSalt} \leq 0.5$; such as $6.5 \leq M_{LiSalt} \leq 6.9 : 2.5 \leq M_{LaSalt} \leq 2.95 : 1.5 \leq M_{ZrSalt} \leq 2.0 : 0.1 \leq M_{AlSalt} \leq 0.25$; such as $6.8 \leq M_{LiSalt} \leq 7.2 : 2.6 \leq M_{LaSalt} \leq 3.2 : 1.7 \leq M_{ZrSalt} \leq 2.1 : 0.2 \leq M_{AlSalt} \leq 0.3$; such as $6.9 \leq M_{LiSalt} \leq 7.1 : 2.8 \leq M_{LaSalt} \leq 2.9 : 1.8 \leq M_{ZrSalt} \leq 2.1 : 0.2 \leq M_{AlSalt} \leq 0.28$; such as $6.4 \leq M_{LiSalt} \leq 7.2 : 2.6 \leq M_{LaSalt} \leq 2.98 : 1.9 \leq M_{ZrSalt} \leq 2.0 : 0.2 \leq M_{AlSalt} \leq 0.29$.

The content of each metal within the obtained Al-doped LLZO materials are being analyzed by an inductively coupled plasma ("ICP") analyzer after annealing process which is $6.2 \leq a \leq 7.2 : 2.8 \leq b \leq 3.5 : 1.0 \leq c \leq 2.2 : 0 \leq d \leq 0.8$; such as $6.4 \leq a \leq 6.9 : 2.4 \leq b \leq 3.0 : 1.3 \leq c \leq 2.0 : 0 \leq d \leq 0.5$; such as $6.5 \leq a \leq 6.9 : 2.5 \leq b \leq 2.95 : 1.5 \leq c \leq 2.0 : 0.1 \leq d \leq 0.25$; such as $6.8 \leq a \leq 7.2 : 2.6 \leq b \leq 3.2 : 1.7 \leq c \leq 2.1 : 0.2 \leq d \leq 0.3$; such as $6.9 \leq a \leq 7.1 : 2.8 \leq b \leq 2.9 : 1.8 \leq c \leq 2.1 : 0.2 \leq d \leq 0.28$; such as $6.4 \leq a \leq 7.2 : 2.6 \leq b \leq 2.98 : 1.9 \leq c \leq 2.0 : 0.2 \leq d \leq 0.26$.

TABLE 10

| Exemplary compositions of measured Al-doped LLZO materials | | | | |
|---|---|---|---|---|
| Example #8 | Li | La | Zr | Al |
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.43 | 2.93 | 2.0 | 0.24 |

TABLE 11

| Exemplary compositions of measured Al-doped LLZO materials | | | | |
|---|---|---|---|---|
| Example #9 | Li | La | Zr | Al |
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.57 | 2.99 | 2.0 | 0.22 |

In one example, the compositions of the tested Al-doped LLZO materials is $Li_{6.43}La_{2.93}Zr_{2.0}Al_{0.24}O_{12.08}$ as shown in Table 10; and its X-ray Diffraction ("XRD") result exhibits a cubic structure. In another example, the compositions of the tested Al-doped LLZO materials is $Li_{6.57}La_{2.99}Zr_{2.0}Al_{0.22}O_{12.22}$ as shown in Table 11; and its X-ray Diffraction ("XRD") result exhibits a cubic structure.

Table 12-13 illustrates testing results of measured solid-state electrolyte materials (Example #10-11) annealed at 900° C. for 8 hours having a chemical composition of $Li_a La_b Zr_c Al_d O_v$, is designed and prepared such that the ratio of a:b:c:d is about the same ratio of $M_{LiSalt} : M_{LaSalt} : M_{ZrSalt} : M_{AlSalt}$, wherein $6.2 \leq a \leq 7.2$, $2.8 \leq b \leq 3.5$, $1.2 \leq c \leq 2.2$, $2.0 \leq v \leq 12$.

In one example, one observation is that the testing results of the ratio of the measured Al-doped LLZO material compositions of Li:La:Zr:Al after annealing are within an expected range from the prepared molar ratio of $M_{LiSalt} : M_{LaSalt} : M_{ZrSalt} : M_{LiSalt}$ being prepared; for example, between $6.2 \leq M_{LiSalt} \leq 7.2 : 2.8 \leq M_{LaSalt} \leq 3.5 : 1.0 \leq M_{ZrSalt} \leq 2.2 : 0 \leq M_{AlSalt} \leq 0.8$; such as $6.4 \leq M_{LiSalt} \leq 6.9 : 2.4 \leq M_{LaSalt} \leq 3.0 : 1.3 \leq M_{ZrSalt} \leq 2.0 : 0 \leq M_{AlSalt} \leq 0.5$; such as $6.5 \leq M_{LiSalt} \leq 6.9 : 2.5 \leq M_{LaSalt} \leq 2.95 : 1.5 \leq M_{ZrSalt} \leq 2.0 : 0.1 \leq M_{AlSalt} \leq 0.25$; such as $6.8 \leq M_{LiSalt} \leq 7.2 : 2.6 \leq M_{LaSalt} \leq 3.2 : 1.7 \leq M_{ZrSalt} \leq 2.1 : 0.2 \leq M_{AlSalt} \leq 0.3$; such as $6.9 \leq M_{LiSalt} \leq 7.1 : 2.8 \leq M_{LaSalt} \leq 2.9 : 1.8 \leq M_{ZrSalt} \leq 2.1 : 0.2 \leq M_{AlSalt} \leq 0.28$; such as $6.4 \leq M_{LiSalt} \leq 7.2 : 2.6 \leq M_{LaSalt} \leq 2.98 : 1.9 \leq M_{ZrSalt} \leq 2.0 : 0.2 \leq M_{AlSalt} \leq 0.29$.

The content of each metal within the obtained Al-doped LLZO materials are being analyzed by an inductively coupled plasma ("ICP") analyzer after annealing process which is $6.2 \leq a \leq 7.2 : 2.8 \leq b \leq 3.5 : 1.0 \leq c \leq 2.2 : 0 \leq d \leq 0.8$; such as $6.4 \leq a \leq 6.9 : 2.4 \leq b \leq 3.0 : 1.3 \leq c \leq 2.0 : 0 \leq d \leq 0.5$; such as $6.5 \leq a \leq 6.9 : 2.5 \leq b \leq 2.95 : 1.5 \leq c \leq 2.0 : 0.1 \leq d \leq 0.25$; such as $6.8 \leq a \leq 7.2 : 2.6 \leq b \leq 3.2 : 1.7 \leq c \leq 2.1 : 0.2 \leq d \leq 0.3$; such as $6.9 \leq a \leq 7.1 : 2.8 \leq b \leq 2.9 : 1.8 \leq c \leq 2.1 : 0.2 \leq d \leq 0.28$; such as $6.4 \leq a \leq 7.2 : 2.6 \leq b \leq 2.98 : 1.9 \leq c \leq 2.0 : 0.2 \leq d \leq 0.26$.

In one example, the compositions of the tested Al-doped LLZO materials is $Li_{6.25}La_{3.01}Zr_{2.0}Al_{0.22}O_{11.92}$ as shown in Table 12; and its X-ray Diffraction ("XRD") result exhibits a cubic structure. In another example, the compositions of the tested Al-doped LLZO materials is $Li_{6.49}La_{3.02}Zr_{2.0}Al_{0.23}O_{12.2}$ as shown in Table 13; and its X-ray Diffraction ("XRD") result exhibits a cubic structure.

TABLE 12

Exemplary compositions of measured Al-doped LLZO materials

| Example #10 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.25 | 3.01 | 2.0 | 0.22 |

TABLE 13

Exemplary compositions of measured Al-doped LLZO materials

| Example #11 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.49 | 3.02 | 2.0 | 0.23 |

Table 14 illustrates testing results of measured solid-state electrolyte materials (Example #B1-B3) annealed at 1100° C. for 6 hours having a chemical composition of $Li_a La_b Zr_c Al_d O_v$, is designed and prepared such that a ratio of a:b:c:d is about the same ratio of $M_{LiSalt}:M_{LaSalt}:M_{ZrSalt}:M_{AlSalt}$, wherein $6.2 \leq a \leq 7.2$, $2.8 \leq b \leq 3.5$, $1.2 \leq c \leq 2.2$, $2.0 \leq v \leq 12$.

In one example, one observation is that the testing results of the ratio of the measured Al-doped LLZO material compositions of Li:La:Zr:Al after annealing are within an expected range from the prepared molar ratio of $M_{LiSalt}:M_{LaSalt}:M_{ZrSalt}:M_{AlSalt}$ being prepared; for example, between $6.2 \leq M_{LiSalt} \leq 7.2:2.8 \leq M_{LaSalt} \leq 3.5:1.0 \times M_{ZrSalt} \times 2.2:0 \leq M_{AlSalt} \leq 0.8$; such as $6.4 \leq M_{LiSalt} \leq 6.9:2.4 \leq M_{LaSalt} \leq 3.0:1.3 \leq M_{ZrSalt} \leq 2.0:0 \leq M_{AlSalt} \leq 0.5$; such as $6.5 \leq M_{LiSalt} \leq 6.9:2.5 \leq M_{LaSalt} \leq 2.95:1.5 \leq M_{ZrSalt} \leq 2.0:0.1 \leq M_{AlSalt} \leq 0.25$; such as $6.8 \leq M_{LiSalt} \leq 7.2:2.6 \leq M_{LaSalt} \leq 3.2:1.7 \leq M_{ZrSalt} \leq 2.1:0.2 \leq M_{AlSalt} \leq 0.3$; such as $6.9 \leq M_{LiSalt} \leq 7.1:2.8 \leq M_{LaSalt} \leq 2.9:1.8 \leq M_{ZrSalt} \leq 2.1:0.2 \leq M_{AlSalt} \leq 0.28$; such as $6.4 \leq M_{LiSalt} \leq 7.2:2.6 \leq M_{LaSalt} \leq 2.98:1.9 \leq M_{ZrSalt} \leq 2.0:0.2 \leq M_{AlSalt} \leq 0.29$.

The content of each metal within the obtained Al-doped LLZO materials are being analyzed by an inductively coupled plasma ("ICP") analyzer after annealing process which is $6.2 \leq a \leq 7.2:2.8 \leq b \leq 3.5:1.0 \leq c \leq 2.2:0 \leq d \leq 0.8$; such as $6.4 \leq a \leq 6.9:2.4 \leq b \leq 3.0:1.3 \leq c \leq 2.0:0 \leq d \leq 0.5$; such as $6.5 \leq a \leq 6.9:2.5 \leq b \leq 2.95:1.5 \leq c \leq 2.0:0.1 \leq d \leq 0.25$; such as $6.8 \leq a \leq 7.2:2.6 \leq b \leq 3.2:1.7 \leq c \leq 2.1:0.2 \leq d \leq 0.3$; such as $6.9 \leq a \leq 7.1:2.8 \leq b \leq 2.9:1.8 \leq c \leq 2.1:0.2 \leq d \leq 0.28$; such as $6.4 \leq a \leq 7.2:2.6 \leq b \leq 2.98:1.9 \leq c \leq 2.0:0.2 \leq d \leq 0.26$.

TABLE 14

Exemplary compositions of measured Al-doped LLZO materials

| Example #10 | Li | La | Zr | Al |
|---|---|---|---|---|
| Content of Metal Salts Solutions | 7.06 | 2.98 | 2.0 | 0.24 |
| Content of Each Metal within the Obtained Powder Material as measured by ICP | 6.65 | 2.92 | 2.0 | 0.23 |
| Content of Each Metal within the Obtained Material after Annealing | 6.57 | 2.99 | 2.0 | 0.22 |
| Content of Each Metal within the Obtained Material after 2nd Annealing (e.g. Sintering) | 6.87 | 2.98 | 2.0 | 0.26 |

The content of Al-doped LLZO after the second annealing process for sintering state electrolyte materials into pellets is between $6.2 \leq a \leq 7.2:2.8 \leq b \leq 3.5:1.0 \leq c \leq 2.2:0 \leq d \leq 0.8$; such as $6.4 \leq a \leq 6.9:2.4 \leq b \leq 3.0:1.3 \leq c \leq 2.0:0 \leq d \leq 0.5$; such as $6.5 \leq a \leq 6.9:2.5 \leq b \leq 2.95:1.5 \leq c \leq 2.0:0.1 \leq d \leq 0.25$; such as $6.8 \leq a \leq 7.2:2.6 \leq b \leq 3.2:1.7 \leq c \leq 2.1:0.2 \leq d \leq 0.3$; such as $6.9 \leq a \leq 7.1:2.8 \leq b \leq 2.9:1.8 \leq c \leq 2.1:0.2 \leq d \leq 0.28$; such as $6.4 \leq a \leq 7.2:2.6 \leq b \leq 2.98:1.9 \leq c \leq 2.0:0.2 \leq d \leq 0.26$. One observation can be found that there is an increase (between about 3% to 6% increase) of the lithium content after the second annealing process (e.g. sintering state electrolyte materials) as compared to the first annealing process for making the solid-state electrolyte materials.

Table 15 illustrates testing results of tap density (TD), average particle size $D_{50}$, $D_{10}$, $D_{90}$, $D_1$, $D_{99}$, and SPAN Value of solid-state electrolyte materials after annealing process of exemplary solid-state electrolyte (Example #20-25). To obtain an ideal lithium solid-state electrolyte material with high discharge capacity, excellent cycling performance and high-volume energy density, the morphology and tap density of the material have to be controlled precisely during the preparation process. In one embodiment, $Li_a La_b Zr_c D1_d D2_e \ldots DN_n O_v$, of the present invention is obtained, wherein $6.2 \leq a \leq 7.2$, $2.8 \leq b \leq 3.5$, $1.0 \leq c \leq 2.0$, $2.0 \leq v \leq 12$, and wherein at least one of $D_1$, $D_2$, ..., $D_N$ is a metal, $N \geq 0$, $0 \leq d \leq 0.8$, $0 \leq e \leq 0.8$, and $0 \leq n \leq 0.8$, and wherein $D_1$, $D_2$, ..., $D_N$ is selected from the group consisting of Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, Cl, I, Br, and combinations thereof. The annealing temperature and annealing time can be controlled from 700 to 1200° C. for 7 to 20 hours.

It is found that the tap density ("TD") of the obtained solid-state electrolyte is more than 0.8 g/ml, preferably more than 0.9 g/ml, preferably more than 1.0 g/ml, preferably more than 1.09 g/ml, preferably more than 1.15 g/ml, preferably more than 1.2 g/ml, preferably more than 1.3 g/ml, preferably more than 1.4 g/ml, preferably more than 1.5 g/ml, preferably more than 1.6 g/ml, preferably more than 1.7 g/ml, preferably more than 1.8 g/ml, preferably more than 1.9 g/ml, preferably more than 2.0 g/ml, which can be attributed to the homogeneous distributions of particles with good packing properties.

For example, the tap density ("TD") obtained from solid-state electrolyte materials annealed at 850° C. for a period of time (e.g. between 6 to and 12 hours) demonstrates more than 1.0 g/ml, preferably more than 1.1 g/ml, preferably more than 1.15 g/ml. In another example, the tap density ("TD") obtained from the solid-state electrolyte materials annealed at 900° C. for a period of time (e.g. between 6 to and 12 hours) demonstrates more than 1.1 g/ml, preferably more than 1.15 g/ml, preferably more than 1.18 g/ml, preferably more than 1.2 g/ml.

For example, the tap density ("TD") obtained from the solid-state electrolyte materials annealed at 1050° C. for a period of time (e.g. between 6 to and 12 hours) demonstrates more than 1.2 g/ml, preferably more than 1.3 g/ml, preferably more than 1.35 g/ml, preferably more than 1.4 g/ml, and preferably more than 1.45 g/ml, preferably more than 1.5 g/ml, preferably more than 1.55 g/ml.

Another observation is that the SPAN value $(D_{90} - D_{10})/D_{50}$ of the obtained solid-state electrolyte materials is less than 1.7, preferably less than 1.6, preferably less than 1.5, preferably less than 1.4, preferably less than 1.3, preferably less than 1.2, preferably less than 1.1, preferably less than 1.0, preferably less than 0.9, preferably less than 0.8. In one aspect, the SPAN value of the solid-state electrolyte materials is 0.8<SPAN≤1.7; 0.8<SPAN≤1.4; such as 0.8<SPAN≤1.6; 0.8<SPAN≤1.5. In another aspect, the SPAN value of the solid-state electrolyte materials is 0.9≤SPAN≤1.65. In still another aspect, the SPAN value of the solid-state electrolyte materials is 1.1≤SPAN≤1.65; such as 1.2≤SPAN≤1.65; such as 1.3≤SPAN≤1.65; such as 1.4≤SPAN≤1.65; such as 1.5≤SPAN≤1.65; such as 1.1≤SPAN≤1.3.

In another aspect, the SPAN value of the solid-state electrolyte materials do not dramatically vary with the process of different annealing temperatures. In addition, the $D_{90}$ of the solid-state electrolyte materials can be controlled and obtained at between 20 μm and 40 μm; such as between 25 μm and 40 μm; such as between 25 μm and 38 μm; such as between 28 μm and 38 μm; such as between 30 μm and 38 μm; such as between 31 μm and 38 μm; such as between 25 μm and 36 μm; such as between 25 μm and 33 μm; such as between 25 μm and 31 μm; such as between 26 μm and 31 μm.

Further, the $D_{50}$ of the solid-state electrolyte materials is controlled and obtained at between 10 μm and 18 μm at less than 18 μm, such as between 10 μm and 15 μm, such as between 10 μm and 14 μm, such as between 11 μm and 17 μm, such as between 11 μm and 16 μm; such as between 12

μm and 59 μm; such as between 43 μm and 52 μm; such as between 45 μm and 60 μm; such as between 50 μm and 60 μm.

Example 20 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 1050° C. for 8 hours. The results are shown in table 15. Example 21 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 850° C. for 8 hours. The results are shown in table 15. Example 22 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 900° C. for 8 hours. The results are shown in table 15. Example 23 illustrates tap density (TD), average particle size $D_{50}$, $D_{10}$, $D_{50}$, $D_1$, $D_{99}$, and SPAN Value of exemplary compositions of measured solid-state electrolyte materials or lithium lanthanum zirconium oxide doped with aluminum annealed at 900° C. for 6 hours. The results are shown in table 15.

TABLE 15

| | Measurement of tap density (TD) & average particle size & SPAN value of exemplary solid-state electrolyte materials | | | | | | | | |
|---|---|---|---|---|---|---|---|---|---|
| Ex# | D1 (μm) | D10 (μm) | D50 (μm) | D90 (μm) | D99 (μm) | SPAN | TD (in g/ml) | Annealing Temperature | Annealing Hours |
| 20 | 0.439 | 5.99 | 15.5 | 31.8 | 50.5 | 1.667 | 1.462 | 1050° C. | 8 |
| 21 | 0.389 | 5.44 | 13.6 | 26.9 | 40 | 1.575 | 1.094 | 850° C. | 8 |
| 22 | 0.384 | 5.21 | 13.5 | 27.2 | 41.4 | 1.631 | 1.208 | 900° C. | 8 |
| 23 | 0.415 | 5.95 | 14.9 | 29.5 | 44.4 | 1.579 | 1.119 | 900° C. | 6 |
| 24 | 0.429 | 6.2 | 15.3 | 30.3 | 45.6 | 1.575 | 1.145 | 900° C. | 10 |
| 25 | 0.427 | 6.08 | 15.2 | 30.6 | 47.6 | 1.617 | 1.185 | 900° C. | 12 |
| 26 | 0.345 | 4.16 | 13.5 | 26.8 | 39.9 | 1.676 | 1.452 | 850° C. | 8 |
| 27 | 0.496 | 7.53 | 17 | 32.5 | 50 | 1.471 | 1.528 | 900° C. | 8 |
| 28 | 0.58 | 8.33 | 20.1 | 41.6 | 74.5 | 1.651 | 1.553 | 1050° C. | 8 |

μm and 17 μm; such as between 12 μm and 16 μm; such as between 13 μm and 16 μm; such as between 14 μm and 16 μm; such as between 11 μm and 15 μm; such as between 10 m and 14 μm; such as between 10 μm and 13 μm.

Still further, the $D_{10}$ of the solid-state electrolyte materials is between 3 μm and 10 μm; such as between 3 μm and 9 μm; such as between 3 μm and 8 μm; such as between 3 μm and 7 μm; such as between 3 μm and 6 μm; such as between 4 μm and 10 μm; such as between 4 μm and 9 μm; such as between 4 μm and 8 μm; such as between 4 μm and 7 μm; such as between 4 μm and 6 μm; such as between 5 μm and 9 μm; such as between 5 μm and 8 μm. Further, the $D_1$ of the solid-state electrolyte materials is between 0.1 μm and 3 μm; such as between 0.1 μm and 3 μm; such as between 0.15 μm and 3 μm; such as between 0.2 μm and 3 μm; such as between 0.3 μm and 3 μm; such as between 0.4 μm and 3 μm; such as between 0.5 μm and 3 μm; such as between 0.3 μm and 2 μm; such as between 0.3 μm and 1 μm; such as between 0.2 μm and 1 μm; such as between 0.2 μm and 2 μm; such as between 0.25 μm and 1 μm.

Moreover, the $D_{99}$ of the solid-state electrolyte materials is between 35 μm and 60 μm; such as between 35 μm and 58 μm; such as between 35 μm and 55 μm; such as between 38 μm and 59 μm; such as between 40 μm and 56 μm; such as between 43 μm and 54 μm; such as between 40 μm and 53 μm; such as between 41 μm and 58 μm; such as between 42

Example 24 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 900° C. for 10 hours. The results are shown in table 15. Example 25 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 900° C. for 12 hours. The results are shown in table 15. Example 26 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 850° C. for 8 hours. The results are shown in table 15. Example 27 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 900° C. for 8 hours. The results are shown in table 15. Example 28 illustrates tap density (TD), average particle size $D_{50}$, $D_{10}$, $D_{90}$, $D_1$, $D_{99}$, and SPAN Value of exemplary compositions of measured solid-state electrolyte materials or lithium lanthanum zirconium oxide doped with aluminum annealed at 1050° C. for 8 hours. The results are shown in table 15.

Figure 9:
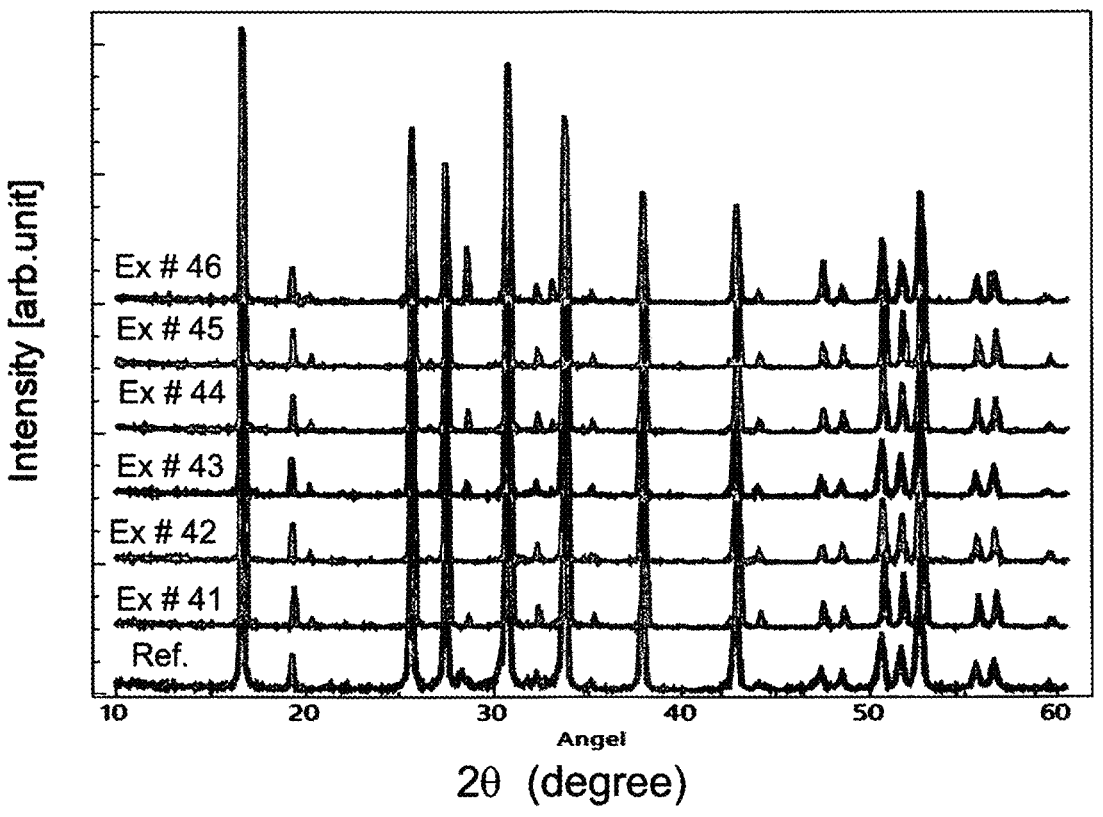
FIG. 9 shows X-ray diffraction (XRD) patterns of examples of crystalized solid-state electrolyte materials of the invention.

FIG. 9 illustrates X-ray diffraction ("XRD") patterns of the lithium lanthanum zirconium oxide material ("LLZO") doped with aluminum for Example #41, Example #42, Example #43, Example #44, Example #45, Example #46, and a reference showing garnet type cubic. The XRD patterns of the solid-state electrolyte materials in Example #41, Example #42, Example #43, Example #44, Example #45, and Example #46 show garnet type of cubic phase of solid-state electrolyte materials.

Figure 10:
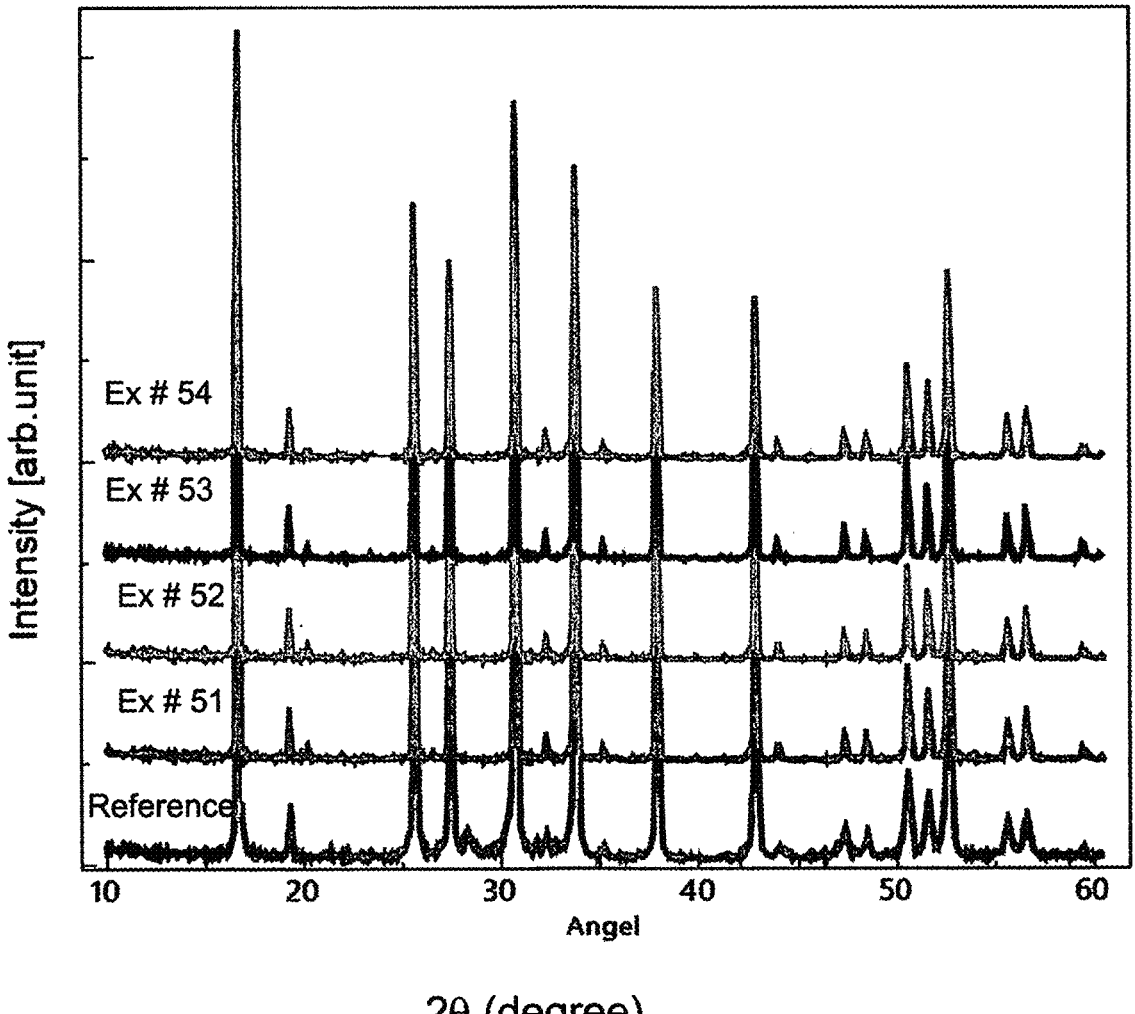
FIG. 10 shows X-ray diffraction (XRD) patterns of examples of crystalized solid-state electrolyte materials of the invention.

The XRD patterns of doped lithium lanthanum zirconium oxide fine powder synthesized at different temperatures are depicted in FIG. 10. Example 41 demonstrates the diffraction peaks of the doped lithium lanthanum zirconium oxide material powder synthesized at 850° C. for 8 hours. The XRD pattern as shown in Example 41 of the synthesized lithium lanthanum zirconium oxide material at 800° C. is similar to that of the commercially purchased reference sample in cubic LLZO form and demonstrate that the formation of garnet type cubic phase LLZO was achieved using the instant invention at the temperature 800° C.

Further, the result of Example 41 indicates that cubic phase Al doped LLZO has been formed and no diffraction peak characteristic of the tetragonal phase LLZO has been detected. It should be noted that the cubic phase LLZO shows better ionic conductivity than the tetragonal phase LLZO.

Example 42 demonstrates the diffraction peaks of the doped LLZO powder synthesized at 850° C. for 8 hours. The XRD pattern as shown in Example 42 of the synthesized doped LLZO at 900° C. is similar to that of the commercially purchased reference sample in cubic doped LLZO form and demonstrate that the formation of garnet type cubic LLZO was achieved using the instant invention at the temperature 900° C. In Example 42, the observance of the cubic structure from FIG. 10 is consistent with commercially purchased reference sample. Further, the result of Example 42 indicates that cubic garnet structure of doped LLZO has been formed and no diffraction peak characteristic of the tetragonal structure has been detected. It should be noted that the cubic phase LLZO shows better ionic conductivity than the tetragonal phase LLZO.

Example 43 demonstrates the diffraction peaks of the doped LLZO powder synthesized at 950° C. for 8 hours. The XRD pattern as shown in Example 43 of the synthesized LLZO at 950° C. is similar to that of commercially purchased reference sample in cubic phase LLZO form and demonstrate that the formation of garnet type cubic LLZO was achieved using the instant invention at the temperature 950° C. Further, the result of Example 43 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Example 44 demonstrates the diffraction peaks of the doped LLZO powder synthesized at 1000° C. for 8 hours. The XRD pattern as shown in Example 44 of the synthesized doped LLZO at 1000° C. is similar to that of the commercially purchased reference sample in cubic LLZO form and demonstrate that the formation of garnet type cubic phase LLZO was achieved using the instant invention at the temperature 1000° C. Further, the result of Example 44 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Example 45 demonstrates the diffraction peaks of the doped LLZO powder synthesized at 1050° C. for 8 hours. The XRD pattern as shown in Example 45 of the synthesized doped LLZO at 1050° C. is similar to that of commercially purchased reference sample in cubic LLZO form and demonstrate that the formation of garnet type cubic LLZO was achieved using the instant invention at the temperature 1050° C. Further, the result of Example 45 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Example 46 demonstrates the diffraction peaks of the doped LLZO powder synthesized at 1100° C. for 8 hours. The XRD pattern as shown in Example 46 of the synthesized doped LLZO at 1100° C. is similar to that of the commercially purchased reference sample in cubic doped LLZO form and demonstrate that the formation of garnet type cubic doped LLZO was achieved using the instant invention at the temperature 1100° C. Further, the result of Example 46 indicates that cubic phase LLZO has been formed and no diffraction peak characteristic of the tetragonal phase LLZO has been detected. It should be noted that the cubic phase LLZO shows better ionic conductivity than the tetragonal phase LLZO.

FIG. 10 illustrates X-ray diffraction ("XRD") patterns of the lithium lanthanum zirconium oxide material (LLZO) doped with aluminum (Al) for Example #51, Example #52, Example #53, Example #54, and a reference showing garnet type cubic. The XRD patterns of the solid-state electrolyte materials in Example #51, Example #52, Example #53 all show garnet type of cubic solid-state electrolyte materials.

Figure 11:
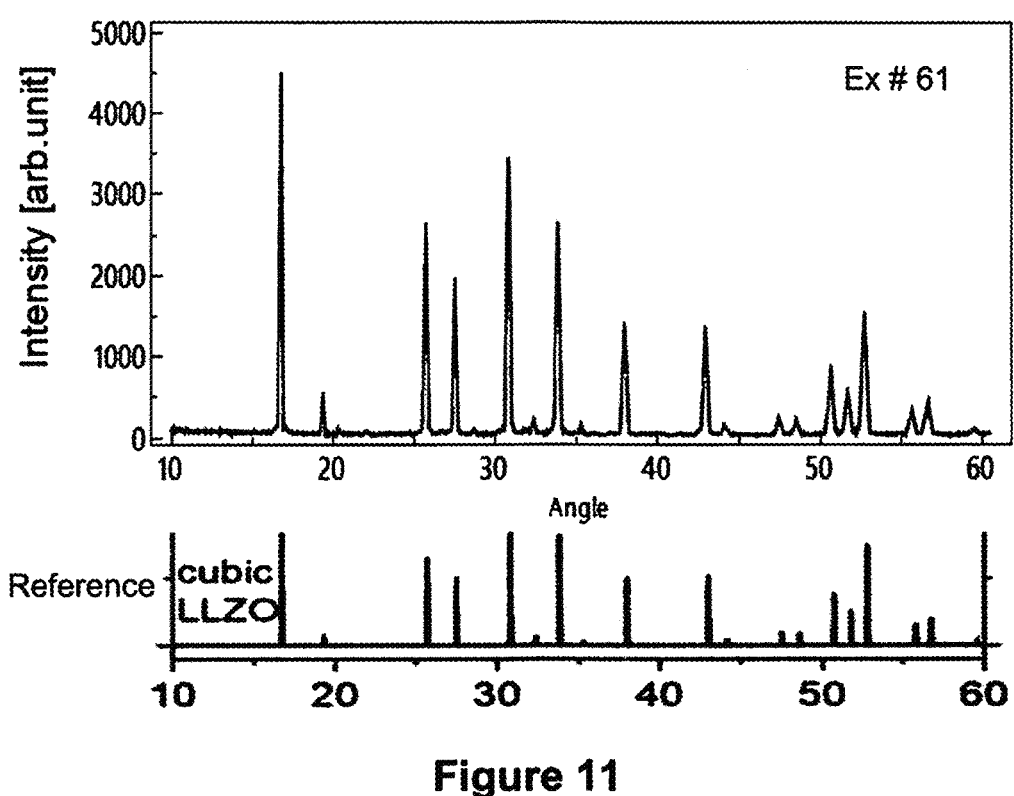
FIG. 11 is an X-ray diffraction (XRD) pattern of one exemplary crystalized solid-state electrolyte material of the invention.

The XRD patterns of Al doped LLZO fine powder synthesized at the same temperature of 900° C. for different hours (6 hour to 12 hours) are depicted in FIG. 11. Example 51 demonstrates the diffraction peaks of the LLZO powder synthesized at 900° C. for 6 hours. The XRD pattern as shown in Example 51 of the synthesized Al doped LLZO at 900° C. is similar to that of the commercially purchased reference sample in cubic LLZO form and demonstrate that the formation of garnet type cubic LLZO was achieved using the instant invention at the temperature 900° C. for 6 hours.

Further, the result of Example 51 indicates that cubic phase LLZO has been formed and no diffraction peak characteristic of the tetragonal phase LLZO has been detected. It should be noted that the cubic phase LLZO shows better ionic conductivity than the tetragonal phase LLZO. Example 52 demonstrates the diffraction peaks of the LLZO powder synthesized at 900° C. for 8 hours. The XRD pattern as shown in Example 52 of the synthesized Al doped LLZO at 900° C. for 8 hours is similar to that of commercially purchased reference sample in cubic LLZO form and demonstrate that the formation of garnet type cubic LLZO was achieved using the instant invention at the temperature 900° C. for 8 hours.

Further, the result of Example 52 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Example 53 demonstrates the diffraction peaks of the LLZO powder synthesized at 900° C. for 10 hours. The XRD pattern as shown in Example 53 of the synthesized Al doped LLZO at 900° C. for 10 hours is similar to that of the commercially purchased reference sample in cubic LLZO form and demonstrate that the formation of garnet type cubic LLZO was achieved using the instant invention at the temperature 900° C. for 10 hours. Further, the result of Example 53 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Example 54 demonstrates the diffraction peaks of the LLZO powder synthesized at 900° C. for 12 hours. The XRD pattern as shown in Example 54 of the synthesized Al doped LLZO at 900° C. for 12 hours is similar to that of the commercially purchased reference sample in cubic LLZO form and demonstrate that the formation of garnet type cubic LLZO was achieved using the instant invention at the temperature 900° C. for 12 hours. Further, the result of Example 54 indicates that cubic phase LLZO has been formed and no diffraction peak characteristic of the tetragonal phase LLZO has been detected. It should be noted that the cubic phase LLZO shows better ionic conductivity than the tetragonal phase LLZO.

FIG. 11 illustrates X-ray diffraction ("XRD") patterns of the lithium lanthanum zirconium oxide material (LLZO) doped with aluminum (Al) for Example #61, and a reference which show garnet type cubic phase solid-state electrolyte materials.

The XRD patterns of LLZO fine powder synthesized at 850° C. for 8 hours are depicted in FIG. 11. Example 61 demonstrates the diffraction peaks of the Al doped LLZO powder synthesized at 850° C. for 8 hours. The XRD pattern as shown in Example 61 of the synthesized LLZO at 850° C. is similar to that of the reference sample in cubic phase LLZO form and demonstrate that the formation of garnet type cubic phase LLZO was achieved using the instant invention at the temperature 850° C. Further, the result of Example 61 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Figure 12:
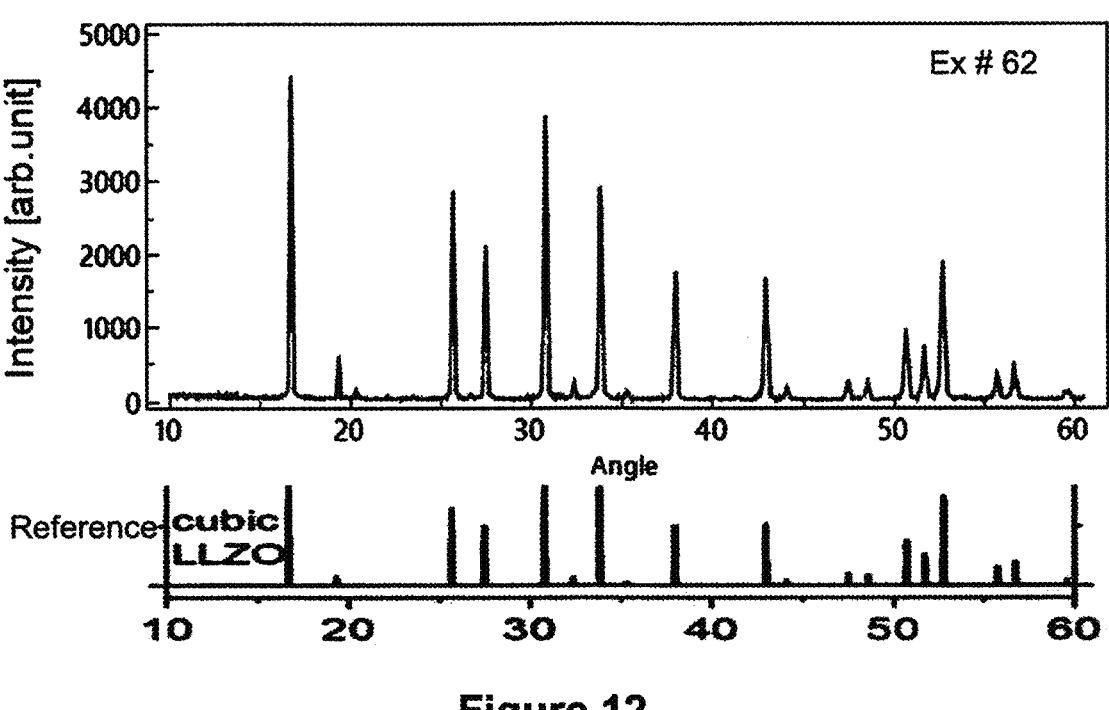
FIG. 12 is an X-ray diffraction (XRD) pattern of another exemplary crystalized solid-state electrolyte material of the invention.

FIG. 12 illustrates X-ray diffraction ("XRD") patterns of the lithium lanthanum zirconium oxide material (LLZO) doped with aluminum (Al) for Example #62, and a reference which show garnet type cubic phase solid-state electrolyte materials. The XRD patterns of LLZO fine powder synthesized at 900° C. for 8 hours are depicted in FIG. 12. Example 62 demonstrates the diffraction peaks of the Al doped LLZO powder synthesized at 900° C. for 8 hours. The XRD pattern as shown in Example 62 of the synthesized LLZO at 900° C. is similar to that of the reference sample in cubic phase LLZO form and demonstrate that the formation of garnet type cubic phase LLZO was achieved using the instant invention at the temperature 900° C.

Further, the result of Example 62 indicates that cubic phase LLZO has been formed and no diffraction peak characteristic of the tetragonal phase LLZO has been detected. It should be noted that the cubic phase LLZO shows better ionic conductivity than the tetragonal phase LLZO.

Figure 13:
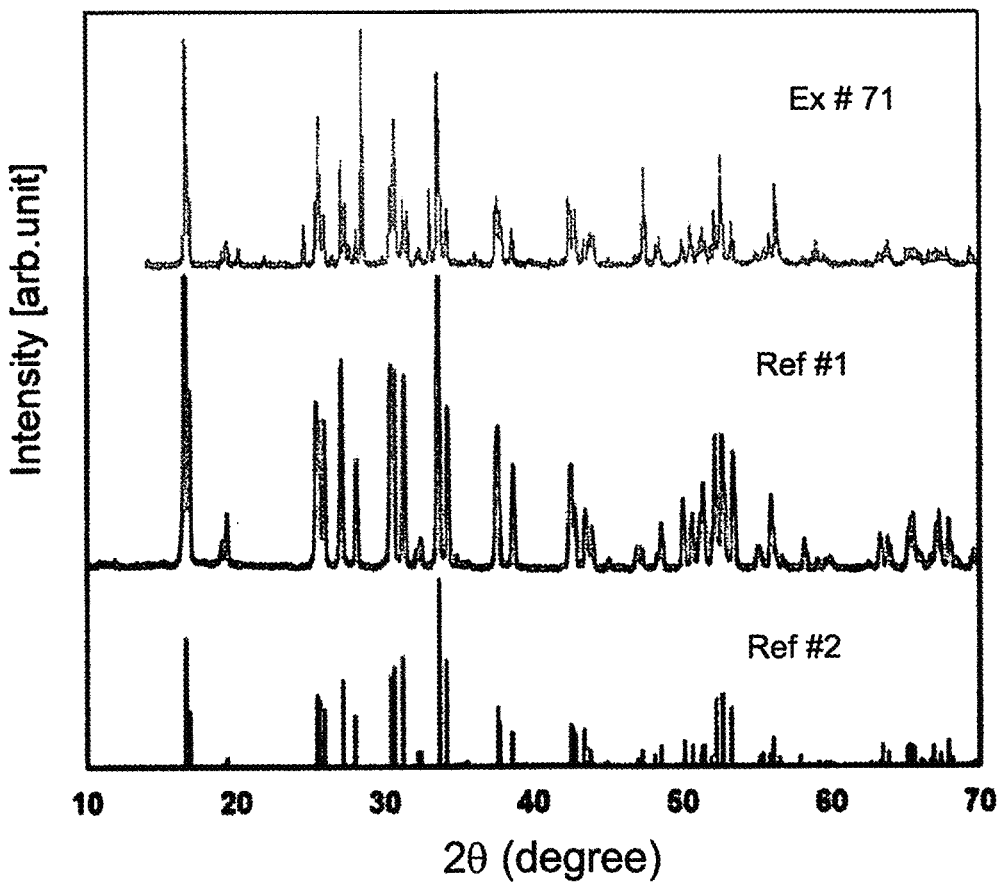
FIG. 13 is an X-ray diffraction (XRD) pattern of another exemplary crystalized solid-state electrolyte material of the invention.

FIG. 13 illustrates X-ray diffraction ("XRD") patterns of the lithium lanthanum zirconium oxide material (LLZO) for Example #71, a commercially purchased sample for reference #1, and a reference for reference #2, which show garnet type tetragonal phase of solid-state electrolyte materials. The XRD patterns of LLZO fine powder synthesized at 900° C. for 8 hours are depicted in FIG. 13. Example 71 demonstrates the diffraction peaks of the lithium lanthanum zirconium oxide material powder synthesized at 900° C. for 8 hours. The XRD pattern as shown in Example 71 of the synthesized LLZO at 900° C. is similar to that of the reference sample in cubic LLZO form and demonstrate that the formation of garnet type tetragonal phase LLZO was achieved using the instant invention at the temperature 900° C.

Figure 14A:
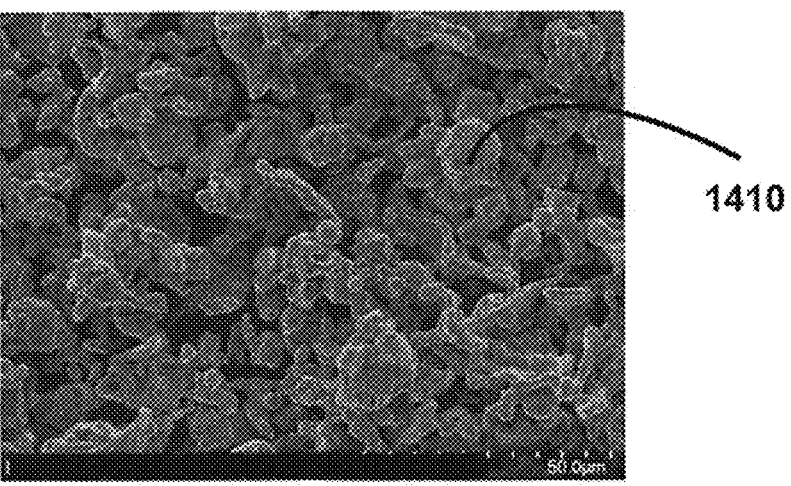
FIG. 14A is a scanning electron microscopy (SEM) image of exemplary solid particles of a solid-state electrolyte material after one or more annealing processes.
Figure 14B:
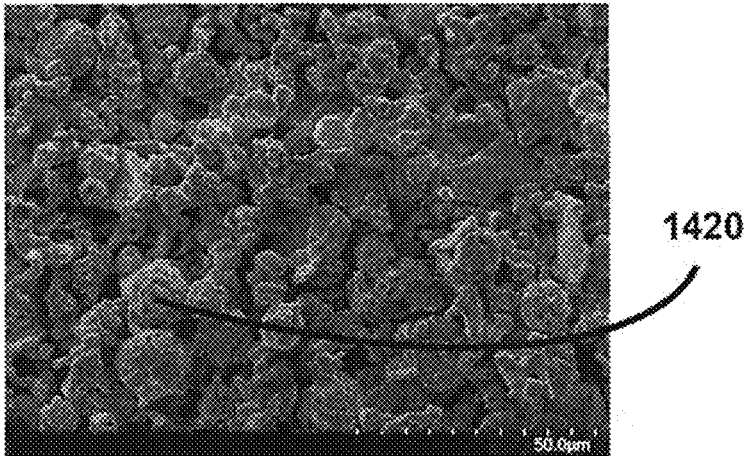
FIG. 14B is a scanning electron microscopy (SEM) image of exemplary solid particles of a solid-state electrolyte material.
Figure 14C:
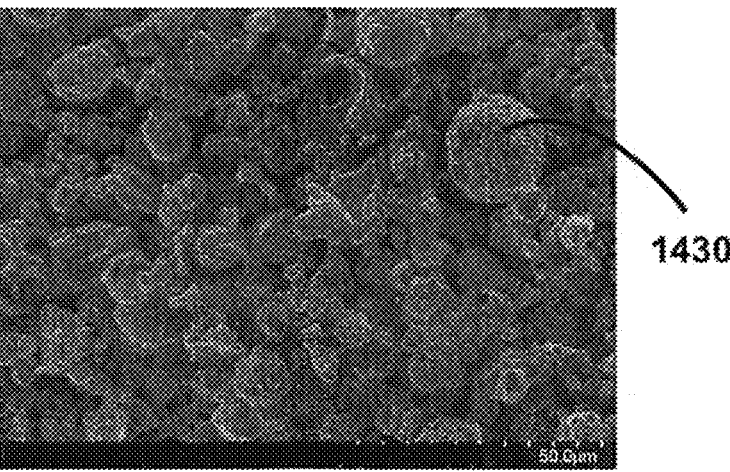
FIG. 14C is a scanning electron microscopy (SEM) image of exemplary solid particles of a solid-state electrolyte material.

FIGS. 14A, 14B, and 14C are scanning electron microscopy (SEM) images of examples of solid particles of solid-state electrolyte material after annealing process. FIGS. 14A, 14B, and 14C shows that the SEM images of the lithium lanthanum zirconium oxide material (LLZO) doped with aluminum (Al) after annealing at 850° C. for 8 hours, 900° C. for 8 hours, and 1050° C. for 8 hours respectively.

One observation can be found that the annealing temperature does not significantly affected the morphology and crystal structure of the lithium lanthanum zirconium oxide material (LLZO) doped with aluminum (Al). Further, FIGS. 14A, 14B, and 14C illustrates lithium lanthanum zirconium oxide material (LLZO) doped with aluminum (Al) particles appear to have the size estimated at a range from 1 nm to 100 um; such as 10 um to 20 um; such as 10 um to 90 um; such as 10 um to 50 um; such as 10 um to 40 um; such as 10 nm to 70 um; such as 20 nm to 80 um; such as 20 nm to 60 um; such as 20 nm to 50 um; such as 30 nm to 70 um; such as 20 nm to 50 um; such as 40 nm to 70 um; such as 50 nm to 70 um; such as 10 um to 30 um; such as 15 um to 40 um; such as 20 um to 40 um; such as 30 um to 60 um.

In one example as shown in FIG. 14A, one lithium lanthanum zirconium oxide material (LLZO) doped with aluminum (Al) particle 1410 has a wire-like morphology. Another example as shown in-FIG. 14B, one lithium lanthanum zirconium oxide material (LLZO) doped with aluminum (Al) particle 1420 has an irregular clustered shaped morphology Another example as shown in FIG. 14C, one lithium lanthanum zirconium oxide material (LLZO) doped with aluminum (Al) particle 1430 has a spherical clusters in morphology, resulting in spherical morphology. One observation can be found that the wire-like morphology at the lower annealing temperature in 14A is disrupted at higher annealing temperature and formed clusters of wire-like morphology as shown in 14C, resulting in the coupling of wire-like morphology.

Figure 15A:
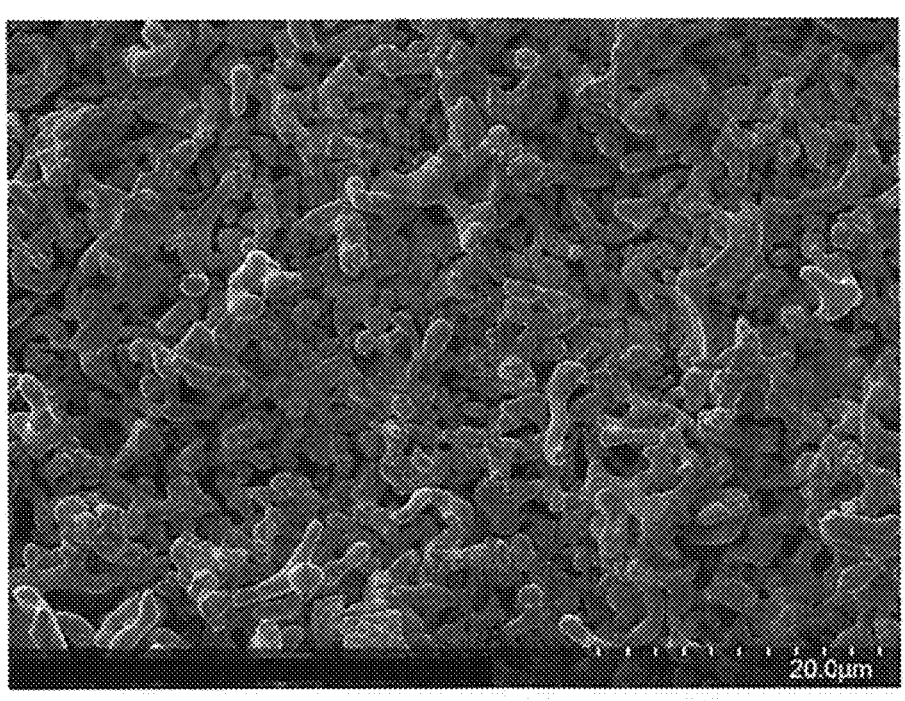
FIG. 15A is a scanning electron microscopy (SEM) image of exemplary solid particles of a solid-state electrolyte material.
Figure 15B:
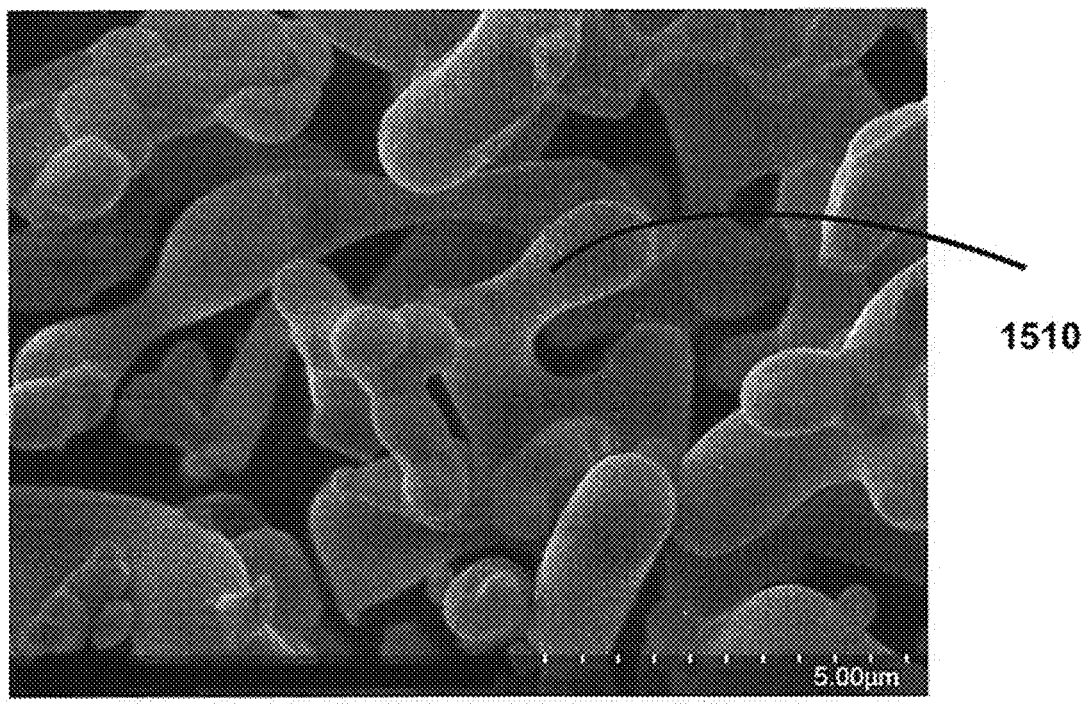
FIG. 15B is a scanning electron microscopy (SEM) image of the exemplary solid-state electrolyte material particles in FIG. 15A in larger magnitude.

FIGS. 15A and 15B are scanning electron microscopy (SEM) images of examples of solid particles of solid-state electrolyte material after annealing process. FIGS. 15A and 15B shows that the SEM images of the lithium lanthanum zirconium oxide material (LLZO) having a chemical composition of $Li_7La_3Zr_2O_{12}$ after annealing at 1050° C. for 8 hours. In addition, FIG. 15B shows a closer look of FIG. 15A. Further, FIG. 15B shows LLZO materials at high magnification, where the morphology of the LLZO materials can be seen clearly. In one example as shown in FIG. 15B, one lithium lanthanum zirconium oxide material (LLZO) particle 1510 has a wire-like morphology.

Further, FIGS. 15A and 15B illustrate lithium lanthanum zirconium oxide material (LLZO) particles appear to have the size estimated at a range from 1 um to 100 um; such as 10 um to 20 um; such as 10 um to 90 um; such as 10 um to 50 um; such as 10 um to 40 um; such as 10 um to 70 um; such as 20 um to 80 um; such as 20 um to 60 um; such as 20 um to 50 um; such as 30 um to 70 um; such as 20 um to 50 um; such as 40 um to 70 um; such as 50 um to 70 um; such as 10 um to 30 um; such as 15 um to 40 um; such as 20 um to 40 um; such as 30 um to 60 um.

Figure 16A:
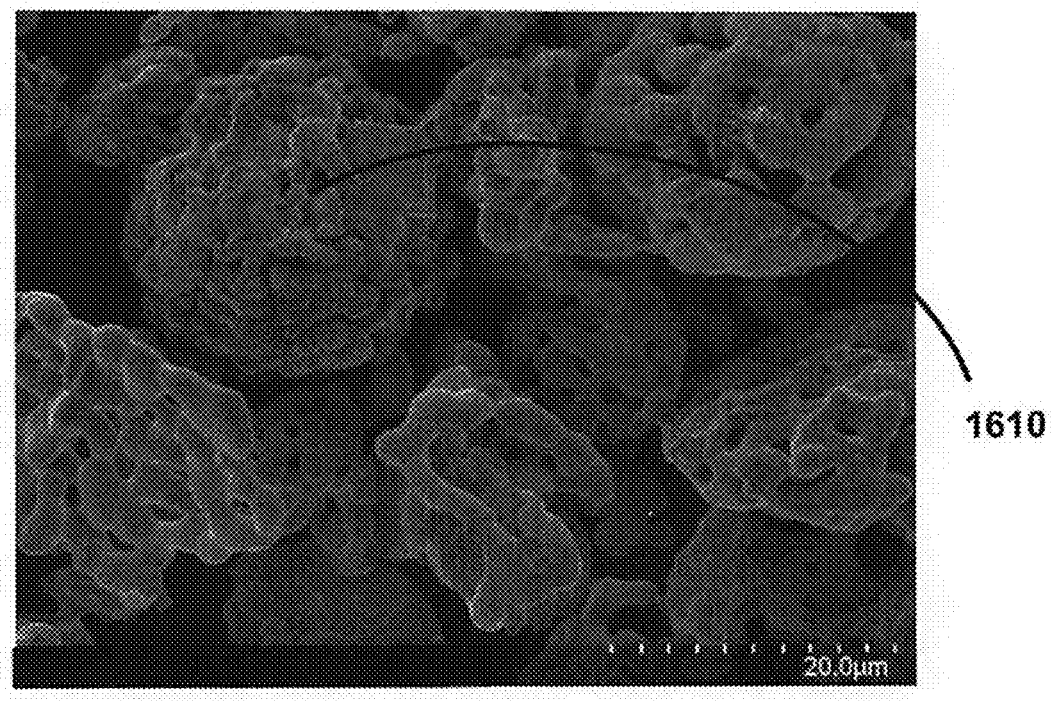
FIG. 16A is a scanning electron microscopy (SEM) image of exemplary solid-state electrolyte material particles.
Figure 16B:
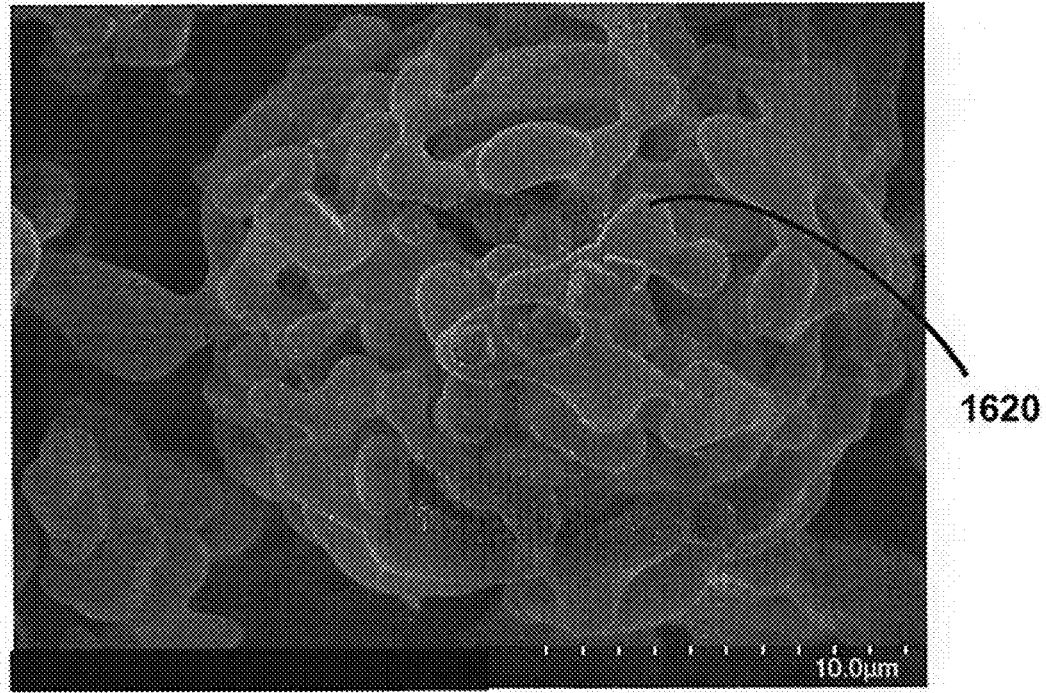
FIG. 16B is a scanning electron microscopy (SEM) image of the exemplary solid-state electrolyte material particles in FIG. 16A in larger magnitude.

FIGS. 16A and 16B are scanning electron microscopy (SEM) images of examples of solid particles of solid-state electrolyte material after annealing process. FIGS. 16A and 16B shows that the SEM images of the lithium lanthanum zirconium oxide material (LLZO) doped with aluminum (Al) after annealing at 1050° C. for 8 hours. In addition, FIG. 16B shows a closer look of FIG. 16A. Further, FIG. 16B shows LLZO particles at high magnification, where the size and shape of LLZO particles can be seen clearly. As shown in the FIGS. 16A and 16B, each LLZO particle consolidates to form an spherical network that can enhance the ionic conductivity of the bulk material. The LLZO particles appear to have a spherical shape with the size estimated at a range from 1 um to 100 um; such as 10 um to 20 um; such as 10 um to 90 um; such as 10 um to 50 um; such as 10 um to 40 um; such as 10 um to 70 um; such as 20 um to 80 um; such as 20 um to 60 um; such as 20 um to 50 um; such as 30 um to 70 um; such as 20 um to 50 um; such as 40 um to 70 um; such as 50 um to 70 um; such as 10 um to 30 um; such as 15 um to 40 um; such as 20 um to 40 um; such as 30 um to 60 um.

As shown in FIGS. 16A and 16B, one observation can be found that lithium lanthanum zirconium oxide (LLZO) doped with aluminum (Al) material 1610 shows spherical clusters in morphology. The example is shown in larger magnitude in FIG. 16B, one lithium lanthanum zirconium oxide (LLZO) doped with aluminum (Al) material 1620 shows a primary wire-like morphology. In addition, the wire-like lithium lanthanum zirconium oxide (LLZO) doped with aluminum (Al) materials are coupling with each other, and formed into secondary clusters.

Figure 17A:
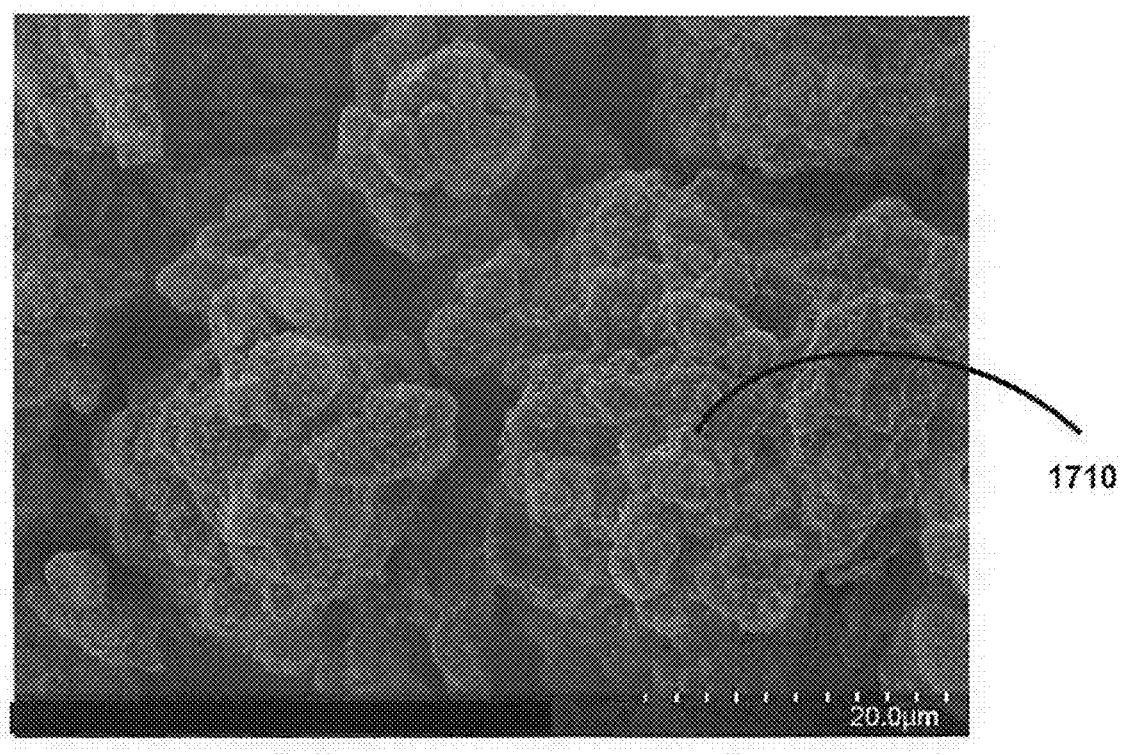
FIG. 17A is a scanning electron microscopy (SEM) image of exemplary solid-state electrolyte material particles after one or more annealing processes.
Figure 17B:
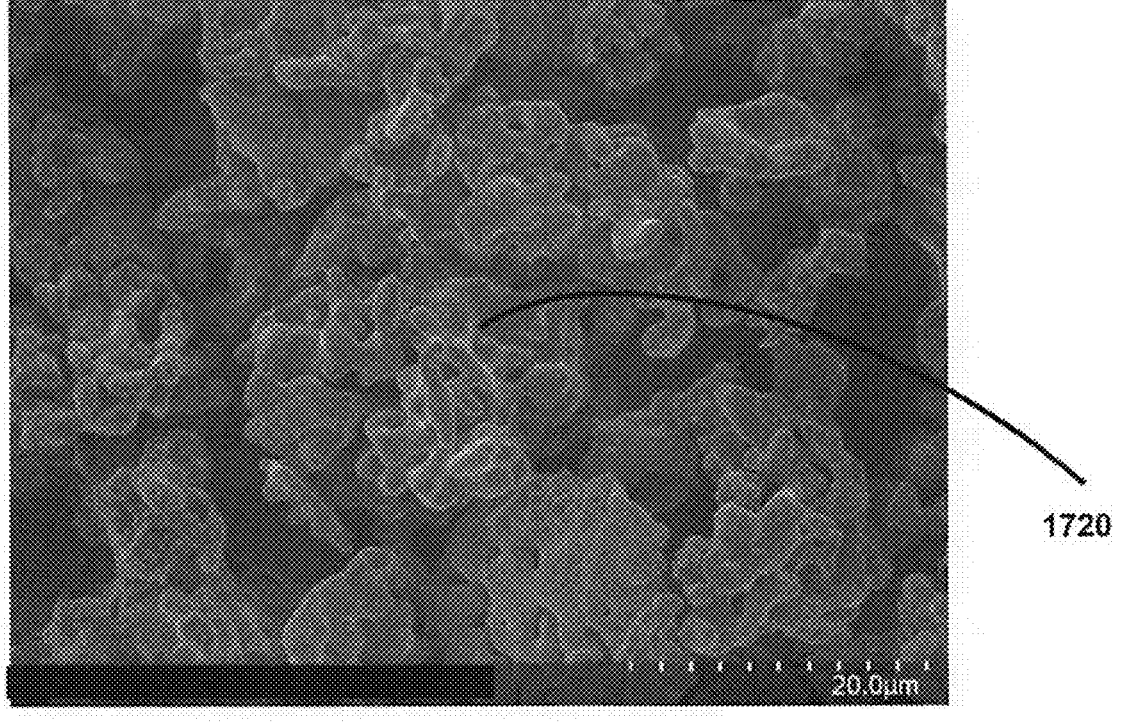
FIG. 17B is a scanning electron microscopy (SEM) image of another example of solid-state electrolyte material particles.

FIG. 17A-17D are scanning electron microscopy (SEM) images of examples of solid particles of solid-state electrolyte material after annealing process. FIG. 17A shows that the SEM image of the lithium lanthanum zirconium oxide material (LLZO) doped with aluminum (Al) referring back to Example #1 having a composition of $Li_{6.76} La_{2.87} Zr_{2.0} Al_{0.24} O_{12.36}$ as shown in Table 3, after annealing at 950° C. for 8 hours. FIG. 17B shows that the SEM image of the lithium lanthanum zirconium oxide material (LLZO) doped with aluminum (Al) referring back to Example #3 having a composition of $Li_{6.74}La_{2.96}Zr_{2.0}Al_{0.25}O_{12.45}$ as shown in Table 5, after annealing at 950° C. for 8 hours.

As shown in FIG. 17A and FIG. 17B, the Al doped LLZO particles appear to have a spherical shape with the size estimated at a range from 1 nm to 100 um; such as 10 um to 20 um; such as 10 um to 90 um; such as 10 um to 50 um; such as 10 um to 40 um; such as 10 nm to 70 um; such as 20 nm to 80 um; such as 20 nm to 60 um; such as 20 nm to 50 um; such as 30 nm to 70 um; such as 20 nm to 50 um; such as 40 nm to 70 um; such as 50 nm to 70 um; such as 10 um to 30 um; such as 15 um to 40 um; such as 20 um to 40 um; such as 30 um to 60 um. Further, one observation can be found that lithium lanthanum zirconium oxide (LLZO) doped with aluminum (Al) material 1710 shows spherical clusters in morphology as shown in FIG. 17A. In another example as shown in FIG. 17B, another observation can be found that lithium lanthanum zirconium oxide (LLZO) doped with aluminum (AI) material 1720 shows spherical clusters in morphology.

Figure 17C:
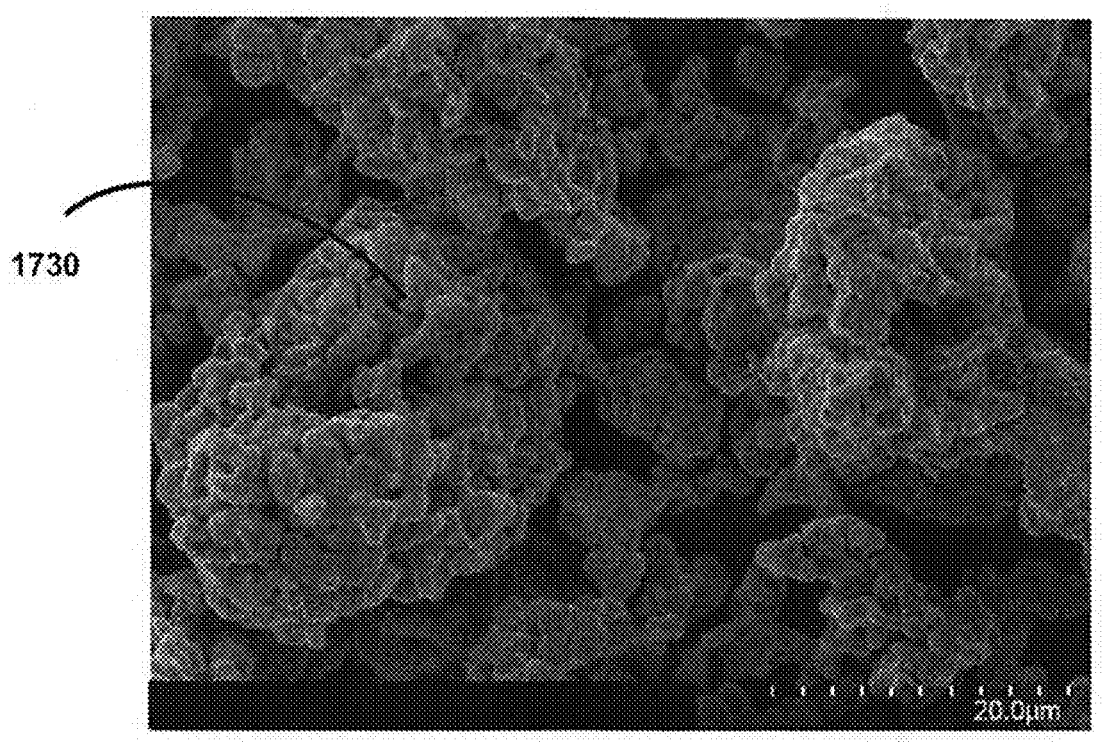
FIG. 17C is a scanning electron microscopy (SEM) image of exemplary solid-state electrolyte material particles.

FIG. 17C shows that the SEM image of the lithium lanthanum zirconium oxide material (LLZO) doped with aluminum (Al) referring back to Example #9 having a composition of $Li_{6.57}La_{2.99}Zr_{2.0}Al_{0.22}O_{12.22}$ as shown in Table 11, after annealing at 850° C. for 8 hours. Further, one observation can be found that lithium lanthanum zirconium oxide (LLZO) doped with aluminum (Al) material 1730 shows spherical clusters in morphology as shown in FIG. 17C.

As shown in FIG. 17C, the Al doped LLZO particles appear to have a spherical shape with the size estimated at a range from 1 um to 100 um; such as 10 um to 20 um; such as 10 um to 90 um; such as 10 um to 50 um; such as 10 um to 40 um; such as 10 um to 70 um; such as 20 um to 80 um; such as 20 um to 60 um; such as 20 nm to 50 um; such as 30 um to 70 um; such as 20 um to 50 um; such as 40 um to 70 um; such as 50 um to 70 um; such as 10 um to 30 um; such as 15 um to 40 um; such as 20 um to 40 um; such as 30 um to 60 um.

Figure 17D:
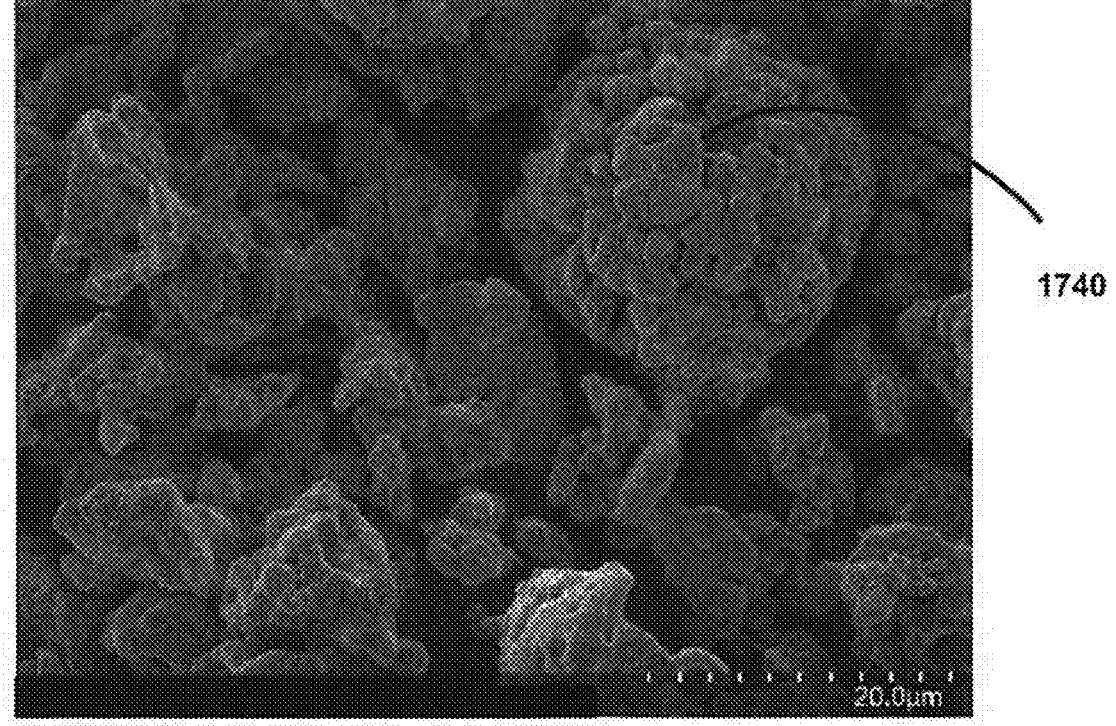
FIG. 17D is a scanning electron microscopy (SEM) image of exemplary solid-state electrolyte material particles.

FIG. 17D shows that the SEM image of the lithium lanthanum zirconium oxide material (LLZO) doped with aluminum (Al) referring back to Example #11 having a composition of $Li_{6.49}La_{3.02}Zr_{2.0}Al_{0.23}O_{12.2}$ as shown in Table 13, after annealing at 900° C. for 8 hours. As shown in FIG. 17D, the Al doped LLZO particles appear to have a spherical shape with the size estimated at a range from 1 um to 100 um; such as 10 um to 20 um; such as 10 um to 90 um; such as 10 um to 50 um; such as 10 um to 40 um; such as 10 um to 70 um; such as 20 um to 80 um; such as 20 um to 60 um; such as 20 um to 50 um; such as 30 um to 70 um; such as 20 um to 50 um; such as 40 um to 70 um; such as 50 um to 70 um; such as 10 um to 30 um; such as 15 um to 40 um; such as 20 um to 40 um; such as 30 um to 60 um. In another example as shown in FIG. 17D, another observation can be found that lithium lanthanum zirconium oxide (LLZO) doped with aluminum (Al) material 1740 shows spherical clusters in morphology.

Table 16 illustrates testing results of electric capacity and coulombic efficiency (CE) of examples of battery cells made by solid-state electrolyte materials after annealing process (Example #30-35). The annealing temperature and annealing time can be controlled from 700 to 1200° C. for 7 to 20 hours.

As shown in Table 16, the battery made by lithium lanthanum zirconium oxide material (LLZO) particles appear to have the different charge/discharge capacity cycling performance at different current/weight (mA/g), where 1 C rate is equal to 200 mA/g. In one example, the charge capacity is at a range between 210 (mAh/g) to 255 (mAh/g); such as 215 (mAh/g) to 255 (mAh/g); such as 225 (mAh/g) to 255 (mAh/g); such as 235 (mAh/g) to 255 (mAh/g); such as 245 (mAh/g) to 255 (mAh/g). In another example, the charge capacity is more than 205 (mAh/g), preferably more than 210 (mAh/g), preferably more than 215 (mAh/g), preferably more than 220 (mAh/g), preferably more than 225 (mAh/g), preferably more than 230 (mAh/g), preferably more than 235 (mAh/g), preferably more than 240 (mAh/g), preferably more than 245 (mAh/g), preferably more than 250 (mAh/g), preferably more than 255 (mAh/g). In another example, the discharge capacity is at a range between 210 (mAh/g) to 255 (mAh/g); such as 215 (mAh/g) to 255 (mAh/g); such as 225 (mAh/g) to 255 (mAh/g); such as 235 (mAh/g) to 255 (mAh/g); such as 245 (mAh/g) to 255 (mAh/g). In another example, the discharge capacity is more than 205 (mAh/g), preferably more than 210 (mAh/g), preferably more than 215 (mAh/g), preferably more than 220 (mAh/g), preferably more than 225 (mAh/g), preferably more than 230 (mAh/g), preferably more than 235 (mAh/g), preferably more than 240 (mAh/g), preferably more than 245 (mAh/g), preferably more than 250 (mAh/g), preferably more than 255 (mAh/g). It is found that the Coulombic Efficiency (CE, %) of the obtained solid-state electrolyte is more than 96%, preferably more than 96.5%, preferably more than 97%, preferably more than 97.5%, preferably more than 98%, preferably more than 98.5%, preferably more than 99%, preferably more than 99.5%, preferably more than 99.6%, preferably more than 99.7%, preferably more than 99.8%, preferably more than 99.9%.

TABLE 16

Measured electric performance of lithium-ion-battery cells made from exemplary solid-state electrolyte materials annealed at 850° C.

| Current/ Weight, mA/g | Charge capacity, mAh/g | Discharge capacity, mAh/g | Coulombic Efficiency, % |
|---|---|---|---|
| 25 | 230.2972 | 222.7164 | 96.708 |
| 50 | 218.6137 | 216.4293 | 99.001 |
| 75 | 209.7601 | 208.8956 | 99.588 |
| 100 | 202.7414 | 202.0882 | 99.678 |
| 200 | 169.2282 | 168.9559 | 99.839 |
| 300 | 149.7479 | 149.2897 | 99.694 |
| 25 | 231.1816 | 226.6669 | 98.047 |

While the foregoing is directed to embodiments of the present invention, other and further embodiments of the invention may be devised without departing from the basic scope thereof, and the scope thereof is determined by the Claims that follow.

What is claimed is:

1. A method of producing a solid-state electrolyte (SSE) material, comprising, flowing a first flow of a first gas to be mixed with a liquid mixture of digitally-controlled stoichiometrically amounts of a lithium-containing salt, one or more inorganic salts containing one or more metals $D_1$, $D_2$, . . . , $D_N$;

forming a gas-liquid mixture and jetting a mist of the liquid mixture into a power jetting chamber;

delivering a second gas flow of a heated gas into the power jetting chamber;

drying the gas-liquid mixture for a first reaction time period of less than 20 min to undergo one or more oxidation reactions in the presence of the second gas flow and form a gas-solid mixture;

deliver the gas-solid mixture out of the power jetting chamber;

separate the gas-solid mixture into one or more solid particles of the SSE material;

deliver the one or more solid particles into an annealing chamber; and annealing the one or more solid particles of the SSE material for a second reaction time period of more than 2 hours to undergo a dynamic crystallization process in the presence of a third gas flow and obtain crystalline products, wherein the crystalline products of the SSE material are in spherical clusters under scanning electronic microscopy (SEM) analysis.

2. The method of claim 1, further comprising:

milling the crystalline products of the SSE material to obtain nano-sized particles.

3. The method of claim 1, wherein the one or more solid particles are annealed in the dynamic crystallization process in the presence of an oxygen gas flow.

4. The method of claim 1, wherein the first reaction time is less than 3 minutes.

5. The method of claim 1, wherein the ionic conductivity (c) of the crystalline products of the SSE material is larger than $10^{-4}$ S per centimeter at 25° C.

6. The method of claim 1, wherein the tap density of the SSE material is more than 1.0 g/ml.

7. The method of claim 1, wherein the tap density of the SSE material is more than 1.4 g/ml after annealing the SSE material at more than 900° C. for more than 8 hours.

8. The method of claim 1, wherein the crystalline products is a garnet type ceramic material with a cubic structure as measured by X-ray diffraction (XRD) analysis.

9. The method of claim 1, wherein the liquid mixture comprises the lithium-containing salt, a lanthanum-containing salt, a zirconium-containing salt, and wherein the crystalline products of the SSE material as measured by X-ray diffraction (XRD) analysis are garnet type ceramic material with a cubic structure.

10. The method of claim 1, wherein the liquid mixture comprises the lithium-containing salt, a lanthanum-containing salt, a zirconium-containing salt, and an aluminum-containing salt, and wherein the crystalline products of the SSE material as measured by X-ray diffraction (XRD) analysis are garnet type ceramic material with a cubic structure.

11. The method of claim 1, wherein the liquid mixture comprises the lithium-containing salt, a lanthanum-containing salt, a zirconium-containing salt, and wherein the crystalline products of the SSE material as measured by X-ray diffraction (XRD) analysis are garnet type ceramic material with a tetragonal structure.

12. The method of claim 1, wherein the liquid mixture comprises the lithium-containing salt, a lanthanum-containing salt, a tantalum-containing salt, and wherein the crystalline products of the SSE material as measured by X-ray diffraction (XRD) analysis are garnet type ceramic material with a cubic structure.

13. The method of claim 1, wherein the liquid mixture comprises the lithium-containing salt, a lanthanum-containing salt, a titanium-containing salt, and wherein the crystalline products of the SSE material are perovskite type ceramic material.

14. The method of claim 1, wherein the liquid mixture comprises the lithium-containing salt, an aluminum-containing salt, a phosphorus-containing salt, and wherein the crystalline products of the SSE material as measured by X-ray diffraction (XRD) analysis are sodium superionic conductor (NASICON) type ceramic material with a hexagonal structure.

15. The method of claim 1, wherein the liquid mixture comprises the lithium-containing salt, a germanium-containing salt, and wherein the SSE material is a ceramic material.

16. The method of claim 1, wherein the liquid mixture comprises the lithium-containing salt, a sulfur-containing salt, and wherein the SSE material is a sulfide material.

17. The method of claim 1, wherein $D_1$, $D_2$, . . . , DN is selected from the group consisting of La, Zr, Al, Ta, Ti, Ge, Mg, Mn, Zr, Zn, Nb, Ce, Sn, Ga, Ba, Ac, Ca, Sc, V, Cr, Fe, Cu, B, As, Hf, Mo, W, Re, Ru, Rh, Pt, Ag, Os, Ir, Au, F, CI, I, Br, and combinations thereof.

18. The method of claim 1, wherein the SSE material is selected from the group consisting of $Li_7La_3Zr_2O_{12}$, $Li_{6.75}La_3Zr_{1.75}Ta_{0.25}O_{12}$, $Li_{6.5}La_3Zr_2Al_{0.25}O_{12}$, $Li_{6.5}La_3Zr_2Al_{0.24}O_{12}$, $Li_{6.5}La_3Zr_2Al_{0.22}O_{12}$, $Li_{6.76}La_{2.87}Zr_{2.0}Al_{0.24}O_{12.35}$, $Li_{6.74}La_{2.96}Zr_{2.0}Al_{0.25}O_{12.45}$, $Li_{6.27}La_{3.22}Zr_{2.0}Al_{0.3}O_{12.39}$, $Li_{6.4}La_{2.86}Zr_{2.0}Al_{0.24}O_{11.98}$, $Li_{6.43}La_{2.93}Zr_{2.0}Al_{0.24}O_{12.08}$, $Li_{6.32}La_{3.2}Zr_{2.0}Al_{0.46}O12.9$, $Li_{6.57}La_{2.99}Zr_{2.0}Al_{0.22}O_{12.22}$, $Li_{6.54}La_{2.82}Zr_{2.0}Al_{0.24}O_{12.08}$, $Li_{6.49}La_{3.28}Zr_{2.0}Al_{0.31}O_{12.7}$, $Li_{6.4}La_3Zr_2Al_{0.2}O_{12}$, $Li_{6.49}La_{3.02}Zr_{2.0}Al_{0.23}O_{12.2}$, $Li_{6.28}La_3Zr_2Al_{0.24}O_{12}$, $Li_{6.25}La_{3.01}Zr_{2.0}Al_{0.22}O_{11.92}$, $Li_{6.25}La_3Zr_2Al_{0.25}O_{12}$, $Li_{6.5}La_3Zr_{1.5}Ta_{0.5}O_{12}$, $Li_{6.15}La_3Zr_{1.75}Ta_{0.25}Al_{0.2}O_{12}$, $Li_{6.15}La_3Zr_{1.75}Ta_{0.25}Ga_{0.2}O_{12}$, $Li_{6.25}La_3Zr_2Ta_{0.25}Ga_{0.2}O_{12}$, $Li_{6.4}La_3Zr_2Ga_{0.2}O_{12}$, $Li_{6.4}La_3Zr_{1.4}Ta_{0.6}O_{12}$, and combinations thereof.

19. The method of claim 1, further comprising:

sintering the crystalline products of the SSE material at an annealing temperature of 900° C. or higher to further process the SSE material; and measuring the ionic conductivity of the SSE material.

20. A method of producing a solid-state electrolyte material, comprising, forming a liquid mixture of digitally-controlled stoichiometrically amounts of a lithium-containing salt, a lanthanum-containing salt, a zirconium-containing salt, and one or more inorganic salts containing one or more metals $D_1, D_2, \ldots, D_N$ to be mixed with a first gas flow to form a gas-liquid mixture;

jetting a mist of the liquid mixture into a power jetting chamber;

drying the gas-liquid mixture for a first reaction time period of less than 20 min to undergo one or more oxidation reactions in the presence of a second gas flow of a heated gas and form a gas-solid mixture;

delivering the gas-solid mixture out of the power jetting chamber;

separating the gas-solid mixture into one or more solid particles of the SSE material;

delivering the one or more solid particles into an annealing chamber; and annealing the one or more solid particles of the SSE material for a second reaction time period of more than 2 hours to undergo a dynamic crystallization process in the presence of a third gas flow and obtain crystalline products, wherein the final crystalline products of the SSE materials is a ceramic material having a measured ionic conductivity ($\sigma$) of larger than $10^{-4}$ S per centimeter at 25° C., and a chemical composition of $Li_a La_b Zr_c D1_d D2_e \ldots DN_n O_v$, wherein $6.25 \leq a \leq 7.2$, $2.8 \leq b \leq 3.5$, $1.2 \leq c \leq 2.2$, $2.0 \leq v \leq 12$, and wherein at least one of $D_1, D_2, \ldots, D_N$ is a metal, $N \geq 0$, $0 \leq d \leq 0.8$, $0 \leq e \leq 0.8$, and $0 \leq n \leq 0.8$.

21. The method of claim 20, wherein the SPAN value $(D_{90}-D_{10})/D_{50}$ of the crystalline products after annealing is $0.8 < \text{SPAN} \leq 1.0$.

22. The method of claim 20, wherein the SPAN value $(D_{90}-D_{10})/D_{50}$ of the crystalline products after annealing is $0.8 < \text{SPAN} \leq 1.7$.

23. The method of claim 20, wherein the $D_{50}$ of the crystalline products after annealing is between 10 μm and 18 um.

24. The method of claim 20, wherein the $D_{90}$ of the crystalline products after annealing are at between 20 μm and 40 μm, the $D_{10}$ are between 3 μm and 10 μm, the $D_{99}$ are between 35 μm and 60 μm, and the $D_1$ are between 0.1 μm and 3 μm.

25. A method of producing a solid-state electrolyte (SSE) material, comprising, flowing a first flow of a first gas to be mixed with a liquid mixture of digitally-controlled stoichiometrically amounts of a lithium-containing salt, one or more inorganic salts containing one or more metals $D_1, D_2, \ldots, D_N$;

forming a gas-liquid mixture and jetting a mist of the liquid mixture into a power jetting chamber;

delivering a second gas flow of a heated gas into the power jetting chamber;

drying the gas-liquid mixture for a first reaction time period of less than 20 min to undergo one or more oxidation reactions in the presence of the second gas flow and form a gas-solid mixture;

deliver the gas-solid mixture out of the power jetting chamber;

separate the gas-solid mixture into one or more solid particles of the SSE material;

deliver the one or more solid particles into an annealing chamber;

annealing the one or more solid particles of the SSE material for a second reaction time period of more than 2 hours to undergo a dynamic crystallization process in the presence of a third gas flow and obtain crystalline products; and milling the crystalline products of the SSE material to obtain nano-sized particles, wherein the crystalline products of the SSE material are in spherical clusters under scanning electronic microscopy (SEM) analysis.

* * * * *